United States Patent
Oh et al.

(10) Patent No.: US 11,127,012 B2
(45) Date of Patent: Sep. 21, 2021

(54) ELECTRONIC DEVICE AND METHOD FOR PERFORMING PLURALITY OF PAYMENTS

(71) Applicant: Samsung Electronics Co., Ltd., Gyeonggi-do (KR)

(72) Inventors: Ji-Su Oh, Gyeonggi-do (KR); Pil-Joo Yoon, Gyeonggi-do (KR)

(73) Assignee: Samsung Electronics Co., Ltd

( * ) Notice: Subject to any disclaimer, the term of this patent is extended or adjusted under 35 U.S.C. 154(b) by 378 days.

(21) Appl. No.: 15/888,713

(22) Filed: Feb. 5, 2018

(65) Prior Publication Data
US 2018/0225670 A1    Aug. 9, 2018

(30) Foreign Application Priority Data

Feb. 3, 2017    (KR) .................. 10-2017-0015853

(51) Int. Cl.
*G06Q 20/40*    (2012.01)
*G06Q 20/20*    (2012.01)
*G06Q 30/06*    (2012.01)
(Continued)

(52) U.S. Cl.
CPC ....... *G06Q 20/40145* (2013.01); *G06Q 20/20* (2013.01); *G06Q 20/322* (2013.01);
(Continued)

(58) Field of Classification Search
CPC .......... G06Q 30/0633; G06Q 30/0601; G06Q 30/0641; G06Q 30/06; G06Q 30/0253;
(Continued)

(56) References Cited

U.S. PATENT DOCUMENTS 10,453,050 B1 *  10/2019  Arumugam .......... G06Q 20/227
2006/0167811 A1   7/2006   Bhambri et al.
(Continued)

FOREIGN PATENT DOCUMENTS

KR    10-2006-0085569    7/2006
KR       10-1057016      8/2011
(Continued)

OTHER PUBLICATIONS

Guta, Michael. "How to Create A Qr code In 5 Simple Steps" Small Business Trends. May 25, 2016. (Year: 2016).*
(Continued)

*Primary Examiner* — Elda G Milef
(74) *Attorney, Agent, or Firm* — The Farrell Law Firm, P.C.

(57) ABSTRACT

An electronic device and a non-transitory computer-readable recording medium are provided. The electronic device includes a first communication module; a sensing device; a display; and a processor functionally connected with the first communication module, the sensing device, and the display, and configured to access a first external electronic device through the first communication module, and correlate information on a first item obtained from the first external electronic device with an integrated storage area; and obtain information on a second item outside the electronic device using the sensing device, and correlate the obtained information with the integrated storage area. Further, other embodiments are possible.

18 Claims, 42 Drawing Sheets

(51) Int. Cl.
*G06Q 20/32* (2012.01)
*G06Q 20/36* (2012.01)

(52) U.S. Cl.
CPC ....... *G06Q 20/327* (2013.01); *G06Q 20/3276* (2013.01); *G06Q 20/3278* (2013.01); *G06Q 20/367* (2013.01); *G06Q 30/0601* (2013.01); *G06Q 30/0633* (2013.01); *G06Q 30/0639* (2013.01); *G06Q 30/0643* (2013.01)

(58) Field of Classification Search
CPC ............ G06Q 30/0222; G06Q 20/201; G06Q 20/40145; G06Q 20/327; G06Q 20/3278; G06Q 20/12; G06Q 20/208; G06Q 20/32; G06Q 20/322; G06Q 20/3224; G06Q 20/36; G06Q 20/40; G06Q 30/00; G06Q 20/102; G06Q 20/20; G06Q 20/326; G06Q 20/401; G06Q 40/12; G06Q 30/0643; G06Q 20/3276; G06Q 20/367; G06Q 30/0639; G06Q 20/382; G06Q 20/385; G06Q 30/0635; H04W 4/80; G06F 21/32; G06K 19/0723; A61B 5/117
See application file for complete search history.

(56) References Cited

U.S. PATENT DOCUMENTS

| | | | | |
|---|---|---|---|---|
| 2011/0137742 | A1* | 6/2011 | Parikh | ............... G06Q 30/0601 705/26.1 |
| 2012/0267432 | A1 | 10/2012 | Kuttuva | |
| 2012/0303425 | A1* | 11/2012 | Katzin | ................ G06Q 20/027 705/14.4 |
| 2012/0330769 | A1 | 12/2012 | Arceo | |
| 2014/0180790 | A1* | 6/2014 | Boal | ................. G06Q 30/0255 705/14.42 |
| 2014/0297465 | A1 | 10/2014 | Stocker | |
| 2015/0363771 | A1 | 12/2015 | Graylin et al. | |
| 2016/0155169 | A9 | 6/2016 | Folayan | |
| 2016/0253669 | A1 | 9/2016 | Yoon et al. | |
| 2016/0335625 | A1* | 11/2016 | Ko | ....................... G06Q 20/326 |
| 2016/0371766 | A1* | 12/2016 | Schmidt | ............ G06Q 30/0633 |
| 2017/0148046 | A1* | 5/2017 | Akbarpour Mashadi | .................... G06Q 30/0239 |

FOREIGN PATENT DOCUMENTS

| | | |
|---|---|---|
| KR | 10-1504660 | 3/2015 |
| KR | 10-2015-0082719 | 7/2015 |
| KR | 10-2015-0118672 | 10/2015 |
| WO | WO 2015/108483 | 7/2015 |

OTHER PUBLICATIONS

European Search Report dated Jun. 28, 2018 issued in counterpart application No. 18154951.0-1217, 8 pages.
European Search Report dated Nov. 6, 2020 issued in counterpart application No. 18154951.0-1213, 12 pages.

* cited by examiner

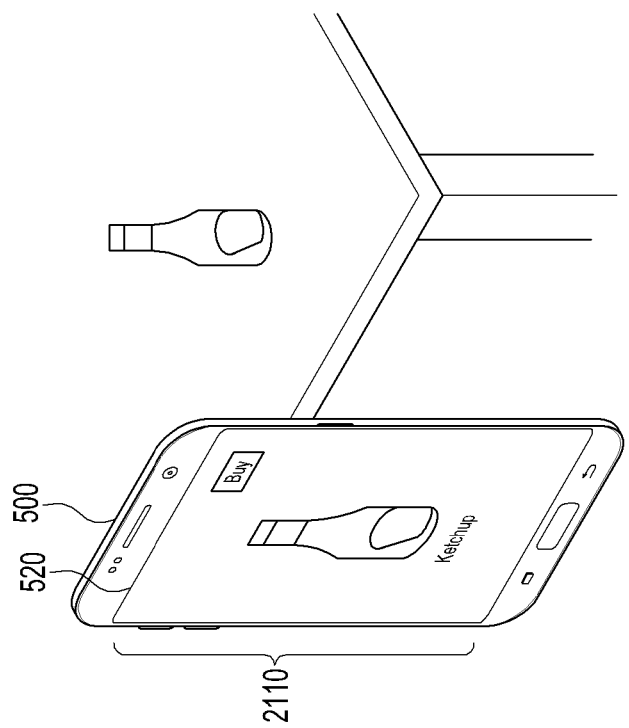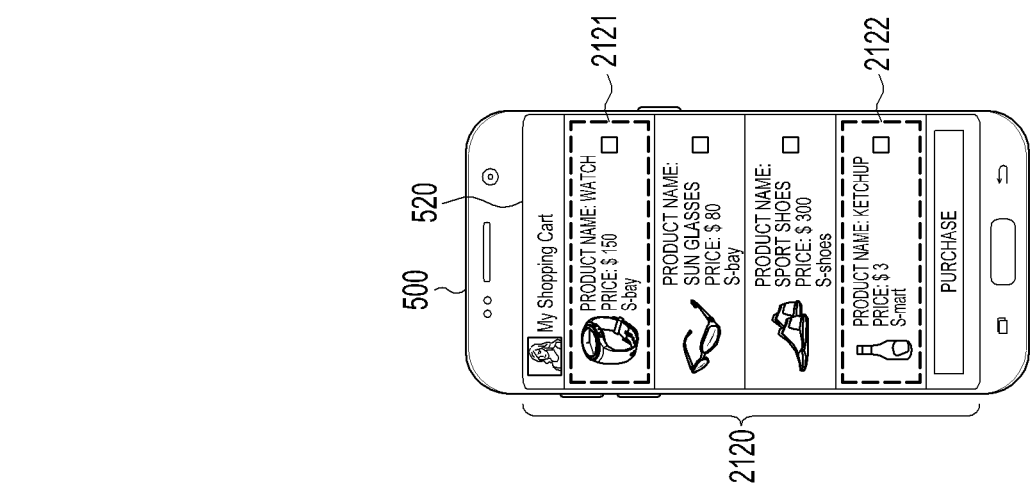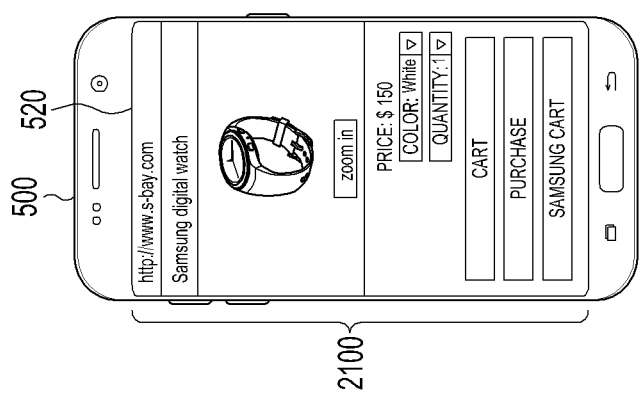
FIG. 21A
FIG. 21B
FIG. 21C

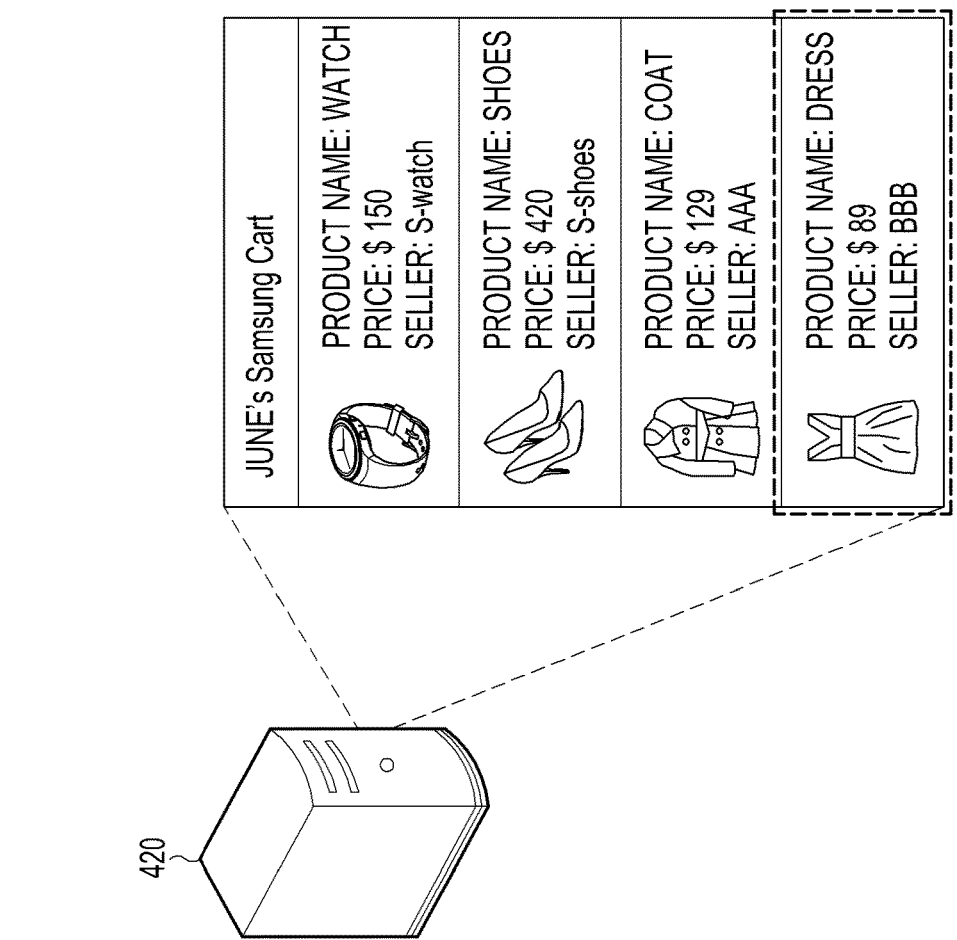
FIG. 26B
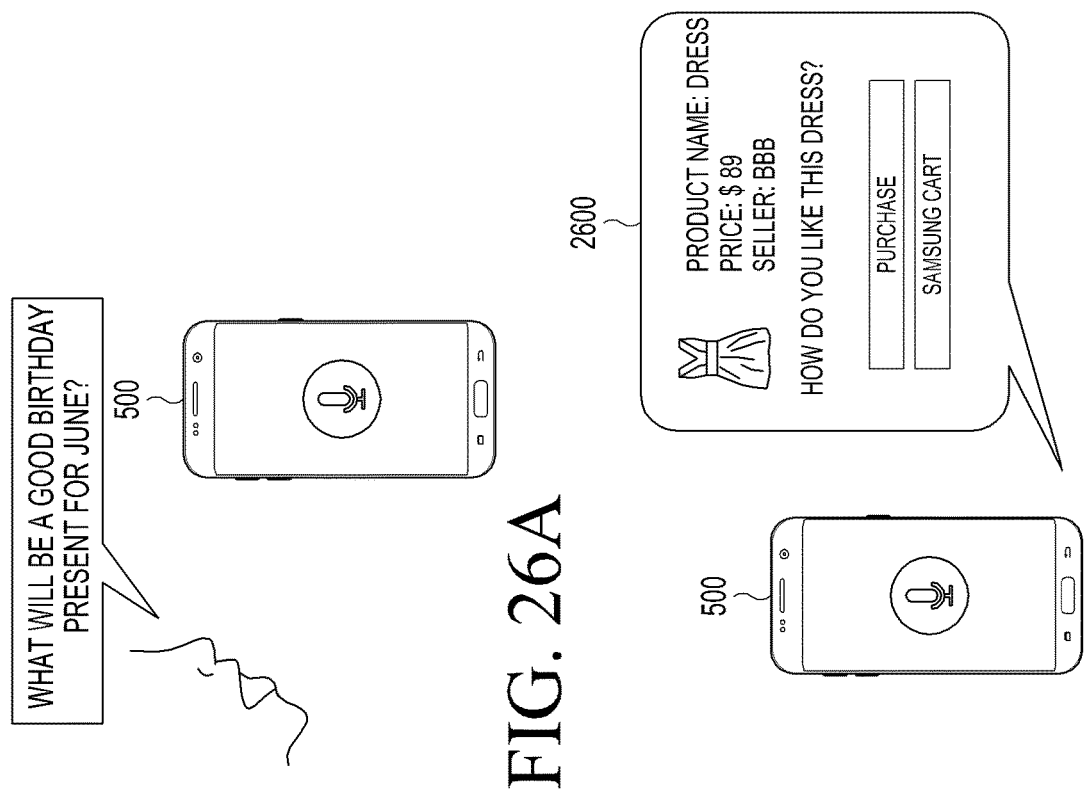
FIG. 26A
FIG. 26C

ELECTRONIC DEVICE AND METHOD FOR PERFORMING PLURALITY OF PAYMENTS

PRIORITY

This application claims priority under 35 U.S.C. § 119(a) to a Korean Patent Application filed on Feb. 3, 2017 in the Korean Intellectual Property Office and assigned Serial No. 10-2017-0015853, the entire disclosure of which is incorporated herein by reference.

BACKGROUND

1. Field of the Disclosure

The present disclosure relates generally to an electronic device that performs a plurality of payments, and a method thereof, and more particularly, to an electronic device and a method thereof, which integrally manage both online products and offline products through one list, and perform payment for a plurality of products including online and offline products using one user input.

2. Description of the Related Art

Mobile devices, such as a smart phone or the like, have come to be daily necessities. Currently, a smart phone performs online/offline payment by containing user authentication information, credit card information, and the like therein. For example, a user stores a desired product from among online products provided by an online shopping mall (e.g., a merchant) in a storage area using a mobile device, and proceeds with payment for products stored in the storage area based on user authentication information and credit card information contained in the mobile device.

SUMMARY

An aspect of the present disclosure provides an electronic device and a method thereof, which integrally manage both online products and offline products through one list, and perform payment for a plurality of products including online and offline products using one user input.

Another aspect of the present disclosure provides an electronic device that performs a plurality of payments, and a method thereof.

Another aspect of the present disclosure integrally manages various products provided by an online/offline shopping mall through one list, and readily performs payment for online/offline products using one user input.

Another aspect of the present disclosure increases reliability of a payment system using a token-based payment scheme, and provides safety of payment security.

According to an aspect of the present disclosure, an electronic device is provided. The electronic device includes a first communication module; a sensing device; a display; and a processor functionally connected with the first communication module, the sensing device, and the display, and configured to access a first external electronic device through the first communication module, and correlate information on a first item obtained from the first external electronic device with an integrated storage area; and obtain information on a second item outside the electronic device using the sensing device, and correlate the obtained information with the integrated storage area.

According to another aspect of the present disclosure, an electronic device is provided. The electronic device includes a secure memory configured to store a token; a biometric sensor; a communication module; and a processor, wherein the processor is configured to display a cart including first product information corresponding to a first product associated with a first external electronic device and second product information corresponding to a second product associated with a second external electronic device; obtain a purchase input associated with the cart; perform user authentication using the biometric sensor in response to the purchase input; obtain the token from the secure memory when the user authentication is successfully performed; generate first payment information corresponding to the first product information and second payment information corresponding to the second production information using the token; and transmit the first payment information to the first external electronic device and transmit the second payment information to the second external electronic device, through the communication module.

According to another aspect of the present disclosure, a non-transitory computer-readable recording medium is provided. The non-transitory computer-readable recording medium is configured to store a program for implementing a method performed by an electronic device. The method includes displaying a cart including first product information corresponding to an online product and second product information corresponding to an offline product; obtaining a purchase input associated with the cart; performing user authentication using a biometric sensor functionally connected with the electronic device in response to the purchase input; obtaining a token from a secure memory included in the electronic device when the user authentication is successfully performed; generating first payment information corresponding to the first product information and second payment information corresponding to the second product information using the token; transferring the first payment information to a first external electronic device using a first communication module functionally connected to the electronic device; and transferring the second payment information to a second external electronic device using a second communication module functionally connected to the electronic device.

BRIEF DESCRIPTION OF THE DRAWINGS

The above and other aspects, features, and advantages of the present disclosure will be more apparent from the following detailed description, taken in conjunction with the accompanying drawings, in which:

FIGS. 21A, 21B, and 21C are illustrations of an integrated storage area that stores information on online items and offline items according to an embodiment of the present disclosure;

FIGS. 26A, 26B, and 26C are illustrations of a voice recognition service using an integrated storage area according to an embodiment of the present disclosure;

DETAILED DESCRIPTION OF EMBODIMENTS OF THE PRESENT DISCLOSURE

Figure 1:
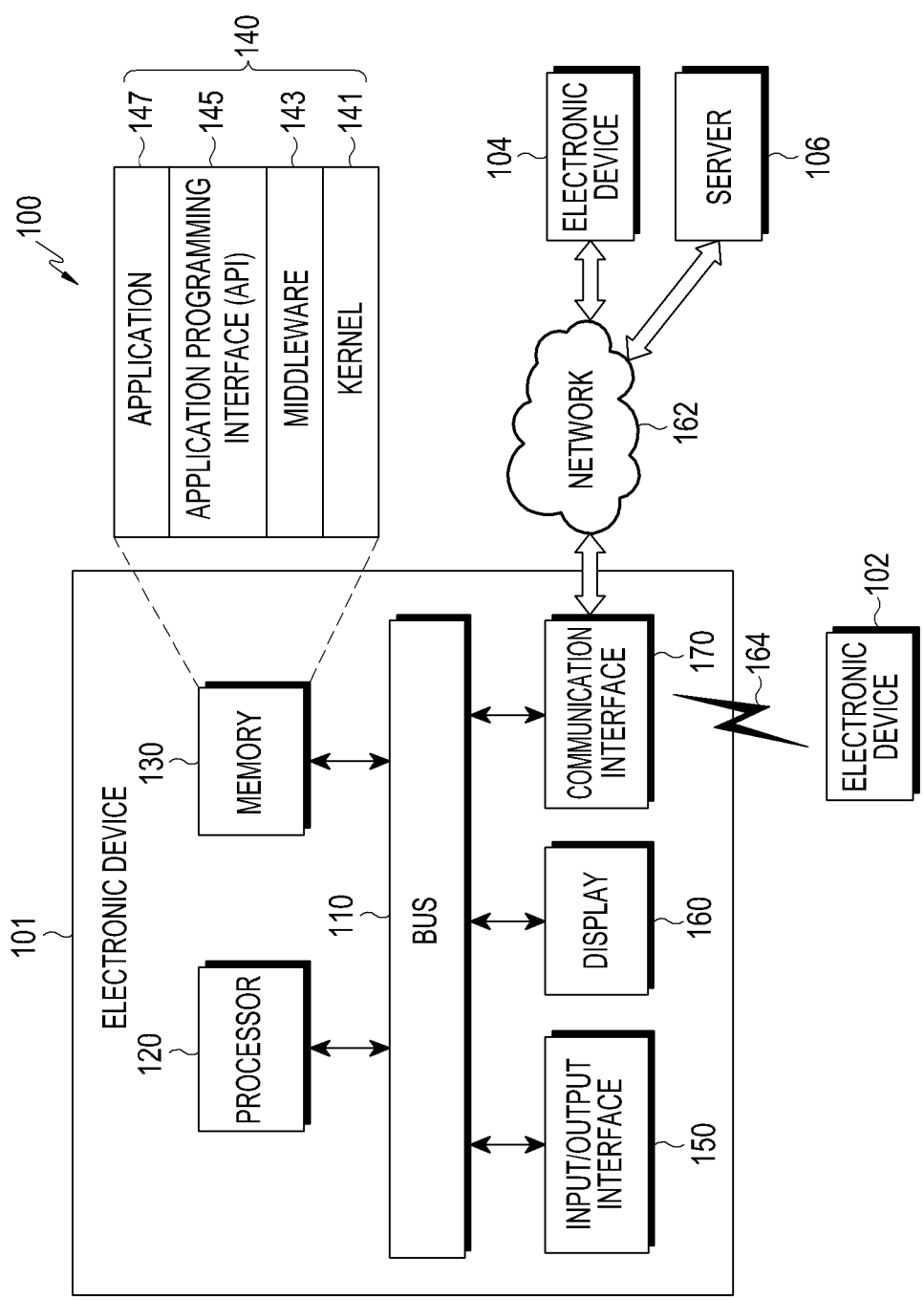
FIG. 1 is a block diagram of a network environment including an electronic device according to an embodiment of the present disclosure.

Hereinafter, various embodiments of the present disclosure are described with reference to the accompanying drawings. The embodiments and the terms used therein are not intended to limit the present disclosure to specific forms, but are intended to include various modifications, equivalents, and/or alternatives to the present disclosure as defined by the appended claims. In describing the accompanying drawings, similar reference numerals may be used to designate similar elements. A singular expression may include a plural expression unless they are definitely different in a context. In the present disclosure, the expressions "A or B", "at least one of A and/or B", and "A/B" may include all possible combinations of the items listed. The expressions "a first", "a second", "the first", or "the second" used in the present disclosure may modify various components regardless of order and/or importance and is not intended to limit the corresponding components. When an element (e.g., a first element) is referred to as being "(functionally or communicatively) connected," or "directly coupled" to another element (e.g., a second element), the element may be connected directly to the other element or connected to the other element through yet another element (e.g., a third element).

The expression "configured to" as used in the present disclosure may be interchangeably used with, for example, the expressions "suitable for", "having the capacity to", "designed to", "adapted to", "made to", and "capable of" in terms of hardware or software, according to circumstances. Alternatively, in some situations, the expression "device configured to" may indicate that the device, together with other devices or components, "is able to". For example, the expression "processor adapted (or configured) to perform A, B, and C" may indicate a dedicated processor (e.g., an embedded processor) only for performing the corresponding operations or a general-purpose processor (e.g., a central processing unit (CPU) or an application processor (AP)) that can perform the corresponding operations by executing one or more software programs stored in a memory device.

An electronic device according to an embodiment of the present disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), an moving picture experts group (MPEG-1) audio layer-3 (MP3) player, a mobile medical device, a camera, and a wearable device. A wearable device may include at least one of an accessory type (e.g., a watch, a ring, a bracelet, an anklet, a necklace, glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit). An electronic device may include at least one of, for example, a television, a digital video disk (DVD) player, an audio player, a refrigerator, an air conditioner, a vacuum cleaner, an oven, a microwave oven, a washing machine, an air cleaner, a set-top box, a home automation control panel, a security control panel, a TV box (e.g., Samsung HomeSync®, Apple TV®, or Google TV™), a game console (e.g., Xbox® and PlayStation®), an electronic dictionary, an electronic key, a camcorder, and an electronic photo frame.

In an embodiment of the present disclosure, an electronic device may include at least one of various medical devices (e.g., various portable medical measuring devices (e.g., a blood glucose monitoring device, a heart rate monitoring device, a blood pressure measuring device, a thermometer, etc.), a magnetic resonance angiography (MRA) device, a magnetic resonance imaging (MRI) device, a computed tomography (CT) machine, and an ultrasonic machine), a navigation device, a global positioning system (GPS) receiver, an event data recorder (EDR), a flight data recorder (FDR), a vehicle infotainment devices, an electronic devices for a ship (e.g., a navigation device for a ship, and a gyro-compass), avionics, security devices, an automotive head unit, a robot for home or industry, an automated teller machine (ATM) in banks, a point of sales (POS) device in a shop, or an Internet of things (IoT) device (e.g., a light bulb, various sensors, an electric or gas meter, a sprinkler device, a fire alarm, a thermostat, a streetlamp, a toaster, sporting goods, a hot water tank, a heater, a boiler, etc.).

An electronic device may include at least one of a part of furniture or a building/structure, an electronic board, an electronic signature receiving device, a projector, and various types of measuring instruments (e.g., a water meter, an electric meter, a gas meter, a radio wave meter, and the like). An electronic device may be flexible, or may be a combination of one or more of the aforementioned various devices. However, an electronic device is not intended to be limited to the above described devices. In the present disclosure, the term "user" may indicate a person using an electronic device or a device (e.g., an artificial intelligence electronic device) using an electronic device.

FIG. 1 is a block diagram of a network environment 100 including an electronic device 101 according to an embodiment of the present disclosure.

Referring to FIG. 1, the electronic device 101 may include a bus 110, a processor 120, a memory 130, an input/output interface 150, a display 160, and a communication interface 170. In an embodiment of the present disclosure, the electronic device 101 may omit at least one of the elements, or may further include other elements.

The bus 110 may include a circuit that interconnects the elements 110 to 170 and transmits communication (e.g., control messages or data) between the elements 110 to 170.

The processor 120 may include one or more of a CPU, an AP, and a communication processor (CP). The processor 120, for example, may carry out operations or process data relating to the control or communication of at least one other element of the electronic device 101.

According to an embodiment of the present disclosure, the processor 120 accesses a first seller server (e.g., the server 106) using a first communication scheme, and correlates information on a first item obtained from the first seller server with an integrated storage area (e.g., an integrated cart or a cloud cart). The first communication scheme may be a wireless communication scheme.

According to an embodiment of the present disclosure, the processor 120 may obtain information on a second item using a sensor (or sensing device) (e.g., a sensor module), and may correlate the obtained information on the second item with the integrated storage area.

According to an embodiment of the present disclosure, the processor 120 may perform user authentication using a sensor (e.g., a biometric sensor) according to an input for payment for (or purchase of) the first item and the second item, and may perform payment for the first item and the second item when the user authentication is successfully performed.

The memory 130 may include a volatile or non-volatile memory. The memory 130 may store, for example, instructions or data relevant to at least one other element of the electronic device 101.

According to an embodiment of the present disclosure, the memory 130 may store software and/or a program 140. The program 140 may include, for example, a kernel 141, middleware 143, an application programming interface (API) 145, application programs (or application) 147, or a location providing module. At least some of the kernel 141, the middleware 143, and the API 145 may be referred to as an operating system (OS).

The kernel 141 may control or manage system resources (e.g., the bus 110, the processor 120, or the memory 130) used for executing an operation or a function implemented by other programs (e.g., the middleware 143, the API 145, or the application 147). Furthermore, the kernel 141 may provide an interface through which the middleware 143, the API 145, or the application 147 may access the individual elements of the electronic device 101 to control or manage the system resources.

The middleware 143 may function as, for example, an intermediary for allowing the API 145 or the application 147 to communicate with the kernel 141 to exchange data. Furthermore, the middleware 143 may process one or more task requests, which are received from the application 147, according to priorities thereof. For example, the middleware 143 may assign priorities for using the system resources (e.g., the bus 110, the processor 120, the memory 130, or the like) of the electronic device 101 to at least one of the application 147, and may process the one or more task requests. The API 145 is an interface through which the application 147 controls functions provided from the kernel 141 or the middleware 143, and may include, for example, at least one interface or function (e.g., instruction) for file control, window control, image processing, and text control. For example, the input/output interface 150 may forward instructions or data, input from a user or an external device, to the other element(s) of the electronic device 101, or may output instructions or data, received from the other element(s) of the electronic device 101, to the user or the external device.

According to an embodiment of the present disclosure, the location providing module may collect location information of the electronic device 101, process the collected location information into location data corresponding to predetermined accuracy, and provide the same. For example, the location providing module may collect location information, process the collected location information into location data corresponding to predetermined accuracy, and provide the same to at least one application.

The display 160 may include, for example, a liquid crystal display (LCD), a light emitting diode (LED) display, an organic LED (OLED) display, a micro electro mechanical system (MEMS) display, and an electronic paper display. The display 160 may display, for example, various types of contents (e.g., text, images, videos, icons, symbols, and the like) for a user. The display 160 may include a touchscreen, and may receive, for example, a touch, a gesture, a proximity touch, a drag, swipe, and a hovering input using an electronic pen or a part of a user's body.

The communication interface 170, for example, may set communication between the electronic device 101 and an external device (e.g., a first external electronic device 102, a second external electronic device 104, and a server 106). For example, the communication interface 170 may be connected to a network 162 through wireless or wired communication to communicate with the second external electronic device 104 or the server 106.

The wireless communication may include, for example, cellular communication that uses at least one of long term evolution (LTE), LTE-Advanced (LTE-A), code division multiple access (CDMA), wideband CDMA (WCDMA), universal mobile telecommunications system (UMTS), wireless broadband (WiBro), global system for mobile communications (GSM), and the like. A wireless communication 164 may include, for example, at least one of wireless fidelity (Wi-Fi), light fidelity (LiFi), Bluetooth, Bluetooth low energy (BLE), ZigBee, near field communication (NFC), magnetic secure transmission, radio frequency (RF), and body area network (BAN). A wireless communication may include a GNSS. The GNSS may be, for example, a GPS, a global navigation satellite system (Glonass), a Beidou navigation satellite system (hereinafter, referred to as Beidou), and the European global satellite-based navigation system (Galileo). The term "GPS" may be interchangeable with the term "GNSS". A wired communication may include, for example, at least one of a universal serial bus (USB), a high definition multimedia interface (HDMI), recommended standard 232 (RS-232), power line communication, a plain old telephone service (POTS), and the like. The network 162 may include a telecommunications network, for example, at least one of a computer network (e.g., a local area network (LAN) and a wide area network (WAN)), the Internet, and a telephone network.

A sensor module may include a first sensor (e.g., a touch sensor) and a second sensor (e.g., a biometric sensor). The sensor module may sense a first input (e.g., a touch, a drag, a swipe, a pinch in/out, and the like) through a first sensor, and may sense a second input (e.g., biometric authentication information (e.g., a fingerprint, an iris, a face, a voice, and the like)) through a second sensor. A single sensor capable of performing both a first sensor operation and a second sensor operation may be configured by combining at least a part of a first sensor and a second sensor.

Each of the first external electronic device 102 and the second external electronic device 104 may be of a type that is the same as or different from the electronic device 101.

According to an embodiment of the present disclosure, all or some of the operations performed in the electronic device 101 may be performed in the first external electronic device 102, the second external electronic device 104, and the server 106.

According to an embodiment of the present disclosure, when the electronic device 101 must perform a function or service automatically or in response to a request, the electronic device 101 may request the first external electronic device 102, the second external electronic device 104, or the server 106 to perform at least some functions relating thereto, instead of, or in addition to, autonomously performing the function or service. The first external electronic device 102, the second external electronic device 104, and the server 106 may execute the requested functions or the additional functions, and may deliver a result of the execution to the electronic device 101. The electronic device 101 may provide the received result as is, or may additionally process the received result to provide the requested functions or services. To this end, for example, cloud computing, distributed computing, or client-server computing technology may be used.

Figure 2:
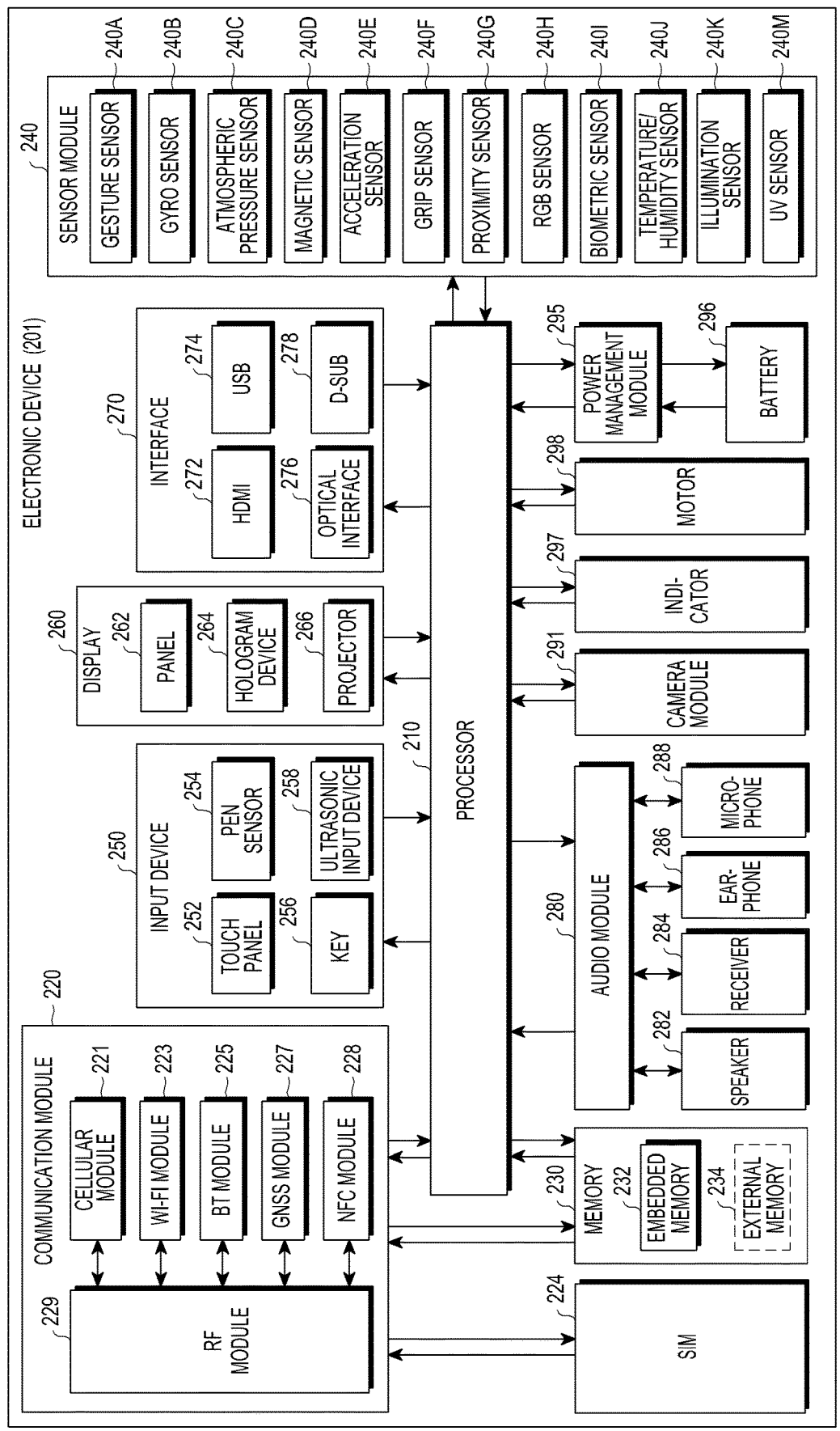
FIG. 2 is a block diagram of an electronic device according to an embodiment of the present disclosure.

FIG. 2 is a block diagram of an electronic device 201 according to an embodiment of the present disclosure.

Referring to FIG. 2, the electronic device 201 may include, for example, the whole or a part of the electronic device 201 illustrated in FIG. 2. The electronic device 201 may include at least one processor 210 (e.g., an AP), a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 may control a plurality of hardware or software elements connected thereto and may perform various data processing and operations by driving an OS or an application program. The processor 210 may be embodied as, for example, a system on chip (SoC).

According to an embodiment of the present disclosure, the processor 210 may further include a graphics processing unit (GPU) and/or an image signal processor. The processor 210 may also include at least some (e.g., a cellular module 221) of the elements illustrated in FIG. 2. The processor 210 may load, in a volatile memory, instructions or data received from at least one of the other elements (e.g., a non-volatile memory), may process the loaded instructions or data, and may store the resultant data in the non-volatile memory.

According to an embodiment of the present disclosure, the processor 210 accesses a first seller server 106 using a first communication scheme, and correlates information on a first item obtained from the first seller server with an integrated storage area. The first communication scheme may be a wireless communication scheme.

According to an embodiment of the present disclosure, the processor 210 may obtain information on a second item using a sensor (or sensing device), and may correlate the obtained information on the second item with the integrated storage area.

According to an embodiment of the present disclosure, the processor 210 may perform user authentication using a sensor (e.g., a biometric sensor) according to an input for payment for (or purchase of) the first item and the second item, and may perform payment for the first item and the second item when the user authentication is successfully performed.

The communication module 220 may have a configuration equal or similar to that of the communication interface 170 of FIG. 1. The communication module 220 may include, for example, the cellular module 221, a Wi-Fi module 223, a Bluetooth module 225, a GNSS module 227, an NFC module 228, and an RF module 229. The cellular module 221 may provide, for example, a voice call, a video call, a text message service, an Internet service, or the like through a communication network. The cellular module 221 may identify or authenticate the electronic device 201 in a communication network using a SIM (e.g., the SIM 224). The cellular module 221 may perform at least some of the functions that the processor 210 may provide. The cellular module 221 may include a CP. At least some (two or more) of the cellular module 221, the Wi-Fi module 223, the Bluetooth module 225, the GNSS module 227, and the NFC module 228 may be included in a single integrated circuit (IC) or IC package. The RF module 229 may transmit/receive, for example, a communication signal (e.g., an RF signal). The RF module 229 may include, for example, a transceiver, a power amplifier module (PAM), a frequency filter, a low noise amplifier (LNA), at least one antenna, and the like. At least one of the cellular module 221, the Wi-Fi module 223, the BT module 225, the GNSS module 227, and the NFC module 228 may transmit/receive an RF signal through a separate RF module. The SIM 224 may include, for example, a card that includes an embedded SIM, and may contain unique identification information (e.g., an integrated circuit card identifier (ICCID)) or subscriber information (e.g., an international mobile subscriber identity (IMSI)).

The memory 230 may include, for example, an embedded memory 232 or an external memory 234. The embedded memory 232 may include, for example, at least one of a volatile memory (e.g., a dynamic random access memory (DRAM), an a static random access memory (SRAM), a synchronous DRAM (SDRAM), and the like) and a non-volatile memory (e.g., a one-time programmable read only memory (OTPROM), a programmable read only memory (PROM), an erasable PROM (EPROM), an electrically erasable PROM (EEPROM), a mask ROM, a flash ROM, a flash memory, a hard drive, or a solid state drive (SSD)). The external memory 234 may include a flash drive, for example, a compact flash (CF) drive, a secure digital (SD) drive, a micro-SD drive, a mini-SD drive, an eXtreme digital (xD) drive, a multi-media card (MMC), a memory stick, and the like. The external memory 234 may be functionally or physically connected with the electronic device 201 through various interfaces.

The sensor module 240 may, for example, measure a physical quantity or detect an operating state of the electronic device 201 and may convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red, green, blue (RGB) sensor), a biometric sensor 240I, a temperature/humidity sensor 240J, an illumination sensor 240K, and an ultraviolet (UV) sensor 240M. Additionally or alternatively, the sensor module 240 may include, for example, an electronic nose (e-nose) sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling at least one sensor included therein. The electronic device 201 may further include a processor, which is configured to control the sensor module 240, as a part of the processor 210 or separately from the processor 210 in order to control the sensor module 240 while the processor 210 is in a reduced power or sleep state.

The input device 250 may include, for example, a touch panel 252, a (digital) pen sensor 254, a key 256, or an ultrasonic input device 258. The touch panel 252 may use, for example, at least one of a capacitive type, a resistive type, an infrared type, and an ultrasonic type. Furthermore, the touch panel 252 may further include a control circuit. The touch panel 252 may further include a tactile layer to provide a tactile reaction to a user. The pen sensor 254 may include, for example, a recognition sheet that is a part of, or separate from, the touch panel. The key 256 may include, for example, a physical button, an optical key, or a keypad. The ultrasonic input device 258 may detect ultrasonic waves, which are generated by an input tool, through a microphone 288 to identify data corresponding to the detected ultrasonic waves.

The display 260 may include a panel 262, a hologram device 264, a projector 266, or a control circuit for controlling the same. The panel 262 may be implemented to be, for example, flexible, transparent, or wearable. The panel 262, together with the touch panel 252, may be configured as one or more modules. The panel 262 may include a pressure sensor (or a force sensor) which may measure a strength of pressure of a user's touch. The pressure sensor may be implemented to be integrated with the touch panel 252 or may be implemented as one or more sensors separate from the touch panel 252. The hologram device 264 may show a three dimensional image in the air by using an interference of light. The projector 266 may display an image by projecting light onto a screen. The screen may be located, for example, in the interior of, or on the exterior of, the electronic device 201. The interface 270 may include, for example, an HDMI 272, a USB 274, an optical interface 276, or a D-subminiature (D-sub) connector 278. The interface 270 may be included in, for example, the communication interface 170 illustrated in FIG. 1. Additionally or alternatively, the interface 270 may, for example, include a mobile high-definition link (MHL) interface, SD/MMC interface, or an interface according to the Infrared Data Association (IrDA) standard.

The audio module 280 may convert, for example, sound into an electrical signal, and vice versa. At least some elements of the audio module 280 may be included, for example, in the input/output interface 150 illustrated in FIG. 1. The audio module 280 may process sound information that is input or output through, for example, a speaker 282, a receiver 284, an earphone 286, the microphone 288, and the like.

The camera module 291 is a device capable of photographing a still image and a moving image. The camera module 291 may include one or more image sensors (e.g., a front sensor or a rear sensor), a lens, an image signal processor (ISP), or a flash (e.g., an LED or xenon lamp).

The power management module 295 may manage, for example, the power of the electronic device 201. The power management module 295 may include a power management integrated circuit (PMIC), a charger IC, or a battery gauge. The PMIC may use a wired and/or wireless charging method. Examples of a wireless charging method may include, for example, a magnetic resonance method, a magnetic induction method, an electromagnetic wave method, and the like. Additional circuits (e.g., a coil loop, a resonance circuit, a rectifier, and the like) for wireless charging may be further included. The battery gauge may measure, for example, the amount of charge remaining in the battery 296 and a voltage, current, or temperature while charging. The battery 296 may include, for example, a rechargeable battery and/or a solar battery.

The indicator 297 may display a particular state, for example, a booting state, a message state, a charging state, or the like of the electronic device 201 or a part (e.g., the processor 210) of the electronic device 201. The motor 298 may convert an electrical signal into a mechanical vibration and may generate a vibration, haptic effect, or the like. The electronic device 201 may include a mobile TV support device (e.g., a GPU) that can process media data according to a standard, such as digital multimedia broadcasting (DMB), digital video broadcasting (DVB), mediaFlo™, and the like. Each of the above-described component elements according to the present disclosure may be configured with one or more components, and the names of the corresponding component elements may vary based on the type of electronic device.

An electronic device according to the present disclosure may omit some elements, or may further include additional elements. Some elements may be coupled to constitute one object, but an electronic device may perform the same functions as those of the corresponding elements before being coupled to each other.

Figure 3:
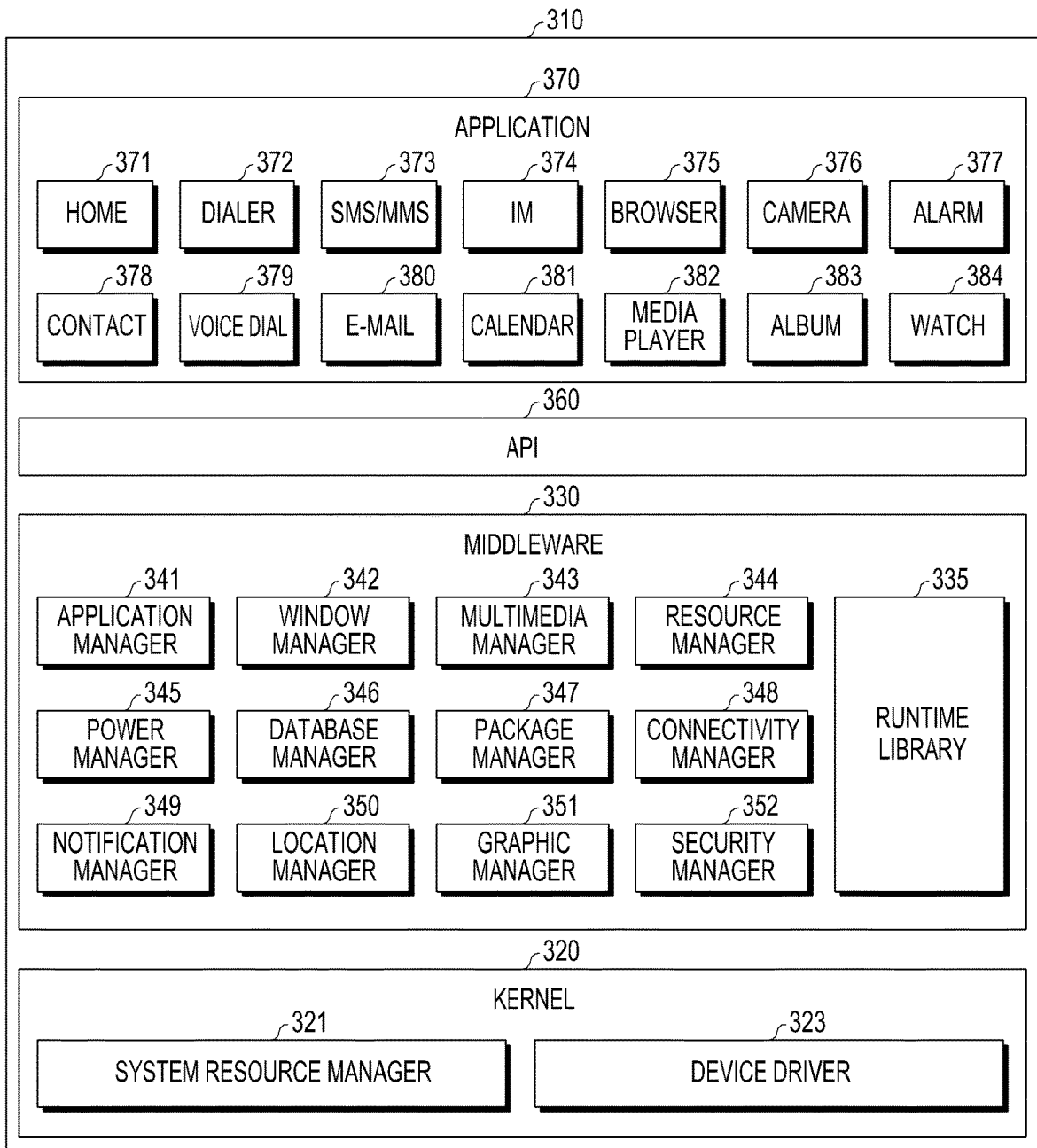
FIG. 3 is a block diagram of a program module according to an embodiment of the present disclosure.

FIG. 3 is a block diagram of a program module 310 according to an embodiment of the present disclosure. The program module 310 may include an OS that controls resources relating to an electronic device 101 or various applications 147 that are driven on the OS. The OS may include, for example, Android®, iOS®, Windows®, Symbian®, Tizen®, or Bada™.

Referring to FIG. 3, the program module 310 may include a kernel 320, middleware 330, an API 360, an application 370, or a location providing module. At least a part of the program module 310 may be preloaded on the electronic device, or may be downloaded from the first external electronic device 102, the second external electronic device 104, or the server 106.

The kernel 320 may include, for example, a system resource manager 321 or a device driver 323. The system resource manager 321 may control, allocate, or retrieve system resources. The system resource manager 321 may include a process manager, a memory manager, or a file system manager. The device driver 323 may include, for example, a display driver, a camera driver, a Bluetooth driver, a shared memory driver, a USB driver, a keypad driver, a Wi-Fi driver, an audio driver, or an inter-process communication (IPC) driver. The middleware 330 may provide, for example, a function required by the application 370 in common, or may provide various functions to the application 370 through the API 360 such that the application 370 can efficiently use limited system resources within the electronic device. The middleware 330 may include at least one of a runtime library 335, an application manager 341, a window manager 342, a multi-media manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses in order to add a new function through a programming language while the application 370 are being executed. The runtime library 335 may manage an input/output, manage a memory, or process an arithmetic function. The application manager 341 may manage, for example, life cycles of the application 370. The window manager 342 may manage graphical user interface (GUI) resources used for a screen. The multimedia manager 343 may recognize formats required for reproducing various media files and may encode or decode a media file using a codec suitable for a corresponding format. The resource manager 344 may manage source code of the application 370 or a space in memory. The power manager 345 may manage, for example, the capacity, temperature, or power of a battery, and may determine or provide power information required for operating an electronic device using corresponding information. The power manager 345 may interoperate with a basic input/output system (BIOS). The database manager 346 may, for example, generate, search, or change databases to be used by the application 370. The package manager 347 may manage the installation or update of an application that is distributed in the form of a package file.

The connectivity manager 348 may manage, for example, a wireless connection. The notification manager 349 may provide an event (e.g., an arrival message, an appointment, a proximity notification, or the like) to a user. The location manager 350 may manage, for example, location information of an electronic device. The graphic manager 351 may manage a graphic effect to be provided to a user and a user interface relating to the graphic effect. The security manager 352 may provide, for example, system security or user authentication. The middleware 330 may include a telephony manager for managing a voice or video call function of an electronic device or a middleware module that is capable of forming a combination of the functions of the above-described elements. The middleware 330 may provide an OS-specific module. Furthermore, the middleware 330 may dynamically remove some of the existing elements, or may add new elements. The API 360 is, for example, a set of API programming functions, and may be provided as different configurations depending on an OS. For example, one API set may be provided for each platform in the case of Android® or iOS®, and two or more API sets may be provided for each platform in the case of Tizen®.

The application 370 may include, for example, a home application 371, a dialer application 372, a short message service/multimedia messaging service (SMS/MMS) application 373, an instant messaging (IM) application 374, a browser application 375, a camera application 376, an alarm application 377, a contacts application 378, a voice dialing application 379, an e-mail application 380, a calendar application 381, a media player application 382, an album application 383, a watch application 384, health-care applications (e.g., an application for measuring exercise quantity or blood glucose), environmental information (e.g., atmospheric pressure, humidity, or temperature information) provision applications, and the like. The application 370 may include an information exchange application that can support exchange of information between an electronic device and an external electronic device. The information exchange application may include, for example, a notification relay application for relaying particular information to an external electronic device or a device management application for managing an external electronic device. For example, a notification relay application may relay notification information generated in other applications of an electronic device to an external electronic device, or may receive notification information from an external electronic device to provide the received notification information to a user. The device management application may install, delete, or update functions of an external electronic device that communicates with an electronic device (e.g., turning on/off an external electronic device (or some elements thereof) or adjusting a brightness (or resolution) of a display) or applications executed in an external electronic device. The application 370 may include applications (e.g., a health care application of a mobile medical appliance) that are designated according to attributes of an external electronic device. The application 370 may include applications received from an external electronic device.

At least some of the program module 310 may be implemented (e.g., executed) by software, firmware, hardware (e.g., the processor 210), or a combination of two or more thereof, and may include a module, a program, a routine, an instruction set, or a process for performing one or more functions.

Figure 4A:
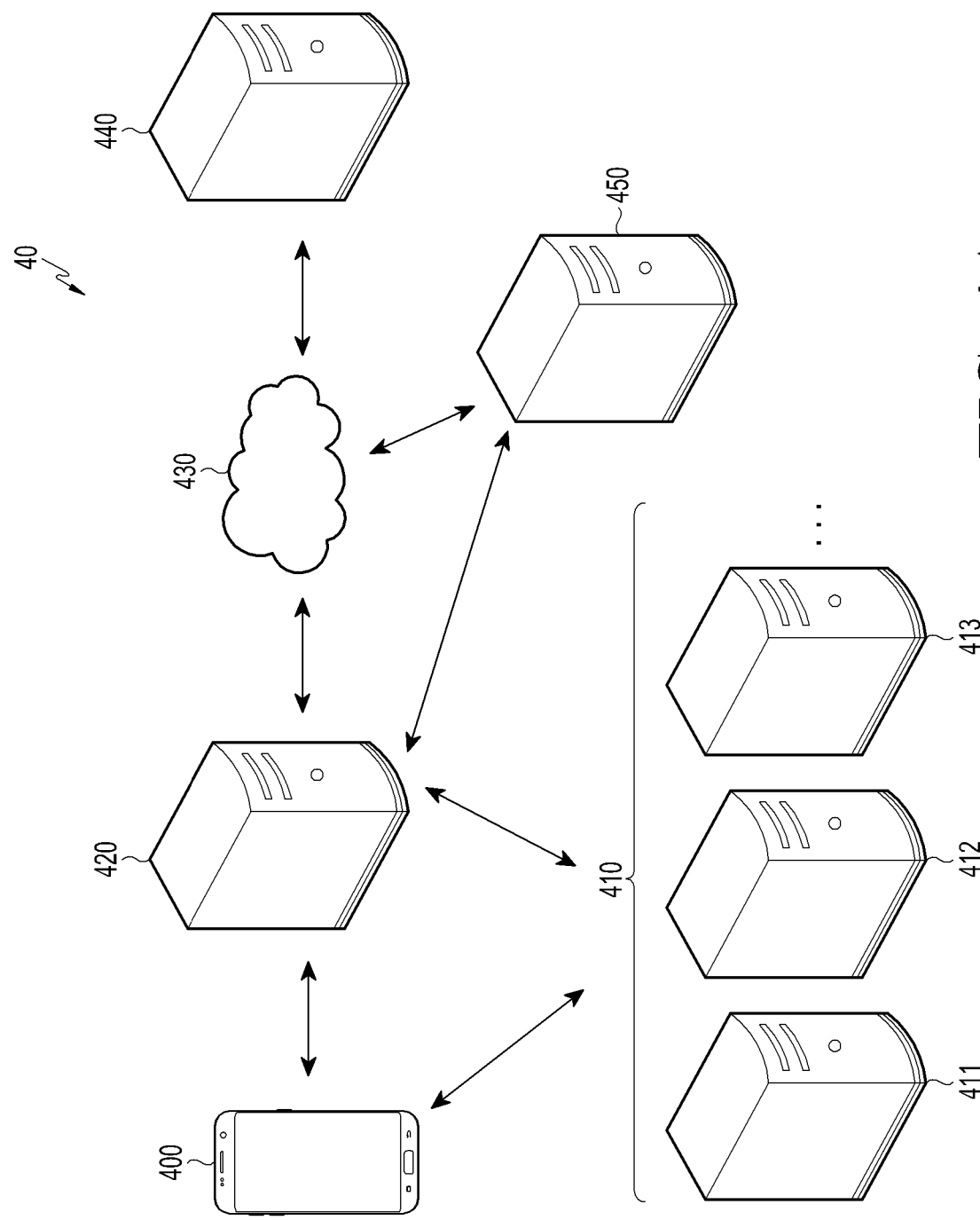
FIGS. 4A and 4B are illustrations of an electronic payment system according to an embodiment of the present disclosure.
Figure 4B:
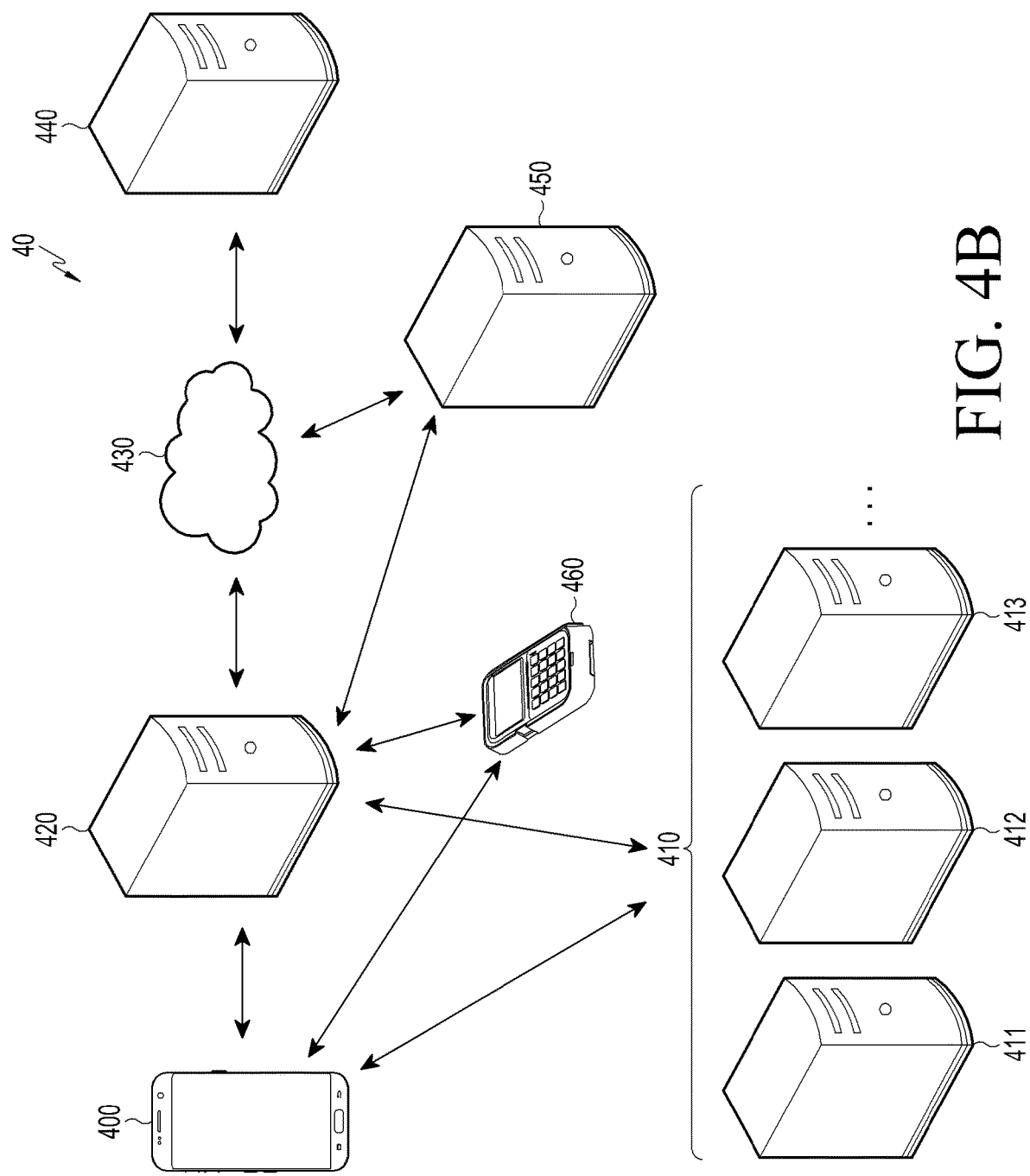

FIGS. 4A and 4B are illustrations of an electronic payment system 40 according to an embodiment of the present disclosure.

Referring to FIG. 4A, the electronic payment system 40 may include an electronic device 400, at least one seller server (or seller servers) 410 (e.g., a first seller server 411, a second seller server 412, a third seller server 413, . . . ), an external server 420, a payment network 430, a financial server 440, and a purchase server 450. For example, the at least one seller server 410 may be an external electronic device corresponding to an online shopping mall.

According to an embodiment of the present disclosure, the electronic device 400 may access the first seller server 411, and may correlate information on a first item obtained from the first seller server 411 with an integrated storage area. The first item may correspond to at least one product (e.g., a first online item) that a first online shopping mall desires to sell. For example, the integrated storage area corresponds to user account information, and may be included in a memory of the electronic device 400 or a memory of the external server 420.

When the integrated storage area is included in the memory of the electronic device 400, the electronic device 400 may store the obtained information on the first item in the integrated storage area included in the memory of the electronic device 400 or the memory of the external server 420.

When the integrated storage area is included in the memory of the external server 420, the electronic device 400 may transfer, to the first seller server 411, a request for storing the information on the first item in the integrated storage area, and may request a security value (e.g., a random number) from the external server 420 when a request for user account information is received from the first seller server 411. The security value may be used for determining whether the request is from the electronic device 400.

The external server 420 generates a security value, and transfers the security value to the electronic device 400. The electronic device 400 that receives the security value may transfer, to the first seller server 411, a response including user account information (e.g., user identification (ID) or the like) together with the security value. The first seller server 411 may transfer a request including information on the first item, the security value, and the user account information to the external server 420, and the external server 420 may compare the received security value and a previously stored security value, and may store the information on the first item in an integrated storage area corresponding to the user account information when the comparison result shows that the security values are identical. When the received security value and the previously stored security value are different from each other, the external server 420 may disregard the request received from the first seller server 411.

According to an embodiment of the present disclosure, the electronic device 400 transfers, to the first seller server 411, a request for storing the information on the first item in the integrated storage area, and, when a request for user account information is received from the first seller server 411, the electronic device 400 may transfers a response including the user account information to the first seller server 411.

According to an embodiment of the present disclosure, the electronic device 400 requests the information on the first item from the first seller server 411, and, when the information on the first item is received from the first seller server 411 in response to the request, the electronic device 400 may transfer information on the first item together with user account information to the external server 420.

According to an embodiment of the present disclosure, the external server 420 may transfer, to the electronic device 400, information indicating that the information on the first item is stored in the integrated storage area. The electronic device 400 that receives the information may request information on the integrated storage area from the external server 420. When the information on the integrated storage area is received from the external server 420 in response to the request, the electronic device 400 may display the information on the integrated storage area on a display.

According to an embodiment of the present disclosure, the electronic device 400 may access the second seller server 412, and may store information on a second item obtained from the second seller server 412 in the integrated storage area. The second item may correspond to at least one product (e.g., a second online item) that a second online shopping mall desires to sell. For example, the electronic device 400 may store the obtained information on the second item in the integrated storage area.

According to an embodiment of the present disclosure, the electronic device 400 may provide an interface (or a user interface) provided by at least one seller server 410. For example, the first seller server 411 may correspond to a first online shopping mall, the second seller server 412 may correspond to a second online shopping mall, and the third seller server 413 may correspond to a third online shopping mall. The interface may be a shopping mall webpage screen or a shopping application screen including information on at least one item. The information on at least one item may include graphic objects corresponding to the name, seller information, price information, item detail information, and the like associated with at least one item. In addition, the interface may include graphic objects corresponding to various functions. The various functions may include a function of setting purchase information, such as a quantity, a color, an option, or the like associated with at least one item to be purchased, a function of storing information on the at least one item in an integrated storage area, and a function of performing payment for the at least one item.

According to an embodiment of the present disclosure, the electronic device 400 may display, on a display, an interface (or user interface) corresponding to the integrated storage area.

According to an embodiment of the present disclosure, the electronic device 400 may obtain information on the integrated storage area from the external server 420, and may display an interface corresponding to the obtained information on the integrated storage area on the display.

According to an embodiment of the present disclosure, the electronic device 400 may perform user authentication using biometric authentication information (e.g., a fingerprint image, an iris image, a facial image, voice, or the like) according to an input for payment for a first item and a second item correlated with an integrated storage area.

According to an embodiment of the present disclosure, the electronic device 400 may provide an interface for obtaining biometric authentication information of a user, and may compare obtained biometric authentication information with previously stored biometric authentication information when the biometric authentication information is obtained through a sensor to determine whether those biometric authentication information correspond to the identical user. When it is determined that those biometric authentication information correspond to the identical user, the electronic device 400 may generate first payment information for the first item and second payment information for the second item. For example, the electronic device 400 may generate a cryptogram using a token stored in a secure area (e.g., embedded secure element (eSE), trusted execution environment (TEE), or the like) of the memory, and may generate payment information including the token, the cryptogram, or the like. The token includes a random number corresponding to information (e.g., a primary account number (PAN)) on a payment means, and may be issued from the external server 420 for payment or a token server (e.g., a token service provider (TSP)) to be provided to the electronic device 400.

The electronic device 400 may transfer the first payment information for the first item to the first seller server 411, and may transfer the second payment information for the second item to the second seller server 412.

According to an embodiment of the present disclosure, the electronic device 400 may display, on the display, a cart including first product information corresponding to a first product associated with a first external electronic device, and second product information corresponding to a second product associated with a second external electronic device. For example, the first external electronic device is associated with a first seller who sells the first product, and the second external electronic device is associated with a second seller who sells the second product.

When a purchase input associated with the cart is obtained, the electronic device 400 may perform user authentication using a biometric sensor (e.g., a fingerprint sensor, an iris sensor, and the like) contained in the electronic device 400 (or an external electronic device) in response to the purchase input. When the user authentication is successfully performed, the electronic device 400 may obtain a token from a secure memory contained in the electronic device 400, and may generate first payment information corresponding to the first product information and second payment information corresponding to the second product information using the obtained token. For example, the token may be received from a third external electronic device (e.g., a TSP) that issues a token for payment.

According to an embodiment of the present disclosure, the electronic device 400 may generate the first payment information using first identification information corresponding to the first product information, as at least a part of generating the first payment information, and may generate the second payment information using second identification information corresponding to the second product information, as at least a part of generating the second payment information.

According to an embodiment of the present disclosure, the electronic device 400 may generate first user authentication result information corresponding to the first product information and second user authentication result information corresponding to the second product information, based on user authentication information. The electronic device 400 may generate the first payment information using the first user authentication result information as at least a part of the generation of the first payment information, and may generate the second payment information using the second user authentication result information as at least a part of the generation of the second payment information.

The electronic device 400 may transfer the generated first payment information to the first external electronic device, and may transfer the generated second payment information to the second external electronic device.

According to an embodiment of the present disclosure, the electronic device 400 may generate a plurality of pieces of payment information, which includes first payment information and second payment information, and corresponds to a number of external electronic devices related to a plurality of pieces of product information including first product information and second product information included in a cart.

According to an embodiment of the present disclosure, when information on a third product (e.g., an offline product) which may be purchased from an offline shop is included in a plurality of pieces of product information, the electronic device 400 may transfer third payment information for the third product to a third external electronic device (e.g., a POS) located in the vicinity of the electronic device 400 using a short-range communication module included in the electronic device 400.

According to an embodiment of the present disclosure, the electronic device 400 may recognize the third product existing outside the electronic device 400 using a sensing device included in the electronic device 400, and may obtain third product information on the third product. For example, the electronic device 400 may recognize a recognizable code (e.g., a bar code, a quick response (QR) code, and the like) attached to the offline product, and may obtain product information on the offline product.

According to an embodiment of the present disclosure, the electronic device 400 may receive the third product information from the third external electronic device (e.g., an online shopping mall).

According to an embodiment of the present disclosure, the first seller server 411 that receives the first payment information may perform payment for the first item based on the first payment information, and the second seller server 412 that receives the second payment information may perform payment for the second item based on the second payment information. For example, the first seller server 411 may transfer the first payment information to the purchase server 450, and the purchase server 450 may transfer the first payment information to the payment network 430. The payment network 430 may transfer the first payment information to the external server 420 in order to determine whether the first payment information received from the purchase server 450 is a valid payment attempt. The external server 420 that receives the first payment information compares a token included in the received first payment information and a stored token to determine whether the tokens are identical. The external server 420 may include a token server for generating and storing a token, and the token server may compare a stored token and a received token to determine whether the tokens are identical. When the two tokens are identical, the external server 420 may identify payment means information (e.g., card information (e.g., a PAN)) corresponding to the token, and transfer the identified payment means information to the payment network 430. The payment means information may include a type, a number, a security number, and the like associated with a payment means (e.g., a credit card).

The payment network 430 may transfer, to the financial server 440, a payment request including the first payment information together with the received payment means information, and the financial server 440 that receives the payment request may determine whether to approve payment using the payment means information and/or the first payment information. For example, the financial server 440 compares the payment means information stored in the financial server 440 and the received payment means information, may approve payment when they are identical to each other, and may reject payment when they are different from each other.

The financial server 440 may transfer a payment response including a payment approval result (e.g., approve or reject) to the payment network 430, and the payment network 430 may transfer the received payment approval result to the external server 420. The external server 420 that receives the payment approval result may transfer the received payment approval result to the electronic device 400, and the electronic device 400 may display, on the display (or a touch screen), an interface indicating the received payment approval result. For example, the interface may be a payment application screen including information indicating a payment approval result. The information indicating the payment approval result may be displayed as at least one of a notification, an indicator, a state bar, a task bar, an icon, a floating icon, a tile, and a widget. In addition, the information indicating the payment approval result may be displayed on at least one of a home screen, a lock screen, and a bent display.

Referring to FIG. 4B, the electronic payment system 40 may include the electronic device 400, the at least one seller server 410 (e.g., the first seller server 411, the second seller server 412, the third seller server 413, . . . ), the external server 420, the payment network 430, the financial server 440, the purchase server 450, and an external electronic device 460 (e.g., a POS).

According to an embodiment of the present disclosure, each element of the electronic payment system 40 may equally perform at least a part of the operation of each element illustrated in FIG. 4A.

According to an embodiment of the present disclosure, the electronic device 400 may access the first seller server 411 using a first communication scheme, and may correlate information on a first item obtained from the first seller server 411 with an integrated storage area. The first communication scheme may be a wireless communication scheme.

According to an embodiment of the present disclosure, the electronic device 400 may obtain information on a second item outside the electronic device 400 using a sensor (or a sensing device) (e.g., a camera or a barcode reader) included in the electronic device 400, and may correlate the obtained information on the second item with an integrated storage area. For example, the integrated storage area includes (e.g., stores) both information on the first item and information on the second item. The second item may be a product (e.g., an offline item) sold by an offline shop.

For example, the electronic device 400 may store information on the second item in an integrated storage area included in a memory of the electronic device 400, or may transfer the information on the second item to the external server 420 to store the same in an integrated storage area included in a memory of the external server 420.

According to an embodiment of the present disclosure, the electronic device 400 may recognize the second item through a recognition code such as a barcode, a QR code, and the like attached to the second item, using a sensor, search for an online shopping mall that sells the recognized second item, and receive information on the second item from a seller server of the retrieved online shopping mall. In this case, the electronic device 400 may transfer, to the seller server 410, a request for storing information on the second item in the integrated storage area of the external server 420. When a request for user account information is received from the seller server, the electronic device 400 may request a security value from the external server 420, and may transfer the user account information and the security value to the seller server when the requested security value is received from the external server 420. The seller server transfers, to the external server 420, information on the second item together with the received user account information and the security value. The external server 420 that receives the same may compare the received security value and a previously stored security value, and may store information on the second item in the integrated storage area corresponding to the user account information when the security values are identical. When the received security value and the previously stored security value are different from each other, the external server 420 may disregard the request received from the seller server.

According to an embodiment of the present disclosure, the electronic device 400 may perform user authentication using a sensor (e.g., a biometric sensor) included in the electronic device 400 according to an input for payment for (or purchase of) the first item and the second item.

When the user authentication is successfully performed, the electronic device 400 may generate first payment information corresponding to the first item and second payment information corresponding to the second item using a token stored in a secure area of the memory of the electronic device 400. For example, the payment information may include a token, a cryptogram, a part of PAN information, a token expiration date, and the like.

The electronic device 400 may transfer the first payment information for the first item to the first seller server 411, and may transfer the second payment information for the second item to the external electronic device 460 (e.g., a POS).

According to an embodiment of the present disclosure, the electronic device 400 may sense the proximity of the external electronic device 460 through a communication module (e.g., a magnetic secure transmission (MST) module or/and an NFC module), and may perform communication (e.g., bilateral communication) with the external electronic device 460. The electronic device 400 may transfer payment means information in addition to the second payment information to the external electronic device 460.

According to an embodiment of the present disclosure, the first seller server 411 may perform payment for the first item based on the first payment information, and the external electronic device 460 may perform payment for the second item based on the second payment information.

According to an embodiment of the present disclosure, the external electronic device 460 may transfer the second payment information to the purchase server 450, and the purchase server 450 may transfer the second payment information to the payment network 430. The payment network 430 may transfer the second payment information to the external server 420 in order to determine whether the second payment information received from the purchase server 450 is a valid payment attempt. The external server 420 that receives the second payment information compares a token included in the received second payment information and a stored token to determine whether the tokens are identical. When the two tokens are identical, the external server 420 may identify payment means information corresponding to the token, and transfer the identified payment means information to the payment network 430.

The payment network 430 may transfer, to the financial server 440, the second payment information together with the received payment means information, and the financial server 440 may determine whether to approve payment using the payment means information and/or the second payment information.

The financial server 440 may transfer a payment response including a payment approval result (e.g., approve or reject) to the payment network 430, and the payment network 430 may transfer the received payment approval result to the external server 420. The external server 420 may transfer the received payment approval result to the electronic device 400 and the external electronic device 460. The electronic device 400 may display an interface indicating the received payment approval result on a display (or a touch screen), and the external electronic device 460 may display information on the received payment approval result on the display.

According to an embodiment of the present disclosure, when a request for at least one item correlated with the integrated storage area is received, the electronic device 400 may determine whether information on an offline item is included in the integrated storage area.

When an offline item is included in the integrated storage area, the electronic device 400 may generate first payment information corresponding to an online item (e.g., a first item), and may generate second payment information corresponding to an offline item (e.g., a second item). The electronic device 400 may transfer the generated first payment information to the first seller server 411, and transfer the second payment information to the external electronic device 460. The first seller server 411 that receives the first payment information performs payment for the first item, and the external electronic device 460 that receives the second payment information may perform payment for the second item.

When the offline item is not included in the integrated storage area, the electronic device 400 may generate payment information corresponding to at least one item, and may transfer the generated payment information to the seller server 410. The seller server 410 may perform payment for at least one item.

According to an embodiment of the present disclosure, the electronic device 400 may perform offline payment for at least a part of the at least one online item stored in the integrated storage area. For example, the electronic device 400 obtains information on an offline item, payment for which is desired, through a sensor, and identifies information on an online item that is identical to the received information on the offline item from among online items stored in the integrated storage area. The electronic device 400 deletes the identified information on the online item, and stores the obtained information on the offline item in the integrated storage area. The electronic device 400 generates payment information for the offline item stored in the integrated storage area, transfers the generated payment information to the external electronic device 460, and may perform payment for the offline item through the external electronic device 460.

According to an embodiment of the present disclosure, the electronic device 400 may perform online payment for at least a part of the at least one offline item stored in the integrated storage area. For example, the electronic device 400 searches for at least one online shopping mall that sells an offline item, online payment for which is desired, accesses a seller server of the at least one retrieved online shopping mall, and obtains information on an online item corresponding to the offline item from the at least one seller server. For example, when information on a plurality of online items are obtained, the electronic device 400 may provide an interface for selecting one of the plurality of online items or may select one of the plurality of online items based on a predetermined condition.

The electronic device 400 stores the obtained information on the online item in the integrated storage area, generates payment information for the corresponding online item, and transfers the generated payment information to the seller server such that online payment is performed through the seller server.

According to plurality of online items, a user may store information on at least one online product in the integrated storage area using the electronic device 400, such as a smart phone, a TV, a PC, or the like, and may visit an offline shop that sells the corresponding online product such that the user identifies an offline product corresponding to the online product. For example, when the user stores information on at least one online product in the integrated storage area, the electronic device 400 may provide information on an offline shop that sells the online product.

The user who visits the shop may determine an online product to be purchased from the offline shop, from among online products correlated with the integrated storage area, by considering prices, and taking into consideration whether quality is satisfied, necessity, or the like. When the user desires to purchase at least a part of online products offline, the electronic device 400 obtains information on an offline product that the user desires to purchase using a sensor or a barcode reader, and transfers the obtained information and payment information to a POS device at the shop, thereby proceeding with offline payment.

The electronic device 400 may inquire of a user about payment for the remaining online items excluding an online item corresponding to the offline item that is paid for from among online items correlated with the integrated storage area. For example, the electronic device 400 may display, on a display, an interface for inquiring about payment for the online items. When the user desires payment for the remaining online items, the electronic device 400 may transfer payment information to a seller server, and may perform online payment.

According to plurality of online items, when an offline shop includes an offline product display stand where offline products are arranged, and an online product display stand using a display device providing augmented reality (AR), virtual reality (VR), or mixed reality (MR) to provide information on online products, a user selects an offline product from the offline product display stand and puts the same into a cart, and receives information on an online product from the display device of the online display stand by the electronic device 400 to store the same in the integrated storage area. When the user desires to perform payment for the offline product in the cart and the online product correlated with the integrated storage area, the electronic device 400 generates first payment information for the offline product and second payment information for the online product, transfers the first payment information to a seller server corresponding to the online product, and transfers the second payment information to a POS device in the shop, thereby performing online/offline payment.

Figure 5:
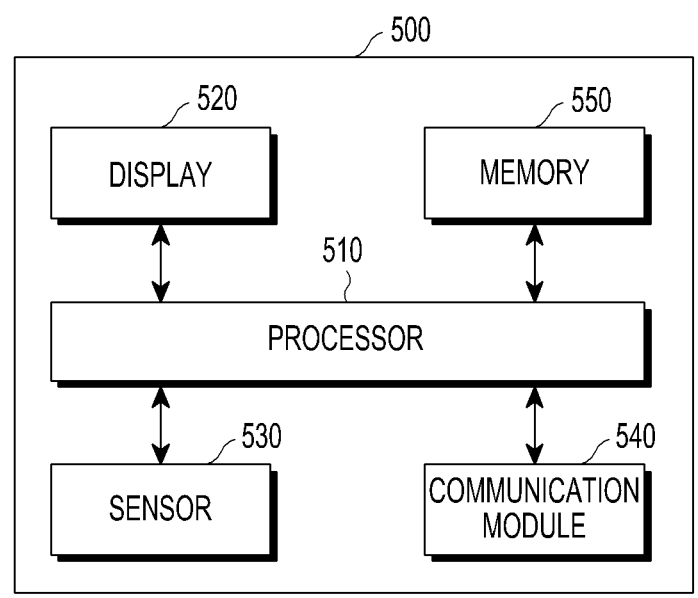
FIG. 5 is a block diagram of an electronic device according to an embodiment of the present disclosure.

FIG. 5 is a block diagram of an electronic device 500 according to an embodiment of the present disclosure.

Referring to FIG. 5, the electronic device 500 may include a processor 510, a display 520, a sensor 530, a communication module 540, and a memory 550.

According to an embodiment of the present disclosure, the electronic device 500 (or the processor 510) may equally perform at least a part of the operations of the electronic device 400 which is described above with reference to FIGS. 4A and 4B.

According to an embodiment of the present disclosure, the processor 510 accesses a plurality of seller servers through the communication module 540, and may obtain information on a plurality of items from the accessed seller servers. The processor 510 may store obtained information on a plurality of items in an integrated storage area of the memory 550, or may transfer the same to a plurality of seller servers to store the same in an integrated storage area of a memory of the external server 420.

When an input for payment for a plurality of items correlated with the integrated storage area is received, the processor 510 performs user authentication, and generates payment information for the plurality of items based on a user authentication result. For example, when user authentication is successfully performed, the processor 510 may generate a cryptogram using a token issued from the external server 420. The cryptogram may include at least one of information indicating a user authentication result, token information, additional information on payment (e.g., a date, a time, or the like), an identifier, and the like.

The processor 510 may transfer generated payment information corresponding to a plurality of items to a plurality of seller servers, and may perform payment for the plurality of items.

According to an embodiment of the present disclosure, the processor 510 may display, on the display 520, interfaces provided by a plurality of seller server.

According to an embodiment of the present disclosure, when a first input is received, the processor 510 may display a first interface provided by the first seller server 411 on the display 520. The first input may include a user input (e.g., a touch input or the like) for displaying an online shopping mall webpage provided by the first seller server 411, or for executing an online shopping application. In addition, the first interface may include an online shopping mall webpage provided by the first seller server 411 or an online shopping application screen. The online shopping mall webpage or the online shopping application screen may include graphic objects (e.g., an icon, a menu, a button, an image, a text, or the like) corresponding to information on a first item, and a first graphic object corresponding to a function for storing the information on the first item in the integrated storage area.

According to an embodiment of the present disclosure, when a second input is received, the processor 510 may perform an operation for storing the information on the first item in the integrated storage area. For example, the second input may include a user input (e.g., a touch input) for selecting the first graphic object.

For example, the processor 510 may transfer a request signal for storing the information on the first item in the integrated storage area to the first seller server 411 through the communication module 540. When a request signal for requesting user account information is received from the first seller server 411, the processor 510 may transfer, to the external server 420, a request signal for requesting a security value of the electronic device 500. When a response signal including the security value is received from the external server 420, the processor 510 may transfer a response signal including the user account information and the security value to the first seller server 411. When information on the integrated storage area is received from the external server 420, the processor 510 may display, on the display 520, an interface corresponding to the information on the integrated storage area. For example, the interface may be a webpage screen or an application screen including graphic objects corresponding to information on at least one item stored in the integrated storage area.

According to an embodiment of the present disclosure, when a third input is received through the display 520, the processor 510 may display a second interface provided by the second seller server 412 on the display 520. For example, the third input may include an input for displaying an online shopping mall webpage provided by the second seller server 412 or an input for executing an online shopping mall application. In addition, the second interface may include an online shopping mall web page provided by the second seller server 412 or an online shopping application screen. The online shopping mall webpage or the online shopping application screen may include graphic objects corresponding to information on the first item, and a second graphic object (e.g., an icon, a button, or the like) corresponding to a function for storing the second item in the integrated storage area.

According to an embodiment of the present disclosure, when a fourth input is received, the processor 510 may perform an operation for storing the information on the second item in the integrated storage area. For example, the fourth input may include a user input (e.g., a touch input) for selecting the second graphic object.

For example, the processor 510 may transfer a request signal for storing the information on the second item in the integrated storage area to the second seller server 412 through the communication module 540. When a request signal for requesting user account information is received from the second seller server 412, the processor 510 may transfer, to the external server 420, a request signal for requesting a security value of the electronic device 500. When a response signal including the security value is received from the external server 420, the processor 510 may transfer a response signal including the user account information and the security value to the second seller server 412. When information on the integrated storage area is received from the external server 420, the processor 510 may display, on the display 520, an interface corresponding to the information on the integrated storage area. For example, the interface may be a webpage screen or an application screen including graphic objects corresponding to information on at least one item stored in the integrated storage area.

According to an embodiment of the present disclosure, when an input for requesting payment for the first item and the second item correlated with the integrated storage area is received, the processor 510 may perform user authentication based on biometric authentication information of a user, and may generate payment information for the first item and the second item when the user authentication is successfully performed.

For example, the processor 510 may obtain the biometric authentication information of the user through a sensor 530 (e.g., a fingerprint sensor, an iris sensor, a camera, and the like), and may perform user authentication based on the obtained biometric authentication information. The processor 510 may compare the obtained biometric authentication information and biometric authentication information of the user of the electronic device 500 which is previously stored in the memory 550 to determine whether those biometric authentication information correspond to the identical user. When the comparison result shows that those biometric authentication information correspond to the identical user, the processor 510 generates the first payment information corresponding to the first item and the second payment information corresponding to the second item, based on security information. When the comparison result shows that those biometric authentication information correspond to different users, the processor 510 may terminate a payment operation.

According to an embodiment of the present disclosure, the processor 510 may generate, using a token, the first payment information including at least one of authentication result information, token information, additional information on payment (e.g., payment meta data), and first identification information, and may generate the second payment information including at least one of authentication result information, token information, payment meta data, and second identification information.

According to an embodiment of the present disclosure, the processor 510 may generate first payment information using first identification information corresponding to a first item, as at least a part of the generation of the first payment information, and may generate second payment information using second identification information corresponding to a second item, as at least a part of the generation of the second payment information.

According to an embodiment of the present disclosure, the electronic device 500 may generate first user authentication result information corresponding to a first item and a second user authentication result information corresponding to a second item, based on user authentication information. The electronic device 500 may generate first payment information using first user authentication result information as at least a part of the generation of the first payment information, and may generate second payment information using second user authentication result information as at least a part of the generation of the second payment information.

According to an embodiment of the present disclosure, the processor 510 may transfer a first payment request signal including the generated first payment information to the first seller server 411, and may transfer a second payment request signal including the generated second payment information to the second seller server 412. The processor 510 may transfer the first payment request signal and the second payment request signal to a payment server.

In response to a first payment request signal, the processor 510 may receive a payment approval result associated with first and second items from the external server 420. The processor 510 may display an interface indicating a payment approval result on the display 520. For example, the interface may be a payment application screen including information indicating the payment approval result. The processor 510 may display the information on the payment approval result as at least one of a notification, an indicator, a state bar, a task bar, an icon, a floating icon, a tile, and a widget. The processor 510 may display information on the payment approval result on at least a partial area of at least one of a home screen, a lock screen, and a bent display.

According to an embodiment of the present disclosure, the processor 510 may access the first seller server 411 using a first communication scheme, and correlate information on a first item obtained from the first seller server 411 with the integrated storage area. The first communication scheme may be a wireless communication scheme.

According to an embodiment of the present disclosure, the processor 510 may obtain information on a second item using the sensor 530, and correlate the obtained information on the second item with the integrated storage area.

According to an embodiment of the present disclosure, the processor 510 may perform user authentication using the sensor 530 (e.g., a biometric sensor) included in the electronic device 500 according to an input for payment for a first item and a second item. When the user authentication is successfully performed, the processor 510 may generate first payment information corresponding to the first item and second payment information corresponding to the second item using a token stored in a secure area of the memory 550. The processor 510 may transfer the first payment information for the first item to the first seller server 411 according to a first communication scheme, and may transfer the second payment information for the second item to the external electronic device 460 (e.g., a POS) according to a second communication scheme. For example, the second communication scheme may be short-range communication, such as MST or NFC communication. When a payment approval result is received from the external server 420, the processor 510 may display, on the display 520, an interface corresponding to the information on the payment approval result.

According to an embodiment of the present disclosure, the processor 510 may obtain information on the second item through the sensor 530 (e.g., a camera). For example, the processor 510 may recognize a recognition code, such as a barcode or the like, through the sensor 530, and may obtain information on the second item corresponding to the recognized recognition code.

According to an embodiment of the present disclosure, the processor 510 may sense the external electronic device 460, and may perform short-range communication with the sensed external electronic device 460 to receive information on the second item from the external electronic device 460. For example, the external electronic device 460 may obtain the information on the second item corresponding to a barcode recognized through a sensor (e.g., a barcode reader) included in the external electronic device 460, and may transfer the obtained information on the second item to the electronic device 500.

According to an embodiment of the present disclosure, when information on a third item (e.g., an offline product) that may be purchased from an offline shop is included in information on a plurality of items stored in the integrated storage area, the processor 510 may transfer third payment information corresponding to the third item to the external electronic device 460 located around the electronic device 500.

According to an embodiment of the present disclosure, the processor 510 may recognize the third item existing outside the electronic device 500 through the sensor 530, and may obtain information on the third item.

According to an embodiment of the present disclosure, the electronic device 500 may receive the information on a third item from the third seller server 413. For example, the third seller server 413 may be a seller server related to an online shop (e.g., an online shopping mall) that sells the third item.

According to an embodiment of the present disclosure, the processor 510 may display, on the display 520, an interface corresponding to the received information on the second item.

According to an embodiment of the present disclosure, when an input for storing the information on the second item in the integrated storage area is received, the processor 510 may request a security value from the external server 420 through the communication module 540, and may transfer the information on the second item and the security value received from the external server 420 to the external server 420. When information on the integrated storage area is received from the external server 420, the processor 510 may store the received information on the integrated storage area in the memory 550, or may display, on the display 520, an interface corresponding to the stored information.

According to an embodiment of the present disclosure, when an input for requesting payment for the first item and the second item correlated with the integrated storage area is received, the processor 510 may perform user authentication for a user of the electronic device 500, and may generate payment information for the first item and the second item when the user authentication is successfully performed.

For example, the processor 510 may obtain biometric authentication information of the user through a sensor (e.g., a fingerprint sensor, an iris sensor, a camera, and the like), and may compare obtained biometric authentication information and biometric authentication information of the user which is previously stored in the memory 550 to determine whether those biometric authentication information correspond to the identical user. When it is determined that the obtained biometric authentication information and the previously stored biometric authentication information correspond to the same user, the processor 510 may determine that user authentication is successfully performed, and may generate first payment information for the first item and second payment information for the second item.

According to an embodiment of the present disclosure, the processor 510 may transfer a first payment request signal including the generated first payment information to the first seller server 411 and may transfer a second payment request signal including the generated second payment information to the external electronic device 460, through the communication module 540. For example, the processor 510 may transfer, to the external electronic device 460, the second payment request signal including payment means information (e.g., credit card information) together with the second payment information.

When a first payment response signal including a payment approval result for the first item is received from the first seller server 411, and a second payment response signal including a payment approval result for the second item is received from the external electronic device 460, the processor 510 may display payment approval results for the first and second items on the display 520. For example, the processor 510 may display interfaces corresponding to the information on the payment approval results. When the payment is approved, the processor 510 displays information on the approval of payment. When the payment is rejected, the processor 510 may display information on the rejection of payment.

According to an embodiment of the present disclosure, the display 520 may display an interface provided by at least one seller server 410. For example, the display 520 may display an online shopping mall webpage screen, an online shopping application screen, and the like provided by the at least one seller server 410. The webpage screen or the application screen may include a graphic object for storing information on at least one item in the integrated storage area.

According to an embodiment of the present disclosure, the display 520 may display an interface for the integrated storage area including at least one item. For example, the interface may include information on the at least one seller server 410 (e.g., a name, a universal resource locator (URL), and the like), and information on at least one item (e.g., a name, a price, a quantity, an image, and the like).

According to an embodiment of the present disclosure, the display 520 may display an interface related to payment. For example, the interface may be a payment application screen. The payment application screen may include information on a payment means, information on a payment approval result, information on payment details, and the like.

According to an embodiment of the present disclosure, the display 520 may include a touch screen to receive an input (e.g., a touch, a drag, a swipe, a hovering input, and the like) provided by a part of a body such as a user's finger or the like or an input device such as a stylus or the like.

According to an embodiment of the present disclosure, the sensor 530 may obtain biometric authentication information (e.g., a fingerprint, an iris, a face, voice, and the like) associated with a user of the electronic device 500. For example, the sensor 530 may include at least one of a capacitive touch sensor, an optical sensor, an ultrasonic sensor (e.g., a fingerprint sensor, an iris sensor, and the like), and an image sensor (e.g., a camera module), and the like. The sensor 530 may include various sensors used for obtaining biometric authentication information, in addition to the above described sensors.

According to an embodiment of the present disclosure, the sensor 530 (e.g., a camera) may further include a sensing device for recognizing a recognition code, such as a barcode, a QR code, and the like.

According to an embodiment of the present disclosure, the communication module 540 may perform communication with at least one seller server 410, the external server 420, or the external electronic device 460. For example, the communication module 540 may include a short-range communication module (e.g., a BT module, a BLE module, a Wi-Fi module, an NFC module, and the like), and a cellular communication module.

According to an embodiment of the present disclosure, the memory 550 may store information used for storing, in the integrated storage area, information on at least one item sold online by the at least one seller server 410 and/or information on at least one item sold offline.

According to an embodiment of the present disclosure, the memory 550 may include a normal area and a secure area. The normal area may store at least one graphic object forming an interface, information on at least one item sold online or offline, or the like. The secure area may store biometric authentication information obtained through the sensor 530, a security value received from the external server 420, a token, and the like.

According to an embodiment of the present disclosure, the electronic device 500 may include a secure memory (e.g., the memory 550) for storing a token, a biometric sensor (e.g., the sensor 530), the communication module 540, and the processor 510. The processor 510 may display a cart including first product information corresponding to a first product correlated with a first external electronic device and second product information corresponding to a second product correlated with a second external electronic device, may obtain a purchase input for the cart, may perform user authentication using the biometric sensor in response to the purchase input, may obtain the token from the secure memory when the user authentication is successfully performed, may generate first payment information corresponding to the first product information and second payment information corresponding to the second product information by using the token, and may transmit the first payment information to the first external electronic device and transmit the second payment information to the second external electronic device, through the communication module.

According to an embodiment of the present disclosure, the processor 510 may generate a plurality of pieces of payment information, which includes the first payment information and the second payment information, and corresponds to the number of external electronic devices related to a plurality of pieces of product information including the first product information and the second product information included in the cart, as at least a part of the generation operation.

According to an embodiment of the present disclosure, a short-range communication module may be included, and when a third product which may be purchased from an offline shop is included in the plurality of pieces of product information, the processor 510 may transmit, through the short-range communication module, third payment information for the third product to a third external electronic device (e.g., a POS) in the vicinity of the electronic device 500.

According to an embodiment of the present disclosure, a sensing device (e.g., the sensor 530) may be included, and the processor 510 may recognize the third product existing outside the electronic device 500 using the sensing device, and may obtain third product information on the third product in response to the recognition.

According to an embodiment of the present disclosure, the third product information may be received from the third external electronic device (e.g., an online shopping mall).

According to an embodiment of the present disclosure, the processor 510 may generate third payment information corresponding to the third product information using the token, and may transmit the third payment information to a third external electronic device (e.g., an online shopping mall) correlated with the third product through the communication module 540.

According to an embodiment of the present disclosure, the communication module 540 may include a first communication module and a second communication module. The processor 510 may generate third payment information corresponding to the third product information using the token, may transmit the first payment information and the second payment information through the first communication module, and may transmit the third payment information through the second communication module.

According to an embodiment of the present disclosure, the first payment information may include user authentication result information, the token, and first identification information, and the second payment information may include user authentication result information, the token, and second identification information.

According to an embodiment of the present disclosure, before performing the displaying, the processor 510 may request the first external electronic device to transmit the first product information to the third external electronic device (e.g., Samsung Pay server or cloud cart server) and may request the second external electronic device to transmit the second product information to the third external electronic device, and may obtain the first product information and the second product information from the third external electronic device in response to a user input.

Figure 6:
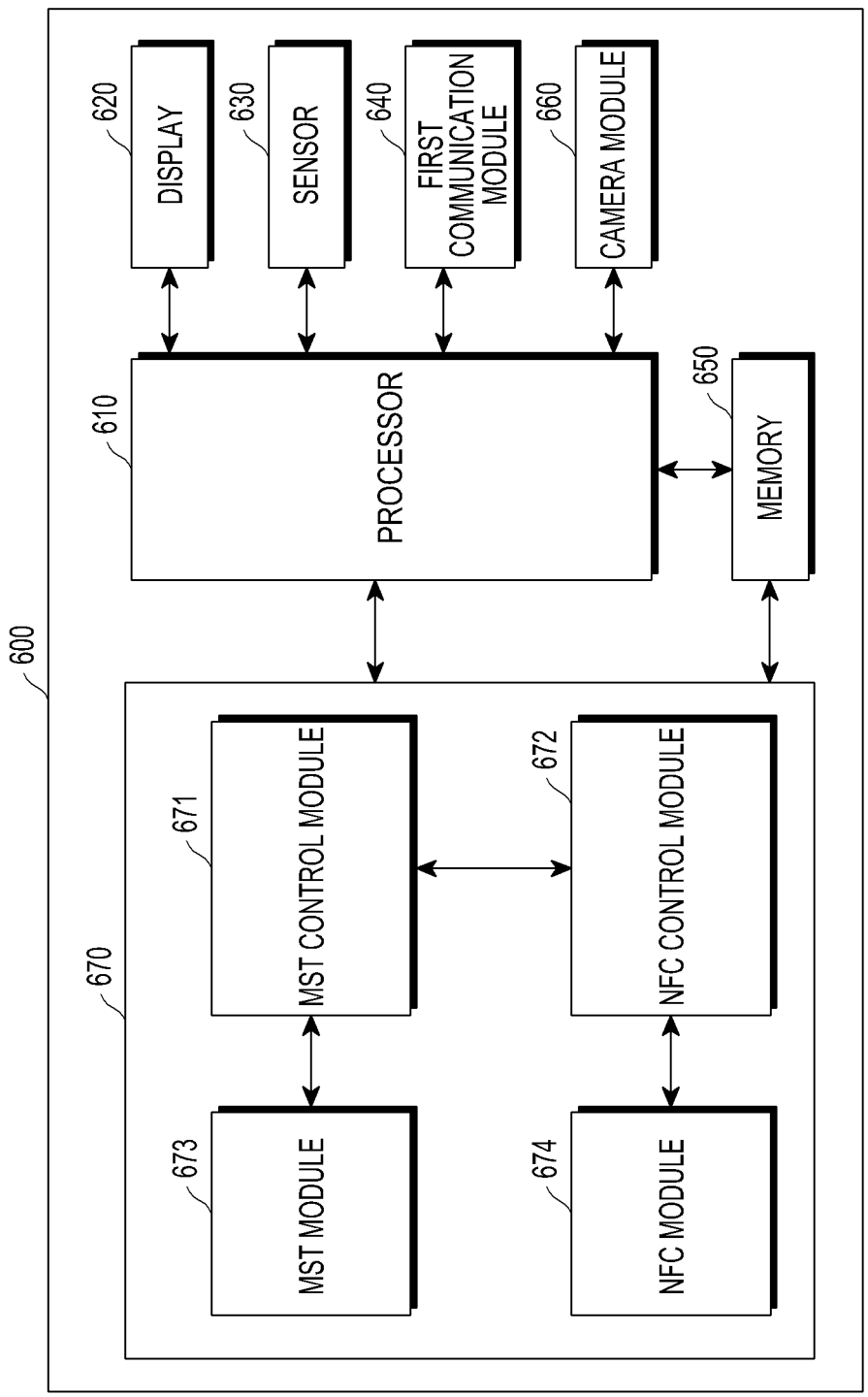
FIG. 6 is a block diagram of an electronic device according to an embodiment of the present disclosure.

FIG. 6 is a block diagram of an electronic device 600 according to an embodiment of the present disclosure.

Referring to FIG. 6, the electronic device 600 may include a processor 610, a display 620, a sensor 630, a first communication module 640, a memory 650, a camera module 660, and a second communication module 670. The elements of the electronic device 600 may equally perform at least a part of the operation of each element of the electronic device 500 described above with reference to FIG. 5. The electronic device 600 may be an electronic device that may be the same as at least a part of the electronic device 400 described above with reference to FIG. 4 and the electronic device 500 described above with reference to FIG. 5.

According to an embodiment of the present disclosure, the processor 610 accesses a plurality of seller servers through the first communication module 640, and may obtain information on a plurality of items from the accessed seller servers. The processor 610 may store the obtained information on the plurality of items in an integrated storage area of the memory 650, or may transfer the same to a plurality of seller servers to store the same in an integrated storage area of a memory of the external server 420.

When an input for payment for the plurality of items correlated with the integrated storage area is received, the processor 610 performs user authentication, and generates payment information for the plurality of items based on a user authentication result. For example, when the user authentication is successfully performed, the processor 610 may generate a cryptogram using a token issued from the external server 420. The cryptogram may include information indicating a user authentication result, token information, additional information on payment (e.g., a date, a time, and the like), an identifier, and the like.

The processor 610 may transfer the generated payment information corresponding to the plurality of items to the plurality of seller servers through the first communication module 640, and may perform payment for the plurality of items.

According to an embodiment of the present disclosure, the processor 610 may access the first seller server 411 through the first communication module 640, and may correlate information on the first item obtained from the first seller server 411 with the integrated storage area.

According to an embodiment of the present disclosure, the processor 610 may obtain information on the second item using the sensor 630, and may correlate the obtained information on the second item with the integrated storage area.

According to an embodiment of the present disclosure, the processor 610 may perform user authentication using the sensor 630 (e.g., a biometric sensor) included in the electronic device 600 according to an input for payment for the first item and the second item. When the user authentication is successfully performed, the processor 610 may generate first payment information corresponding to the first item and second payment information corresponding to the second item using a token stored in a secure area of the memory 650. The processor 610 may transfer the first payment information for the first item to the first seller server 411 through the first communication module 640, and may transfer the second payment information for the second item to the external electronic device 460 (e.g., a POS) through the second communication module 670. When a payment approval result is received from the external server 420, the processor 610 may display, on the display 620, an interface corresponding to the information on the payment approval result.

According to an embodiment of the present disclosure, the processor 610 may display, on the display 620, an interface provided by the at least one seller server 410, and may perform an operation for storing information on the first item provided by the first seller server 411 and information on the second item provided by the second seller server 412 in the integrated storage area.

According to an embodiment of the present disclosure, the processor 610 may obtain, through the sensor 630, information on the third item (e.g., an offline item) which is sold offline, and may perform an operation for storing the obtained information on the third item in the integrated storage area. For example, the processor 610 may recognize a recognition code, such as a barcode or the like, through the sensor 630 (e.g., a camera or a barcode reader), and may obtain information on the third item corresponding to the recognition code. In addition, the information on the third item obtained from a sensor (e.g., a camera or an IR sensor) contained in a display stand may be received from an external transmitting device (e.g., a beacon or the like) through short-range communication (e.g., Bluetooth, BLE, Zigbee, NFC, and the like). For example, the display stand may include at least one sensor that is capable of identifying a product selected by a user, and may transmit product information identified by the at least one sensor to the electronic device 600 through a transmitting device.

According to an embodiment of the present disclosure, when an input for requesting payment for the first, second, and third items correlated with the integrated storage area is received, the processor 610 may generate first payment information corresponding to the first item, second payment information corresponding to the second item, and third payment information corresponding to the third item. The processor 610 may transfer the first payment information to the first seller server 411 and may transfer the second payment information to the second seller server 412, through the first communication module 640. The processor 610 may transfer the third payment information to the external electronic device 460 through an MST module 673 and/or the NFC module 674.

When payment approval results for the first item, second item, and third item are received from the external server 420 through the first communication module 640, the processor 610 may display interfaces corresponding to the information on the received first, second, and third payment approval results on the display 620.

According to an embodiment of the present disclosure, when an input for requesting offline payment for at least a part of at least one online item correlated with the integrated storage area is received, the processor 610 may obtain information on a fourth item, offline payment for which is desired, through the sensor 630. The processor 610 may identify an online item that matches the information on the fourth item from among the at least one online item correlated with the integrated storage area, and may generate fourth payment information for the fourth item corresponding to the identified online item. The processor 610 may transfer a payment request signal including the fourth payment information to the external electronic device 460 through the MST module 673 and/or NFC module 674.

According to an embodiment of the present disclosure, the processor 610 may transfer the fourth payment information to the external electronic device 460 by simultaneously using the MST module 673 and the NFC module 674, in order to increase a recognition rate.

When a payment response signal including a payment approval result for the fourth item is received from the external electronic device 460, the processor 610 may display an interface corresponding to the information on the received payment approval result on the display 620. The interface may include graphic objects indicating at least a part of item information, date information, time information, and payment means information associated with approval of payment.

According to an embodiment of the present disclosure, the processor 610 may inquire about whether to perform online payment for the remaining items excluding the fourth item, and may or may not perform online payment for the remaining items based on a response to the inquiry.

For example, the processor 610 may display an interface for inquiring about whether to perform online payment for the remaining items excluding the fourth item. The interface may be a popup window including at least one graphic object for inquiring about whether to perform online payment. For example, the at least one graphic object may include text such as "Would you like to proceed with payment for a first item, a second item, and a third item?" or may include a first icon corresponding to approval of payment and a second icon corresponding to rejection of payment.

When an input for approving online payment is received, the processor 610 may generate first, second, and third payment information corresponding to the first, second, and third items, respectively, may transfer a first payment request signal including the generated first payment information to the first seller server 411, may transfer a second payment request signal including the generated second payment information to the second seller server 412, and may transfer a third payment request signal including the generated third payment information to the third seller server 413. When payment approval results associated with the first, second, and third items are received from the external server 420, the processor 610 may display, on the display 620, interfaces corresponding to the information on the payment approval results.

According to an embodiment of the present disclosure, the display 620 may display an interface provided by the at least one seller server 410, an interface associated with an integrated storage area including at least one item (e.g., an online item and an offline item), and an interface related to a payment function.

According to an embodiment of the present disclosure, the sensor 630 may obtain biometric authentication information (e.g., fingerprint information, iris information, facial information, voice, and the like) associated with a user of the electronic device 600.

According to an embodiment of the present disclosure, the first communication module 640 may perform communication with at least one seller server 410, the external server 420, or the external electronic device 460.

According to an embodiment of the present disclosure, the memory 650 may store information used for storing information on an online item or/and offline item in an integrated storage area, information used for requesting payment associated with the integrated storage area, and information forming various interfaces related to payment.

According to an embodiment of the present disclosure, the camera module 660 may recognize a recognition code such as a barcode or a QR code.

According to an embodiment of the present disclosure, the second communication module 670 may include the MST control module 671, the NFC control module 672, the MST module 673, and the NFC module 674.

According to an embodiment of the present disclosure, the MST control module 671 may control operation of the MST module 673, and may process data transmitted and received through the MST module 673. For example, the MST control module 671 may generate a magnetic field signal, and may control the MST module 673 such that the generated magnetic field signal is transmitted to the external electronic device 460. The MST control module 671 may receive data (e.g., item information) from the external electronic device 460 through the MST module 673, and may transmit data (e.g., payment information) to the external electronic device 460.

According to an embodiment of the present disclosure, the NFC control module 672 may control operation of the NFC module 674, and may process data transmitted and received through the NFC module 674. For example, the NFC control module 672 may generate a magnetic field signal, and may control the NFC module 674 such that the generated magnetic field signal is transmitted to the external electronic device 460. The NFC control module 672 may receive data (e.g., item information) from the external electronic device 460 through the NFC module 674, and may transmit data (e.g., payment information) to the external electronic device 460.

According to an embodiment of the present disclosure, the MST module 673 may generate a magnetic signal, and may transfer the generated magnetic field signal to the external electronic device 460. The MST module 673 may transmit and receive data to/from the external electronic device 460.

According to an embodiment of the present disclosure, the NFC module 674 may generate a magnetic signal, and may transfer the generated magnetic field signal to the external electronic device 460. The NFC module 674 may transmit and receive data to/from the external electronic device 460.

According to an embodiment of the present disclosure, the electronic device 600 may include the first communication module 640; a sensing device (e.g., the sensor 630); the display 620; and the processor 610 functionally connected with the first communication module 640, the sensing device, and the display 620, and configured to access a first external electronic device through the first communication module 640, and correlate information on a first item obtained from the first external electronic device with an integrated storage area; and obtaining information on a second item existing outside the electronic device 600 using the sensing device, and correlate the obtained information with the integrated storage area.

According to an embodiment of the present disclosure, the electronic device includes a secure memory (e.g., the memory 650) storing a token; a biometric sensor (e.g., the sensor 630); and the second communication module 670, wherein the processor 610 performs user authenticating using the biometric sensor in response to a purchase input corresponding to the integrated storage area; obtains the token from the secure memory when the user authentication is successfully performed; generates first payment information corresponding to the information on the first item and second payment information corresponding to the information on the second item using the token; transfers the first payment information to the first external electronic device corresponding to the information on the first item, using the first communication module 640; and transfers the second payment information to a second external electronic device corresponding to the information on the second item, using the second communication module 670.

According to an embodiment of the present disclosure, the processor 610 generates the first payment information using first identification information corresponding to the information on the first item, as at least a part of the generating the first payment information; and generates the second payment information using second identification information corresponding to the information on the second item, as at least a part of the generating the second payment information.

According to an embodiment of the present disclosure, the processor 610 generates first user authentication result information corresponding to the information on the first item and second user authentication result information corresponding to the information on the second item, at least based on the user authentication; generates the first payment information using the first user authentication result information, as at least a part of the generating the first payment information; and generates the second payment information using the second user authentication result information, as at least a part of the generating the second payment information.

According to an embodiment of the present disclosure, the token may be received from a third external electronic device (e.g., a TSP) for payment.

According to an embodiment of the present disclosure, the processor 610 transfers, to the first external electronic device, a security value or user account information received from a third external electronic device (e.g., an online shopping mall).

According to an embodiment of the present disclosure, the first communication module 640 is a wireless communication module, and the second communication module 670 includes at least one of the NFC module 674 and the MST module 673.

According to an embodiment of the present disclosure, the first external electronic device corresponds to an online shopping mall; and the second external electronic device includes a POS.

According to an embodiment of the present disclosure, the processor 610 obtains a purchase input associated with the second item; transferring payment information for the second item to the second external electronic device using the second communication module 670; inquires about purchase of the first item correlated with the integrated storage area; and transfers, to the first external electronic device, payment information for the first item when an purchase input associated with the first item is obtained.

According to an embodiment of the present disclosure, the electronic device 600 may include a secure memory for storing a token, a biometric sensor (e.g., the sensor 630), the first communication module 640, the second communication module 670, the processor 610, and the memory 650. The memory 650, upon execution, may store instructions which enable the processor 610 to display a cart including first product information corresponding to an online product and second product information corresponding to an offline product, obtain a purchase input associated the cart, performing user authentication using the biometric sensor in response to the purchase input, obtain the token from the secure memory when the user authentication is successfully performed, generate first payment information corresponding to the first product information and second payment information corresponding to the second product information by using the token, and transmit the first payment information to the first external electronic device using the first communication module 640 and transmit the second payment information to the second external electronic device using the second communication module 670.

A non-transitory computer-readable recording medium that stores a program for implementing the method of electronic device 600 according to an embodiment of the present disclosure may store a program for implementing the method including accessing a first external electronic device using the first communication module 640, and correlating information on a first item obtained from the first external electronic device with an integrated storage area; and an operation of obtaining information on a second item using a sensing device and correlating the obtained information with the integrated storage area.

According to an embodiment of the present disclosure, the non-transitory computer-readable recoding medium may store a program for implementing the method further including performing user authentication using a biometric sensor in response to a purchase input corresponding to the integrated storage area; obtaining a token from a secure memory where the token is stored when the user authentication is successfully performed; generating first payment information corresponding to the information on the first item and second payment information corresponding to the information on the second item by using the token; transferring the first payment information to the first external electronic device corresponding to the information on the first item by using the first communication module 640; and transferring the second payment information to the second external electronic device corresponding to the information on the second item by using the second communication module 670.

According to an embodiment of the present disclosure, the first payment information may include user authentication result information, the token, and first identification information, and the second payment information may include user authentication result information, the token, and second identification information.

According to an embodiment of the present disclosure, the token may be received from a third external electronic device (e.g., a TSP) for payment.

According to an embodiment of the present disclosure, the method may further include transferring user account information or a security value received from the third external electronic device (e.g., an online shopping mall) to the first external electronic device.

According to an embodiment of the present disclosure, the first communication module 640 may be a wireless communication module, and the second communication module 670 may include at least one of the NFC module 674 and the MST module 673.

According to an embodiment of the present disclosure, the first external electronic device corresponds to an online shopping mall, and the second external electronic device may include a POS.

According to an embodiment of the present disclosure, the non-transitory computer-readable recording medium may store a program for implementing the method further including obtaining a purchase input for the second item; transferring payment information for the second item to the second external electronic device using the second communication module 670; inquiring about whether to purchase the first item correlated with the integrated storage area; and transferring the payment information for the first item to the first external device when a purchase input for the first item is obtained.

According to an embodiment of the present disclosure, the non-transitory computer-readable recoding medium stores a program for implementing the method further including correlating the information on the first item obtained from the first external device with the integrated storage area, and correlating information on the second item obtained through a sensing device of the electronic device with the integrated storage area.

According to an embodiment of the present disclosure, correlating the information on the first item with the integrated storage area may include comparing a received security value and a previously stored security value when the security value is received together with the information on the first item; and correlating the information on the first item with the integrated storage area when the received security value and the previously stored security value are identical to each other.

Figure 7:
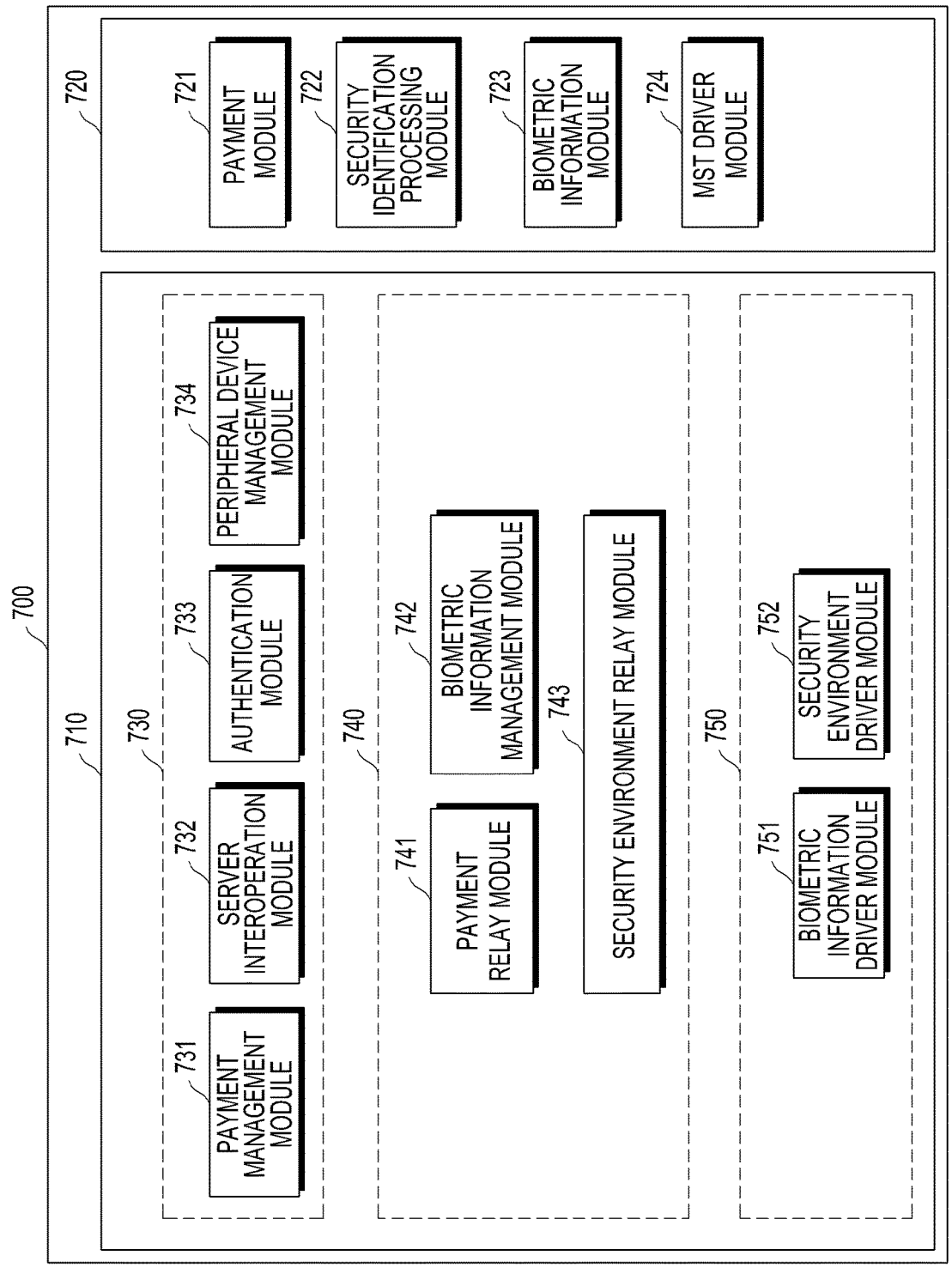
FIG. 7 is a block diagram of program modules of an execution environment of an electronic device according to an embodiment of the present disclosure.

FIG. 7 is a block of program modules to be implemented in an execution environment of an electronic device according to an embodiment of the present disclosure.

Referring to FIG. 7, an execution environment 700 may include rich execution environment (REE) 710 and trusted execution environment (TEE) 720.

According to an embodiment of the present disclosure, the REE 710 may include a payment application 730, a payment manager 740, and a kernel 750.

According to an embodiment of the present disclosure, the payment application 730 may include a payment management module 731, a server interoperation module 732, an authentication module 733, and a peripheral device management module 734.

According to an embodiment of the present disclosure, the payment management module 731 may perform operations for registration of a payment means (e.g., a credit card), authentication, deletion, and payment. For example, when a request for registering a card is received, the payment management module 731 may obtain a credit card image through a camera or an optical character reader (OCR) module, and may provide an interface for requesting information on the credit card (e.g., passwords, a home address, an e-mail address, a phone number, an account ID, and the like). The interface may include at least one input area for inputting information on the credit card. Alternatively, the payment management module 731 may receive information on the credit card from the external server 420.

According to an embodiment of the present disclosure, the payment management module 731 may display registered credit card information (e.g., a name, a number, an image of the credit card), or may display transactional information associated with the credit card.

According to an embodiment of the present disclosure, the payment management module 731 may perform a payment operation using the registered credit card information. For example, when a request for payment for at least one item correlated with an integrated storage area is received, the payment management module 731 may perform user authentication based on biometric authentication information, and may transfer the credit card information and payment information for the at least one item to the external electronic device 460 when the user authentication is successfully performed.

According to an embodiment of the present disclosure, the server interoperation module 732 may receive a payment-related message, a device-related message, or a service-related message from the external server 420, and may transfer received messages to the payment management module 731.

According to an embodiment of the present disclosure, the authentication module 733 may display, on a display 620, credit card information for payment or an interface for performing user authentication. The authentication module 733 may include a biometric information module. The biometric information module may obtain biometric authentication information (e.g., a fingerprint image, an iris image, a facial image, voice, heartbeat or blood pressure information, and the like), and may perform user authentication based on the obtained biometric authentication information.

According to an embodiment of the present disclosure, the peripheral device management module 734 may manage at least one external device which is functionally connected with the electronic device 700. For example, the at least one external device may include an MST accessory device or a wearable device.

According to an embodiment of the present disclosure, the peripheral device management module 734 may connect to at least one external device, and may provide an interface based thereon.

According to an embodiment of the present disclosure, the payment manager 740 may include a payment relay module 741, a biometric information management module 742, and a security environment relay module 743.

According to an embodiment of the present disclosure, the payment relay module 741 may relay a payment means or security information (e.g., a token) corresponding to the payment means to the payment application 730, the kernel 750, or the external server 420.

According to an embodiment of the present disclosure, the payment relay module 741 may perform online payment through a first communication module 640, and may perform offline payment through a second communication module 670 (such as the MST module 673 and/or NFC module 674).

According to an embodiment of the present disclosure, the biometric information management module 742 may transfer, to a sensor 630, a command from the payment relay module to obtain biometric authentication information, and may transfer an authentication message to a biometric information module 723 of the TEE 720.

According to an embodiment of the present disclosure, the security environment relay module 743 may receive encrypted data from the TEE 720, or may transfer encrypted data to the TEE 720.

According to an embodiment of the present disclosure, the security environment relay module 743 may perform relaying such that the payment application 730 accesses a biometric information driver module 751 or a security environment driver module 752, and uses a function provided by a payment module 721 or a biometric information module 723 of the TEE 720.

According to an embodiment of the present disclosure, the kernel 750 may include a biometric information driver module 751 and a security environment driver module 752.

According to an embodiment of the present disclosure, the biometric information driver module 751 may transfer a message transferred from the biometric information management module 742 to a sensor 630, and may transfer biometric authentication information obtained through the sensor to the biometric information module 723 of the TEE 720.

According to an embodiment of the present disclosure, the security environment driver module 752 may receive a payment proceed command from the payment relay module 741, and may transfer the same to the payment module 721 of the TEE 720.

According to an embodiment of the present disclosure, the security environment driver module 752 may receive an authentication message from the payment relay module 741, and may transfer the same to the biometric information module 723 of the TEE 720.

According to an embodiment of the present disclosure, the security environment driver module 752 may receive the result of authentication performed by the biometric information module 723 from the biometric information module 723 of the TEE 720 and may transfer the same to the biometric information management module 742.

According to an embodiment of the present disclosure, the TEE 720 may include the payment module 721, the security identification processing module 722, the biometric information module 723, and the MST driver module 724.

According to an embodiment, the payment module 721 may obtain a token and a cryptogram from the electronic device 700 or another electronic device.

According to an embodiment of the present disclosure, when a payment proceed command is received from the payment relay module 741, the payment module 721 may transfer an authentication request to the payment relay module 741.

According to an embodiment of the present disclosure, the payment module 721 may include an application that is provided by a bank or a credit card company, and is used for performing data communication with the external server 420. The application may include information on a credit card, a debit card, a membership card, or the like.

According to an embodiment of the present disclosure, the payment module 721 may store information on a payment means. The information may include at least one of a token corresponding to credit card information (e.g., a PAN), a token reference ID, a part of PAN, a PAN product ID, a token requestor ID, a token assurance level, token assurance data, a token expiration date, an encryption key, and a value provided by a token service provider of the external server 420 (e.g., a one-time password).

According to an embodiment of the present disclosure, the payment module 721 may be determined by a user selection made when payment is requested. For example, when an interface for selecting at least one credit card to be used for payment is displayed on the display in response to a request for payment, and an input for selecting a first credit card is received, a payment module corresponding to the selected first credit card may be determined for performing payment. The payment module 721 may transfer information on the selected first credit card to the payment management module 731.

According to an embodiment of the present disclosure, the payment module 721 may receive a token used for generating a cryptogram from the external server 420, and may generate a cryptogram using the received token.

According to an embodiment of the present disclosure, the payment module 721 may transfer credit card information to the external electronic device 460.

According to an embodiment of the present disclosure, the security identification processing module 722 may obtain an input value which is required by the electronic device 700 or is associated with user authentication related to payment, and may perform user authentication using the obtained input value. For example, the input value is information related to a credit card, and may include at least one of a PAN, a credit card expiration date, a credit card verification value (CVV), an integrated circuit (IC) personal identification number (PIN), and an ATM PIN, and the like. The security identification processing module 722 may transfer an authentication result to the payment management module 731.

According to an embodiment of the present disclosure, the biometric information module 723 may store biometric authentication information obtained through a sensor (e.g., the sensor 630 of FIG. 6), and may perform user authentication based on the stored biometric authentication information. The biometric information module 723 may compare the obtained biometric authentication information and previously stored biometric authentication information to determine whether those biometric authentication information correspond to the identical user, and may transfer the same to the biometric information management module 742.

According to an embodiment of the present disclosure, the MST driver module 724 may receive payment information from the payment relay module 741, and may transfer the received payment information to an MST control module 672.

According to an embodiment of the present disclosure, a server may include a communication module, a memory, and a processor which is electrically connected to the communication module and the memory. The processor may correlate information on a first item obtained from a first external electronic device with an integrated storage area, and may correlate information on a second item obtained through a sensing device 630 of an electronic device 600 with the integrated storage area.

Figure 8:
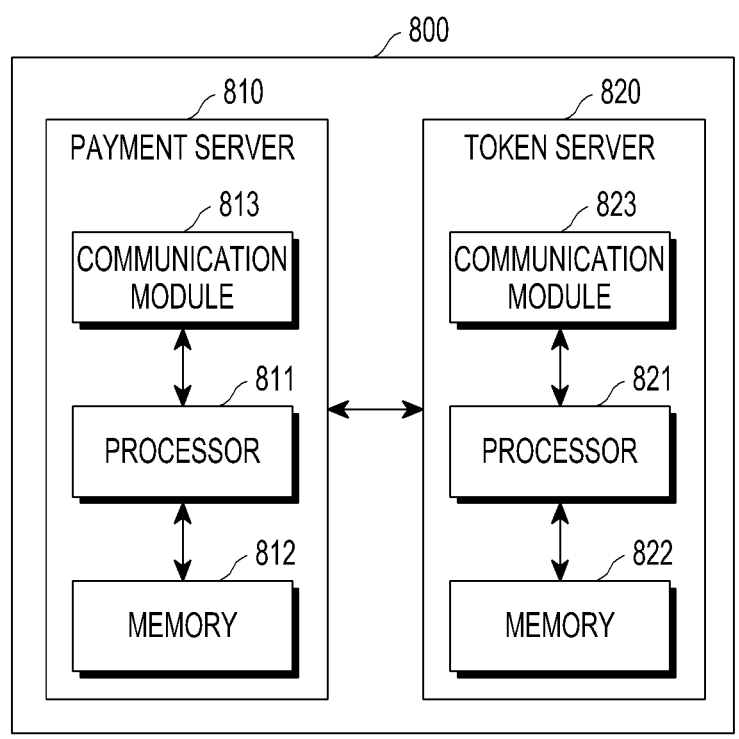
FIG. 8 is a block diagram of an external server according to an embodiment of the present disclosure.

FIG. 8 is a block diagram of an external server 800 according to an embodiment of the present disclosure.

Referring to FIG. 8, the external server 800 may include a payment server 810 and a token server 820.

According to an embodiment of the present disclosure, the payment server 810 and the token server 820 may be located in the same area, similar areas, or separated areas.

According to an embodiment of the present disclosure, the payment server 810 may include a processor 811, a memory 812, and a communication module 813.

According to an embodiment of the present disclosure, the processor 811 may perform an operation of the payment server 810. For example, the processor 811 may store, in the memory 812, information (e.g., credit card information) on a payment means for performing a payment function, and may perform various operations for performing electronic payment or mobile payment based on the payment means information.

According to an embodiment of the present disclosure, when a request for a security value is received from the electronic device 600, the processor 811 may request generation of the security value for the electronic device 600, and, when the security value of the electronic device 600 is received from the token server 820, may transfer the received security value to the electronic device 600.

According to an embodiment of the present disclosure, the processor 811 may receive a request for storing information on at least one item from the at least one seller server 410 in an integrated storage area. The request may include a security value, user account information, and information on at least one item. The processor 811 may compare the received security value of the electronic device 600 and a previously stored security value of the electronic device 600, and when the comparison result shows that those security values are identical, the processor 811 may store information on at least one item in the integrated storage area included in the memory 812.

According to an embodiment of the present disclosure, the processor 811 may transfer, to the electronic device 600, information indicating that at least one item information is stored in the integrated storage area or information on the integrated storage area.

According to an embodiment of the present disclosure, when payment information generated by the electronic device 600 is received from the payment network 430, the processor 811 may transfer the received payment information to the token server 820. When it is determined that the payment information received by the token server 820 is a valid payment attempt, the processor 811 may identify payment means information (e.g., credit card information) corresponding to the electronic device 600, and may transfer the identified payment means information to the payment network 430. When a payment approval result is received from the payment network 430, the processor 811 may transfer the payment approval result to the electronic device 600.

According to an embodiment of the present disclosure, the memory 822 may store information on at least one payment means (e.g., credit card information) corresponding to at least one user account information.

According to an embodiment of the present disclosure, the memory 822 may include an integrated storage area corresponding to user account information.

According to an embodiment of the present disclosure, the memory 822 may include a normal area and a secure area, may store payment means information in the secure area, and may include an integrate storage area in the secure area.

According to an embodiment of the present disclosure, the communication module 813 may perform communication with the electronic device 600, the payment network 430, the financial server 440, and the purchase server 450. In addition, the communication module 813 may perform communication with the token server 820.

According to an embodiment of the present disclosure, the token server 820 may include a processor 821, a memory 822, and a communication module 823.

According to an embodiment of the present disclosure, the processor 821 may issue information associated with payment (e.g., a token) or may manage information associated with payment.

According to an embodiment of the present disclosure, when a request for a security value of the electronic device 600 is received from the payment server 810, the processor 821 may generate the security value of the electronic device 600, and may transfer the generated security value to the payment server 810. The processor 821 may store the generated security value in the memory 822.

According to an embodiment of the present disclosure, the processor 821 may control an operation period associated with a generation, correction, or deletion function associated with a token.

According to an embodiment of the present disclosure, the processor 821 may receive a payment approval result from the payment network 430, and may transfer the received payment approval result to the payment server 810.

According to an embodiment of the present disclosure, the memory 822 may include a normal area and a secure area, and may store a token corresponding to at least one electronic device (or a user account) in the secure area.

According to an embodiment of the present disclosure, the communication module 823 may perform communication with the electronic device 600, the payment network 430, the financial server 440, and the purchase server 450. In addition, the communication module 823 may perform communication with the payment server 810.

Figure 9:
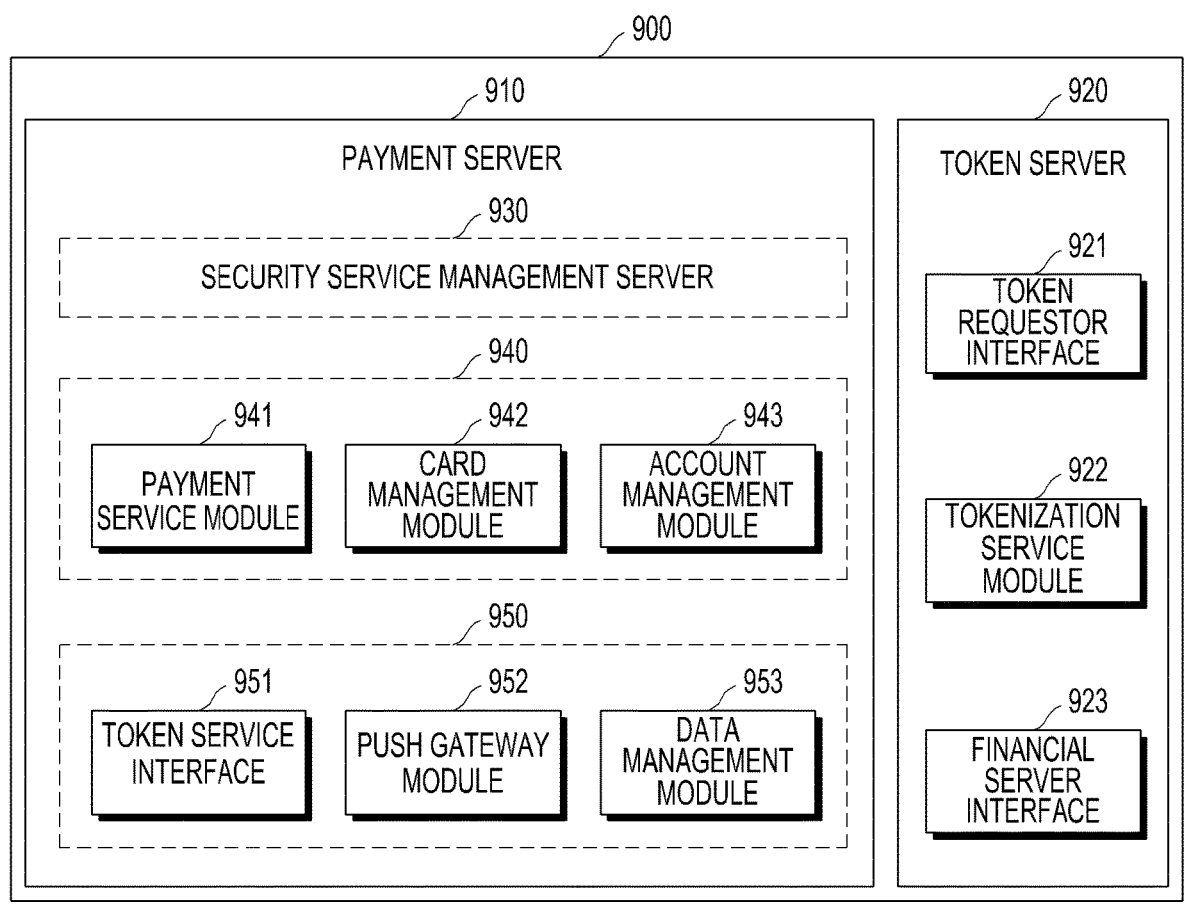
FIG. 9 is a block diagram of an external server according to an embodiment of the present disclosure.

FIG. 9 is a block diagram of an external server 900 according to an embodiment of the present disclosure.

Referring to FIG. 9, the external server 900 may include a payment server 910 and a token server 920.

According to an embodiment of the present disclosure, the payment server 910 may include a security service management server 930, a payment service server 940, and a token requestor server 950.

According to an embodiment of the present disclosure, the security service management server 930 may manage information associated with payment (e.g., a key used for generating a token or encryption information). For example, the security service management server 930 may manage the information associated with payment according to the type of area (e.g., a normal area or a secure area) where information associated with payment is stored and/or configuration (e.g., a logical configuration, a physical configuration, and the like).

According to an embodiment of the present disclosure, the payment service server 940 may manage a service account (e.g., a user account) or credit card information linked with a user account. The payment service server 940 may include an API server associated with the payment application 730.

According to an embodiment of the present disclosure, the payment service server 940 may include a payment service module 941, a card management module 942, and an account management module 943.

According to an embodiment of the present disclosure, the payment service module 941 may be functionally connected with the payment application 730, and may provide an API for transmitting and receiving information associated with payment. In addition, the payment service module 941 may record the flow of information associated with payment. For example, the flow of the information associated with payment may include storing a payment approval result, transmitting payment details to the electronic device 600, inquiring about a payment history, and the like.

According to an embodiment of the present disclosure, the card management module 942 may generate identification information corresponding to credit card information received from the electronic device 600. For example, the identification information may be a resource ID associated with the credit card information. When the credit card information is received, the card management module 942 may transfer a request for registering the received credit card information to the token service interface 951.

According to an embodiment of the present disclosure, the card management module 942 may manage a credit card operation period including at least one of registering a credit card, issuing a token, activating the token, and deleting the token.

According to an embodiment of the present disclosure, the payment management module 943 may manage a user account corresponding to credit card information. For example, the account management module 943 may interoperate with a service account and credit card information to provide a payment service. The account management module 943 may perform a function of registering an account, logging in, authentication, generating a secure space, or the like.

According to an embodiment of the present disclosure, the token requester server 950 may provide an interface for processing information associated with payment. The token requestor server 950 may issue, delete, or activate the information associated with payment (e.g., a token).

According to an embodiment of the present disclosure, the token requestor server 950 may include a token service interface 951, a push gateway module 952, and a data management module 953.

According to an embodiment of the present disclosure, the token service interface 951 may receive a request associated with a token from the electronic device 600, transfer the same to the token server 920, receive a response to the request from the token server 920, and transfer the response to the electronic device 600.

According to an embodiment of the present disclosure, the token service interface 951 may manage security for a channel that is functionally connected with the token server 920.

According to an embodiment of the present disclosure, the push gateway module 952 may perform a path function for transferring a message associated with a token from the token server 920 to the electronic device 600.

According to an embodiment of the present disclosure, the data management module 953 may manage credit card information, user information, and the like. In addition, the data management module 953 may store a table including at least one piece of credit card information (e.g., a PAN), payment application information, user information, electronic device information, token information, and the like.

According to an embodiment of the present disclosure, the token server 920 may include a token requestor interface 921, and a tokenization service module 922, a financial server interface 923.

According to an embodiment of the present disclosure, the token requestor interface 921 may include an interface for receiving a request signal (or message) for requesting issue of a token.

According to an embodiment of the present disclosure, the tokenization service module 922 may issue a token based on credit card information according to a token issue request received from the electronic device 600.

According to an embodiment of the present disclosure, the tokenization service module 922 may compare a received token and a previously stored token in response to a payment request.

According to an embodiment of the present disclosure, when a token issue request is received from the electronic device 600 or payment information including a token is received as payment is requested, the financial server interface 923 may provide an interface for transferring a token to the financial server 440 to perform authentication for the issued token or received token.

Figure 10A:
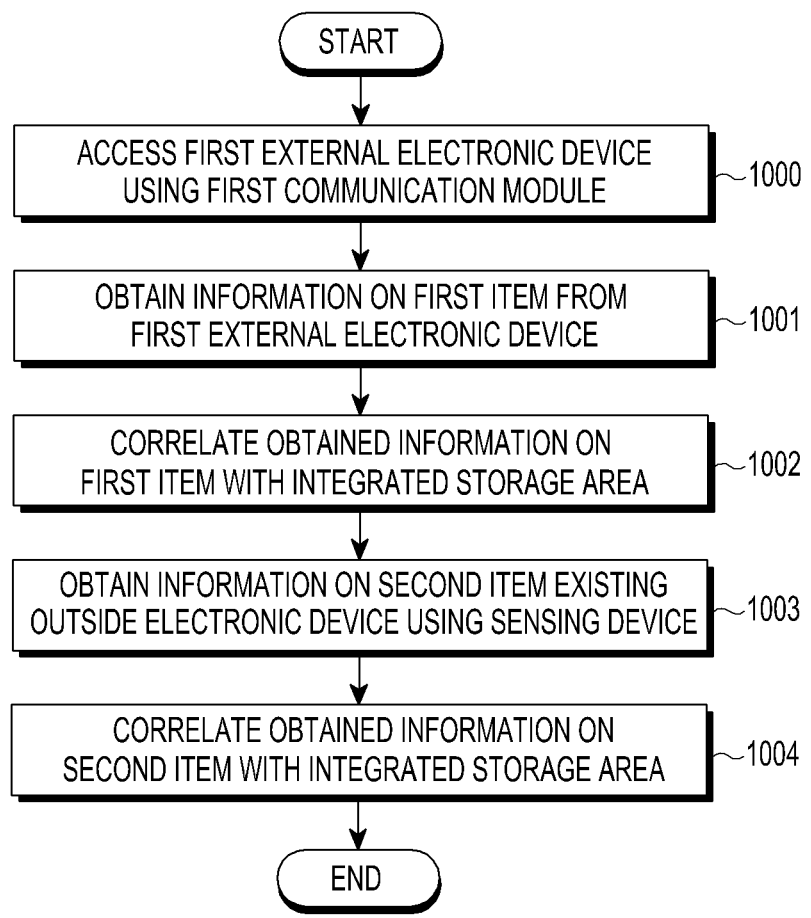
FIGS. 10A, 10B, and 10C are flowcharts of a process of performing payment associated with an integrated storage area that stores information on at least one item, by an electronic device according to an embodiment of the present disclosure.
Figure 10B:
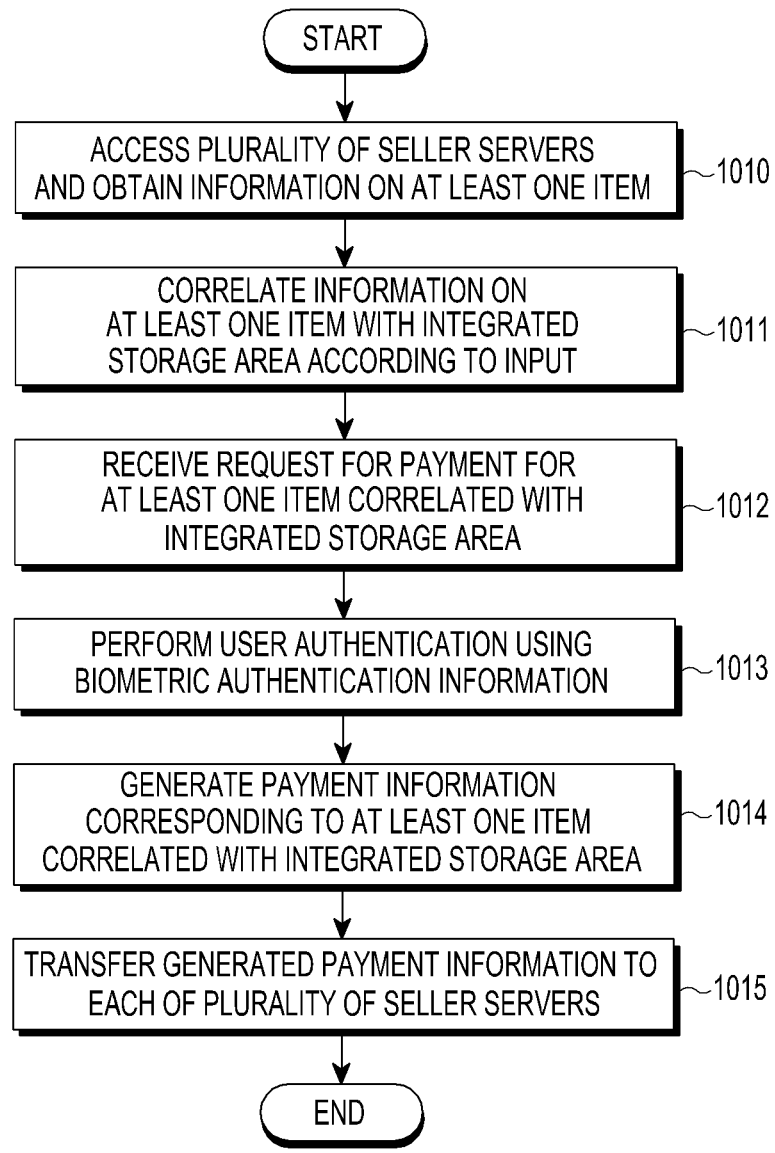
Figure 10C:
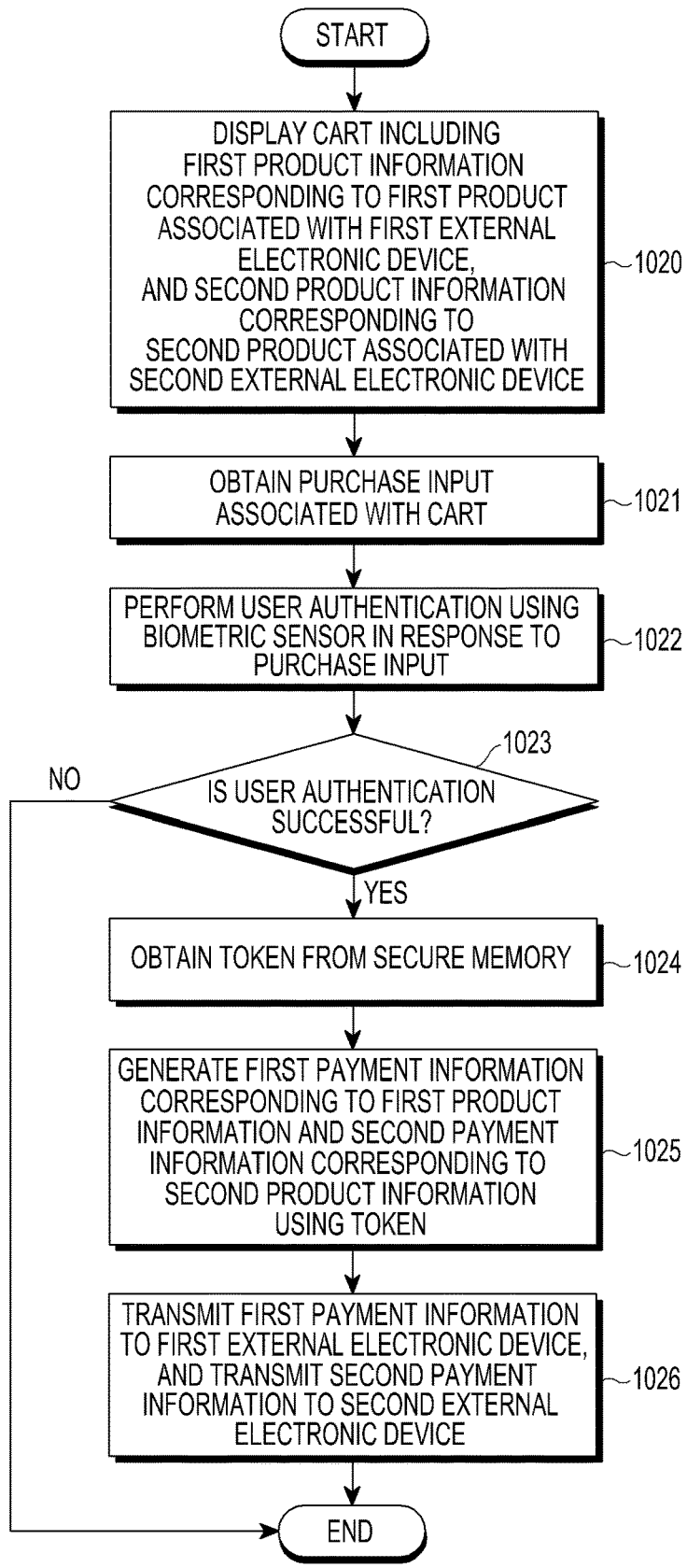

FIGS. 10A, 10B, and 10C are flowcharts of payment associated with an integrated storage area that stores information on at least one item, by an electronic device, according to of the present disclosure.

Referring to FIGS. 10A, 10B, and 10C, steps 1000 to 1004 of FIG. 10A, steps 1010 to 1015 of FIG. 10B, and steps 1020 to 1026 of FIG. 10C are executed through one of the electronic devices 101, 102, 104, 201, 400, 500, 600, or 700, the server 106, the processors 120, 210, 510, or 610, and the program module 310.

Referring to FIG. 10A, the electronic device 600 (e.g., the processor 610) may access a first external electronic device using the first communication module 640 in step 1000. For example, the first external electronic device may be the first seller server 411 that provides information on a first item.

In step 1001, the electronic device 600 may obtain information on the first item from the first external electronic device. For example, the first item may be an online product associated with the first seller server 411.

In step 1002, the electronic device 600 may correlate the obtained information on the first item with an integrated storage area. For example, the electronic device 600 may store information on the first item in an integrated storage area included in the memory 650, or may store the same in an integrated storage area of the external server 420.

In step 1003, the electronic device 600 may obtain information on a second item existing outside the electronic device 600 using a sensing device. For example, the sensing device may include the sensor 630, and the second item may be an offline product. The electronic device 600 may recognize a barcode (or QR code) attached to the second item using a sensing device such as a camera or a barcode (or QR code), and may obtain information on the second item.

In step 1004, the electronic device 600 may correlate the obtained information on the second item with the integrated storage area. For example, the electronic device 600 may store information on the second item in the integrated storage area included in the memory 650, or may store the same in the integrated storage area of the external server 420.

According to an embodiment of the present disclosure, the electronic device 600 including the first communication module 640, a sensing device 630, the display 620, and the processor 610, may, using the processor 610, access a first external electronic device using the first communication module 640 and correlate information on a first item obtained from the first external electronic device with an integrated storage area, and obtain information on a second item using the sensing device and correlating the information with the integrated storage area.

Referring to FIG. 10B, the electronic device 600 may access a plurality of seller servers, and may obtain information on at least one item in step 1010. The electronic device 600 accesses an online shopping mall that provides at least one online item that a plurality of sellers desire to sell, and display interfaces including information on at least one online item. The interface may include an online shopping mall website screen or an online shopping application screen. The online shopping mall webpage screen or the online shopping application screen may include a graphic object corresponding to a function of storing information on at least one item in an integrated storage area.

In step 1011, the electronic device 600 may correlate the information on at least one item with the integrated storage area, according to an input. For example, the input may be a request for storing, in a payment storage area, information on a first item obtained by accessing the first seller server 411 and information on a second item obtained by accessing the second seller server 412.

According to an embodiment of the present disclosure, the electronic device 600 may perform an operation of storing the information on the first item obtained by accessing the first seller server 411 and the information on the second item obtained by accessing the second seller server 412 in the payment storage area. For example, the electronic device 600 may store the information in an integrated storage area included in the memory 650 of the electronic device 600, or may be stored in an integrated storage area of the external server 420.

In step 1012, the electronic device 600 may receive a request for payment for at least one item correlated with the integrated storage area.

In step 1013, the electronic device 600 may perform user authentication using biometric authentication information. For example, the electronic device 600 may obtain biometric authentication information through the sensor 630, and may determine whether the obtained biometric authentication information and biometric authentication information previously stored in the memory 650 correspond to the identical user. When it is determined that those biometric authentication information correspond to the identical user, the electronic device 600 may proceed with subsequent operation 1014.

In step 1014, the electronic device 600 may generate payment information corresponding to at least one item correlated with the integrated storage area. For example, the electronic device 600 may generate first payment information corresponding to the information on the first item and second payment information corresponding to the information on the second item using a token stored in a secure area of the memory 650 of the electronic device 600.

In step 1015, the electronic device 600 may transfer generated payment information to each of a plurality of seller servers. For example, the electronic device 600 may transfer the first payment information corresponding to the information on the first item to the first seller server 411, and may transfer the second payment information corresponding to the information on the second item to the second seller server 412.

Referring to FIG. 10C, in step 1020, the electronic device 600 may display a cart including first product information corresponding to a first product associated with a first external electronic device, and second product information corresponding to a second product associated with a second external electronic device. For example, the first external electronic device may include the first seller server 411, and the second external electronic device may include the second seller server 412.

In step 1021, the electronic device 600 may obtain a purchase input for the cart. For example, the electronic device 600 may receive an input (e.g., a touch input) for purchasing the cart through the display 620.

In step 1022, the electronic device 600 may perform user authentication using a biometric sensor in response to the purchase input. For example, the electronic device 600 may obtain biometric information using the biometric sensor (e.g., a fingerprint sensor, an iris sensor, or the like), and may compare the obtained biometric information and previously stored biometric information to determine whether those biometric information correspond to the identical user.

In step 1023, the electronic device 600 may determine whether user authentication is successfully performed, and may proceed to step 1024 when the user authentication is successfully performed, and may terminate operation when the user authentication fails.

In step 1024, the electronic device 600 may obtain a token from the secure memory. For example, the token may be issued from the external server 420 (e.g., a token server), and may be stored in the secure area of the memory 650.

In step 1025, the electronic device 600 may generate first payment information corresponding to first product information and second payment information corresponding to second product information using a token. For example, the electronic device 600 may generate a first cryptogram corresponding to first product information and a second cryptogram corresponding to second product information using a token.

In step 1026, the electronic device 600 may transmit the first payment information to the first external electronic device, and may transmit the second payment information to the second external electronic device.

According to an embodiment of the present disclosure, a non-transitory computer-readable recording medium stores a program for implementing a method of the electronic device 600, the method including displaying a cart including first product information corresponding to an online product and second product information corresponding to an offline product; obtaining a purchase input associated with the cart; performing user authentication using a biometric sensor functionally connected with the electronic device 600 in response to the purchase input; obtaining a token from a secure memory included in the electronic device 600 when the user authentication is successfully performed; generating first payment information corresponding to the first product information and second payment information corresponding to the second product information using the token; transferring the first payment information to the first external electronic device using the first communication module 640 functionally connected with the electronic device 600; and transferring the second payment information to the second external electronic device using the second communication module 670 functionally connected with the electronic device 600.

According to an embodiment of the present disclosure, an operation of generating a plurality of pieces of payment information, which includes the first payment information and the second payment information, and corresponds to the number of external electronic devices related to a plurality of pieces of product information including the first product information and the second product information included in the cart, may be included as at least a part of the generation operation.

Figure 11:
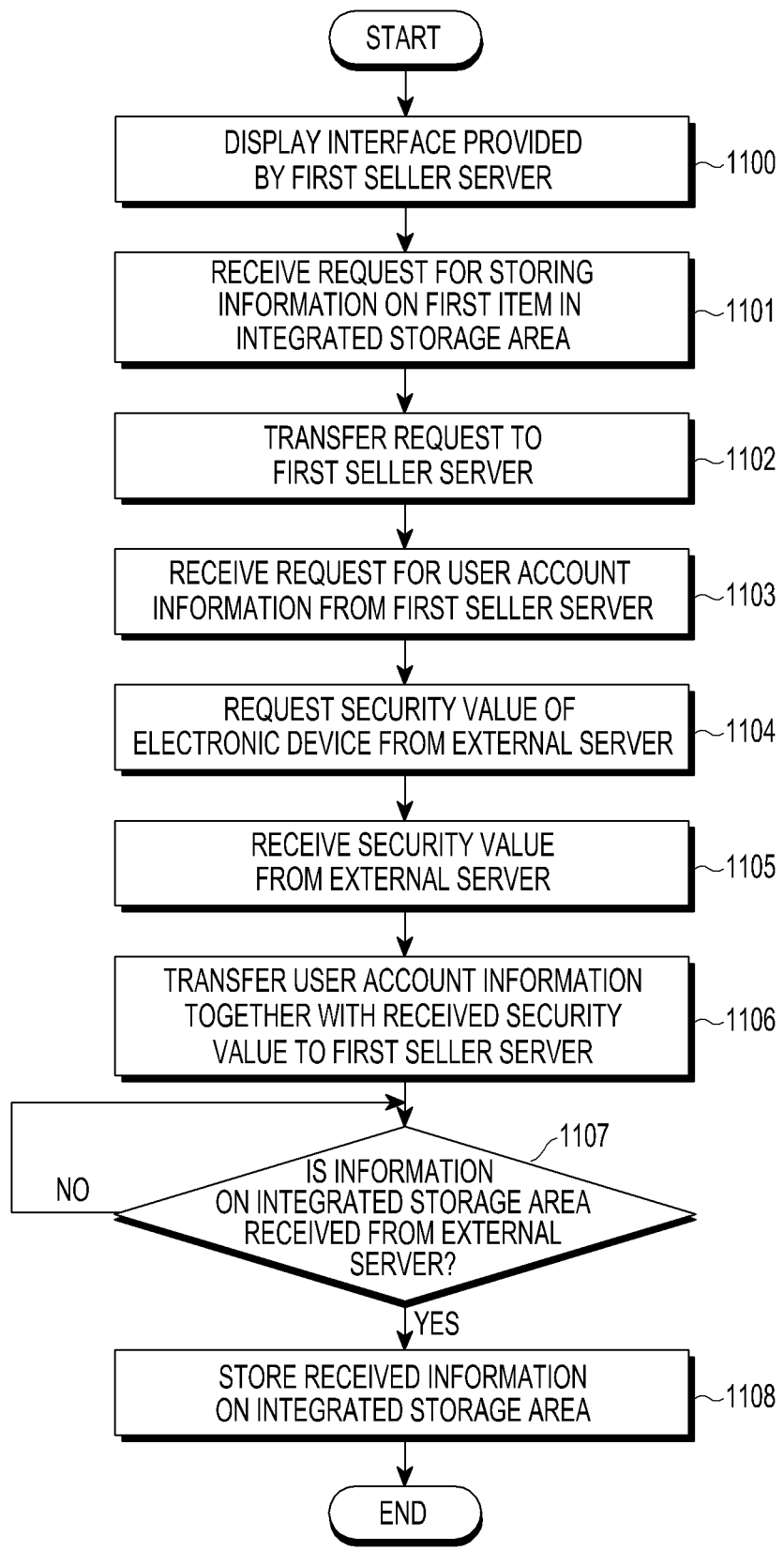
FIG. 11 is a flowchart of a process of receiving an integrated storage area that stores information on at least one item, by an electronic device according to an embodiment of the present disclosure.

FIG. 11 is a flowchart of a process of receiving an integrated storage area that stores information on at least one item, by an electronic device according to various embodiments.

Referring to FIG. 11, steps 1100 to 1108 may be executed through one of the electronic devices 101, 102, 104, 201, 400, 500, 600, or 700, the server 106, the processors 120, 210, 510, or 610, and the program module 310.

In step 1100, the electronic device 600 (e.g., the processor 610) may display an interface provided by the first seller server 411. For example, the interface may be an online shopping mall webpage screen or an online shopping application screen. The online shopping mall webpage screen or the online shopping application screen may include a graphic object related to a function of storing information on a first item in an integrated storage area.

In step 1101, the electronic device 600 may receive a request for storing the information on the first item in the integrated storage area. For example, the electronic device 600 may receive an input for selecting a graphic object related to a function for storing the information on the first item in the integrated storage area.

In step 1102, the electronic device 600 may transfer the request to the first seller server 411. The request may be a request for storing the information on the first item in the integrated storage area.

In step 1103, the electronic device 600 may receive a request for user account information from the first seller server 411.

In step 1104, the electronic device 600 may request a security value of the electronic device 600 from the external server 420. For example, the security information may be a random number or the like.

In step 1105, the electronic device 600 may receive the security value of the electronic device 600 from the external server 420.

In step 1106, the electronic device 600 may transfer user account information together with the received security value to the first seller server 411.

In step 1107, the electronic device 600 may determine whether information on the integrated storage area is received from the external server 420, may perform step 1108 when the information on the integrated storage area is received from the external server 420, and may determine whether the information on the integrated storage area is received from the external server 420 in step 1107 when the information on the integrated storage area is not received from the external server 420.

In step 1108, the electronic device 600 may store the received integrated storage area information.

Figure 12:
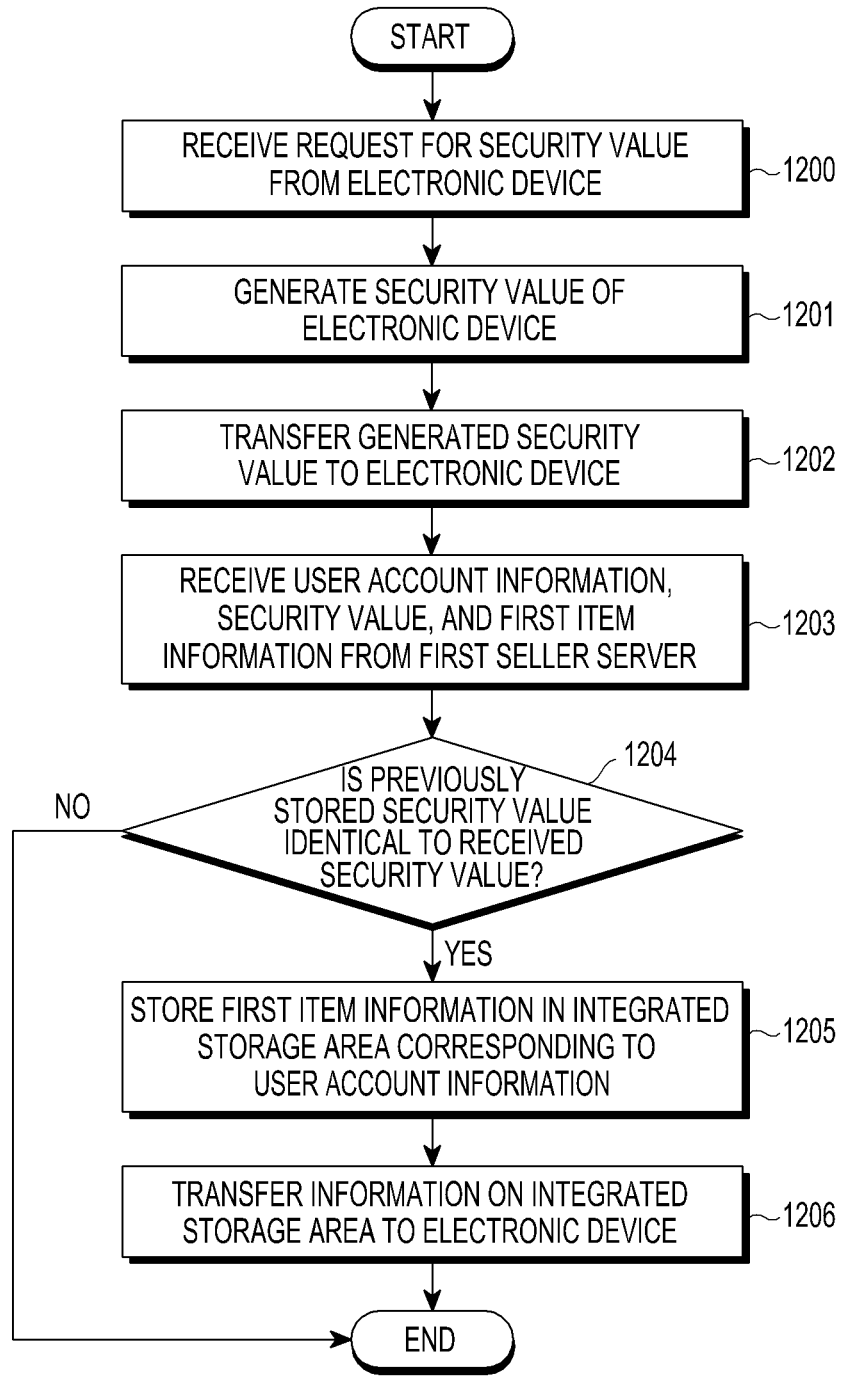
FIG. 12 is a flowchart a process of generating an integrated storage area that stores information on at least one item, by an external server according to an embodiment of the present disclosure.

FIG. 12 is a flowchart of a process of generating an integrated storage area that stores information on at least one item, by an external server according to an embodiment of the present disclosure.

Referring to FIG. 12, steps 1200 to 1206 may be executed through one of the electronic devices 101, 102, 104, 201, 400, 500, 600, or 700, the server 106, the external servers 420, 800, or 900, the processors 120, 210, 510, 610, or 810, and the program module 310.

The external server 800 (e.g., the processor 810) may receive a request for a security value from the electronic device 500 in step 1200.

In step 1201, the external server 800 may generate a security value of the electronic device 500.

In step 1202, the external server 800 may transfer the generated security value to the electronic device 500.

In step 1203, the external server 800 may receive first item information, the security value, and user account information of the electronic device 500 from the first seller server 411.

In step 1204, the external server 800 determines whether a previously stored security value and the received security value are identical, may proceed to step 1205 when the previously stored security value and the received security value are identical, and may terminate the operation when the previously stored security value and the received security value are different from each other.

In step 1205, the external server 800 may store first item information in an integrated storage area corresponding to the user account information.

In step 1206, the external server 800 may transfer the generated integrated storage area information to the electronic device 500.

Figure 13:
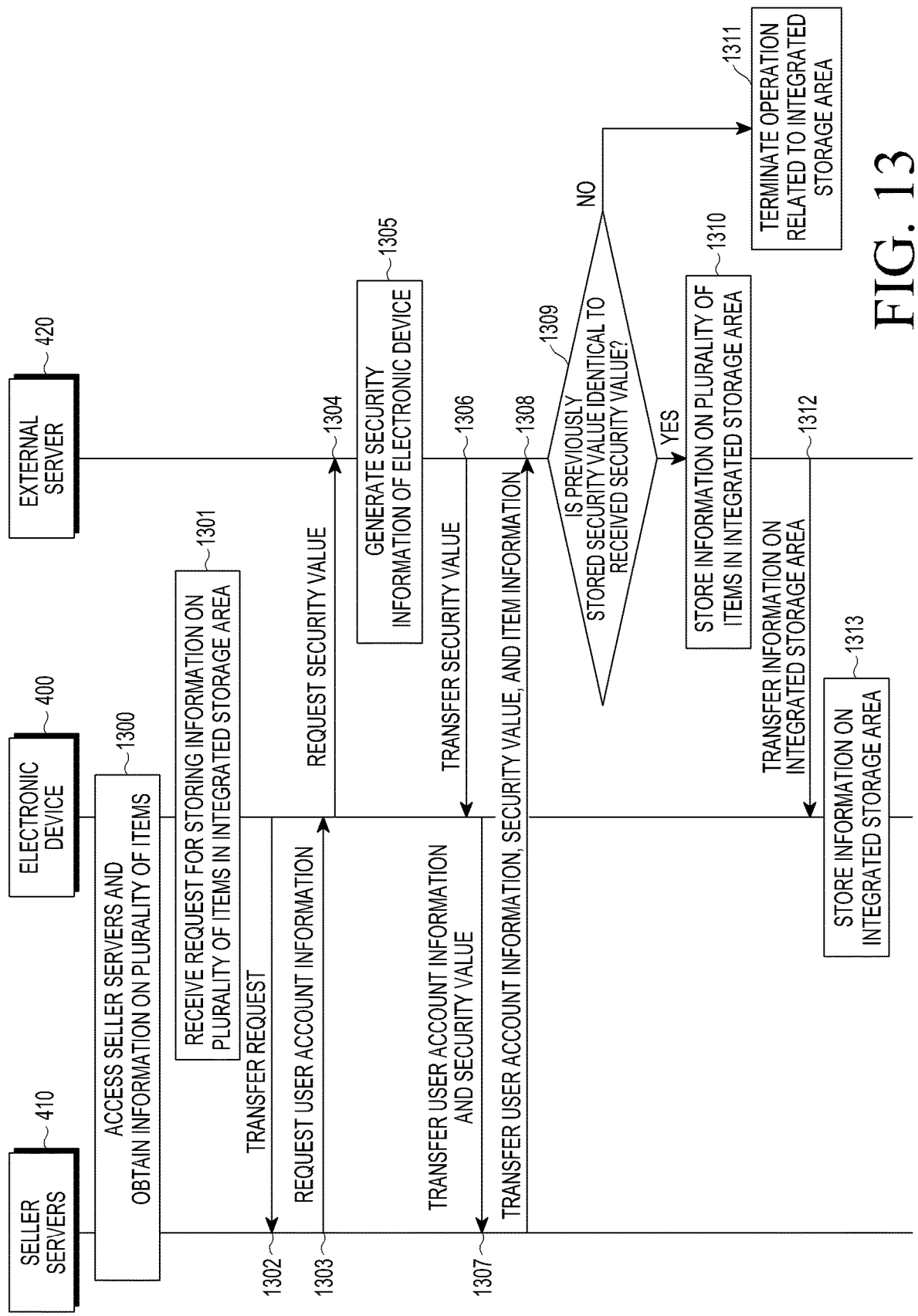
FIG. 13 is a flow diagram of a process of storing at least one item in an integrated storage area, performed by a seller server, an electronic device, and an external server, according to an embodiment of the present disclosure.

FIG. 13 is a flow diagram of a process of storing at least one item in an integrated storage area, performed by a seller server, an electronic device, and an external server, according to an embodiment of the present disclosure.

Referring to FIG. 13, in step 1300, the electronic device 400 may access the seller servers 410, and may obtain information on a plurality of items. For example, the electronic device 400 may access the first seller server 411 and obtain information on a first item, and may access the second seller server 412 and obtain information on a second item.

In step 1301, the electronic device 400 may receive a request for storing the information on the plurality of items in the integrated storage area. For example, the electronic device 400 may receive a request for storing the information on the first item and the information on the second item in the integrated storage area included in the memory of the external server 420.

In step 1302, the electronic device 400 may transfer the request to the seller servers 410. For example, the request may be a request for storing the information on the first item and the information on the second item in the integrated storage area included in the memory of the external server 420.

In step 1303, the seller servers 410 may request user account information from the electronic device 400.

In step 1304, the electronic device 400 may request a security value from the external servers 420.

The external server 420 may generate a security value of the electronic device 400 in step 1305, and may transfer the security value to the electronic device 400 in step 1306.

In step 1307, the electronic device 400 may transfer user account information and the security value to the seller servers 410.

In step 1308, the seller servers 410 may transfer the user account information, the security value, and item information to the external server 420. For example, the first seller server 411 may transfer the user account information, the security value, and the first item information to the external server 420, and the second seller server 412 may transfer the user account information, the security value, and the second item information to the external server 420.

In step 1309, the external server 420 may determine whether a previously stored security value and the received security value are identical to each other, and may proceed to step 1310 when they are identical. Otherwise, the external server 420 may terminate operation related to the integrated storage area in step 1311.

In step 1310, the external server 420 may store the information on the plurality of items in the integrated storage area. For example, the external server 420 may store the first item information and the second item information in the integrated storage area corresponding to the user account information.

In step 1312, the external server 420 may transfer the integrated storage area information to the electronic device 400.

In step 1313, the electronic device 400 may store the integrated storage area information.

Figure 14:
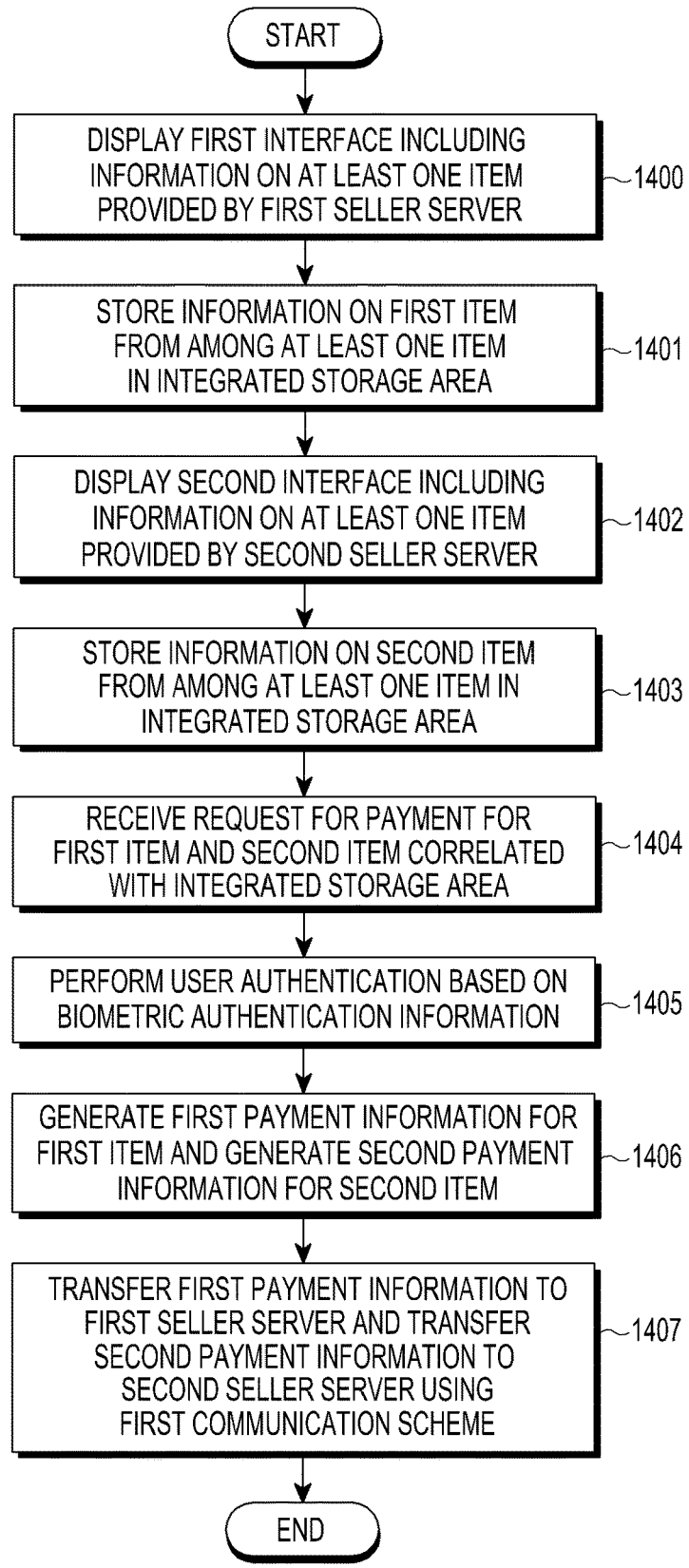
FIG. 14 is a flowchart of a process of performing payment associated with an integrated storage area by an electronic device according to an embodiment of the present disclosure.

FIG. 14 is a flowchart of a process of performing payment associated with an integrated storage area by an electronic device according to an embodiment of the present disclosure.

Referring to FIG. 14, steps 1400 to 1407 may be executed through one of the electronic devices 101, 102, 104, 201, 400, 500, 600, or 700, the server 106, the processors 120, 210, 510, or 610, and the program module 310.

In step 1400, the electronic device 500 (e.g., the processor 510) may display a first interface including information on at least one item provided by the first seller server 411. For example, the first interface may include graphic objects indicating information on at least one item and a first graphic object corresponding to a function of storing each of the at least one item in an integrated storage area.

In step 1401, the electronic device 500 may store, in integrated storage area, information on the first item from among the at least one item. For example, when an input for selecting the first graphic object is received, the electronic device 500 may perform an operation of storing the information on a first item in the integrated storage area.

When the integrated storage area is included in the memory 550 of the electronic device 500, the electronic device 500 may store the information on the first item in the integrated storage area included in the memory 550. When the integrated storage area is included in a memory of the external server 420, the electronic device 500 may request the first seller server 411 to store the information on the first item in the integrated storage area.

In step 1402, the electronic device 500 may display a second interface including information on at least one item provided by the second seller server 412. For example, the second interface may include graphic objects indicating information on at least one item and a second graphic object corresponding to a function of storing each of the at least one item in the integrated storage area.

In step 1403, the electronic device 500 may store, in integrated storage area, information on the second item from among the at least one item. For example, when an input for selecting the second graphic object is received, the electronic device 500 may perform an operation of storing the information on the second item in the integrated storage area.

In step 1404, the electronic device 500 may receive a request for payment for the first item and the second item correlated with the integrated storage area.

In step 1405, the electronic device 500 may perform user authentication using biometric authentication information. For example, the electronic device 500 may compare biometric authentication information obtained through the sensor 530 and biometric authentication information previously stored in the memory 550, and may perform step 1406 when it is determined that those biometric information correspond to the identical user.

In step 1406, the electronic device 500 may generate first payment information for the first item and second payment information for the second item.

In step 1407, the electronic device 500 may transfer the first payment information to the first seller server 411 and may transfer the second payment information to the second seller server 412, through a first communication scheme. For example, the first communication scheme may be wireless communication.

Figure 15:
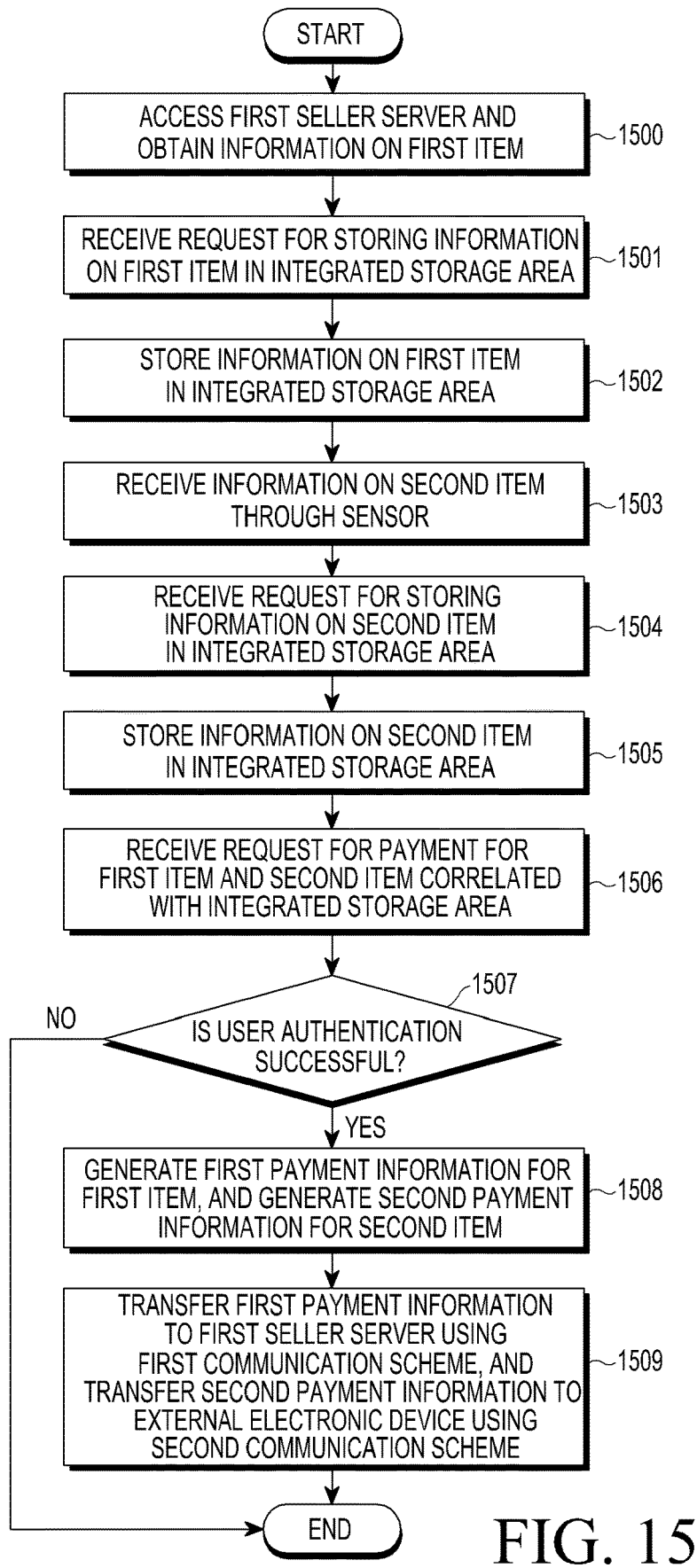
FIG. 15 is a flowchart of a process of performing payment associated with an integrated storage area by an electronic device according to an embodiment of the present disclosure.

FIG. 15 is a flowchart of a process of performing payment associated with an integrated storage area by an electronic device according to an embodiment of the present disclosure.

Referring to FIG. 15, steps 1500 to 1509 may be executed through one of the electronic devices 101, 102, 104, 201, 400, 500, 600, or 700, the server 106, the processors 120, 210, 510, or 610, and the program module 310.

Referring to FIG. 15, in step 1500, the electronic device 500 may access the first seller server 411 to obtain information on a first item.

In step 1501, the electronic device 500 may receive a request for storing the information on the first item in an integrated storage area.

In step 1502, the electronic device 500 may store the information on the first item in the integrated storage area.

In step 1503, the electronic device 500 may receive information on a second item through the sensor 530. For example, the electronic device 500 may recognize a barcode or a QR code attached to an offline product through the sensor 530 (e.g., a camera or a code recognizer), and may obtain product information corresponding to the recognized code.

In step 1504, the electronic device 500 may receive a request for storing the information on the second item in the integrated storage area.

In step 1505, the electronic device 500 may store the information on the second item in the integrated storage area.

In step 1506, the electronic device 500 may receive a request for payment for the first item and the second item correlated with the integrated storage area.

In step 1507, the electronic device 500 may determine whether user authentication is successfully performed, may proceed with step 1508 when the user authentication is successfully performed, and may terminate operation when the user authentication fails.

In step 1508, the electronic device 500 may generate first payment information for the first item and second payment information for the second item.

In step 1509, the electronic device 500 may transfer the first payment information to the first seller server 411 through a first communication scheme, and may transfer the second payment information to the external electronic device 460 through a second communication scheme. For example, the second communication scheme may be short-range communication (e.g., an MST or an NFC communication).

Figure 16:
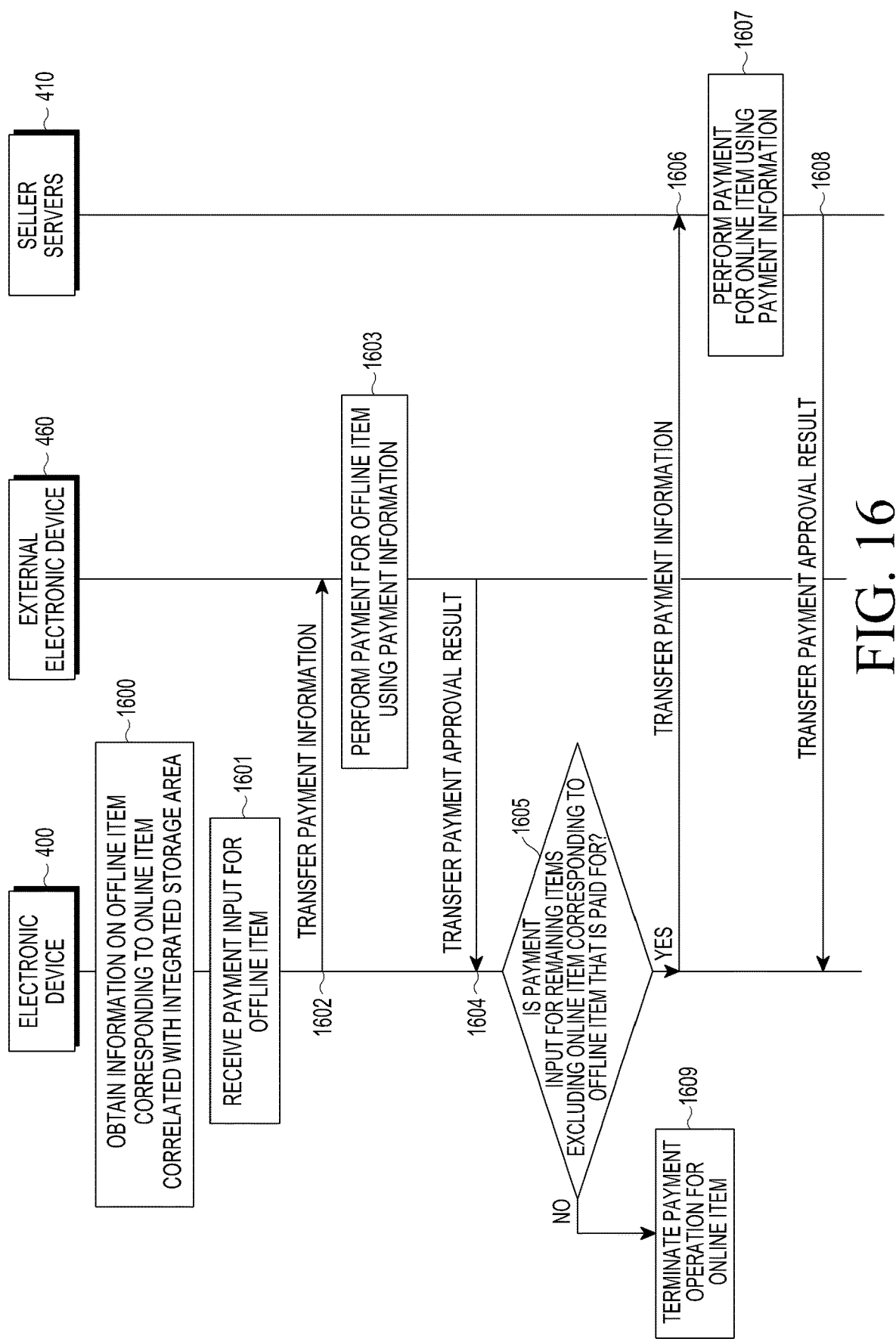
FIG. 16 is a flow diagram of a process of performing payment associated with an integrated storage area, performed by a seller server, an electronic device, and an external server according to an embodiment of the present disclosure.

FIG. 16 is a flow diagram of a process of performing payment associated with an integrated storage area, performed by a seller server, an electronic device, and an external server according to an embodiment of the present disclosure.

Referring to FIG. 16, in step 1600, the electronic device 400 may obtain information on an offline item corresponding to an online item correlated with an integrated storage area. For example, the electronic device 400 may receive information on the offline item from an external electronic device which is capable of recognizing a recognition code, such as a sensor, a barcode reader, or the like.

In step 1601, the electronic device 400 may receive a payment input for the offline item.

In step 1602, the electronic device 400 may transfer payment information to the external electronic device 460. The payment information may be payment information for the offline item.

In step 1603, the external electronic device 460 may perform payment for the offline item using the payment information.

In step 1604, the external electronic device 460 may transfer a payment approval result to the electronic device 400.

The electronic device 400 may determine whether a payment input for the remaining items, excluding the online item corresponding to the offline item that is paid for, is received in step 1605, and proceed with step 1606 when the payment input for the remaining online items is received. Otherwise, the electronic device 400 may proceed to step 1609 to terminate the online item payment operation.

In step 1606, the electronic device 400 may transfer payment information to the seller servers 410. For example, the payment information may be payment information for the remaining online items excluding the online item offline payment for which payment is performed.

In step 1607, the seller servers 410 may perform payment for the online items using the payment information.

In step 1608, the seller servers 410 may transfer a payment approval result to the electronic device 400.

Figure 17:
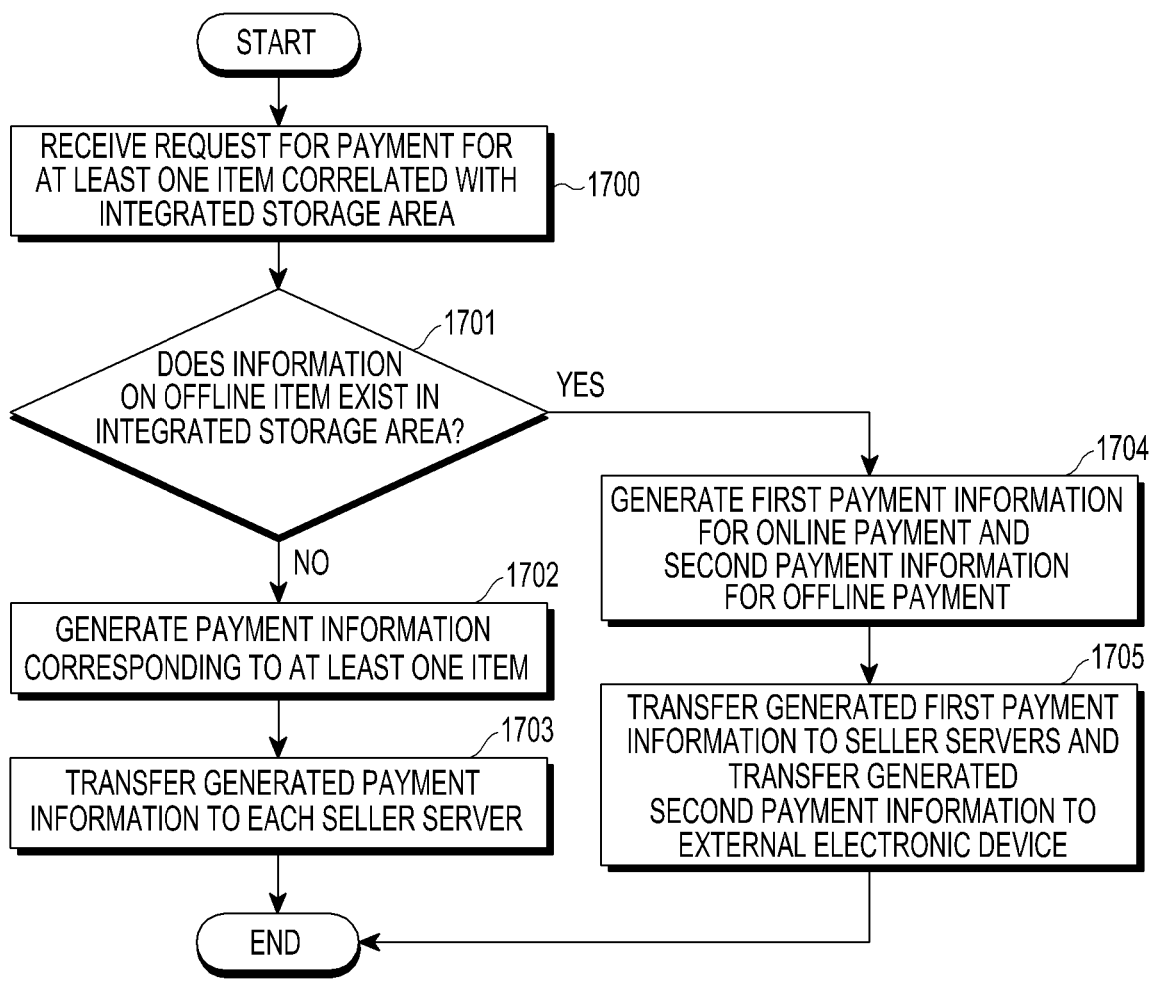
FIG. 17 is a flowchart of a process of performing payment associated with an integrated storage area by an electronic device according to an embodiment of the present disclosure.

FIG. 17 is a flowchart of a process of performing payment associated with an integrated storage area by an electronic device according to an embodiment of the present disclosure.

Referring to FIG. 17, steps 1700 to 1705 may be executed through one of the electronic devices 101, 102, 104, 201, 400, 500, 600, or 700, the server 106, the processors 120, 210, 510, or 610, and the program module 310.

Referring to FIG. 17, in step 1700, the electronic device 500 (e.g., the processor 510) may receive a request for payment for at least one item correlated with an integrated storage area.

In step 1701, the electronic device 500 may determine whether an offline item exists in the integrated storage area, and may proceed with step 1704 when the offline item exists. When the offline item does not exist, the electronic device 500 may proceed to step 1702.

The electronic device 500 may generate payment information on at least one item in step 1702, and may transfer payment information to each seller server in step 1703.

In step 1704, the electronic device 500 may generate first payment information for online payment and second payment information for offline payment.

In step 1705, the electronic device 500 may transfer the generated first payment information to a seller server 411, and may transfer the generated second payment information to the external electronic device 460.

Figure 18:
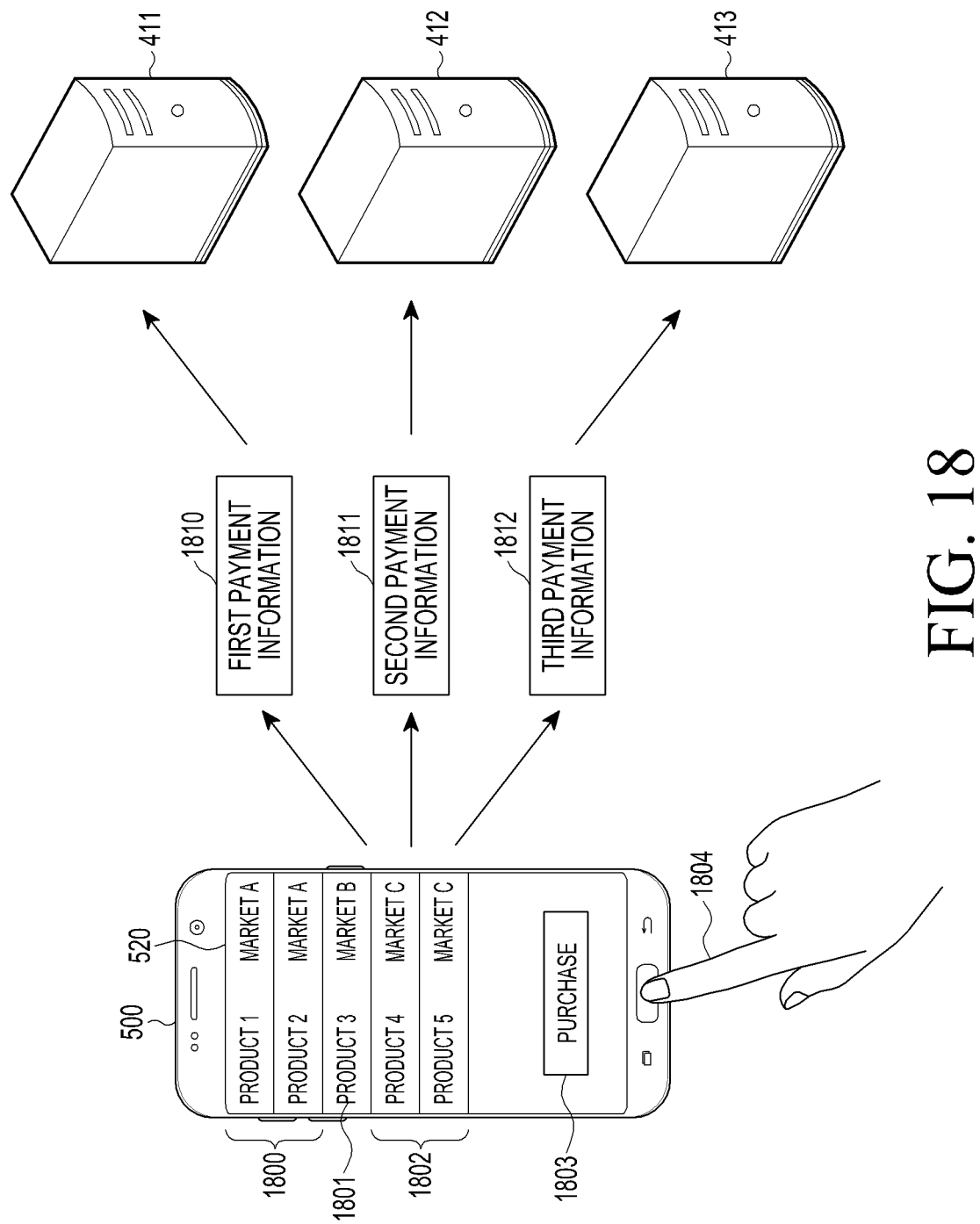
FIG. 18 is an illustration of a process of performing payment associated with an integrated storage area by an electronic device according to an embodiment of the present disclosure.

FIG. 18 is an illustration of a process of performing payment corresponding to an integrated storage area by an electronic device 500 according to an embodiment of the present disclosure.

Referring to FIG. 18, an integrated storage area may include information 1800 on product 1 and product 2 sold by market A (e.g., an online shopping mall), information 1801 on product 3 sold by market B, and information 1802 on product 4 and product 5 sold by market C.

When a touch input for a purchase button 1803 is received through the display 520, the electronic device 500 may obtain user account information. For example, the electronic device 500 may display an interface of requiring an input for the user account information, and may obtain the user account information (e.g., fingerprint or iris information) through the sensor 530 in step 1804. When the electronic device 500 may compare the obtained user account information and previously stored user account information, and may determine whether those user account information correspond to the identical user, the electronic device 500 may generate payment information.

The electronic device 500 may generate first payment information 1810 on products 1 and 2 corresponding to market A, a second payment information 1811 on product 3 corresponding to market B, and a third payment information 1812 on products 4 and 5 corresponding to market C. The electronic device 500 may transfer the first payment information 1810 to the first seller server 411 corresponding to market A, may transfer the second payment information 1811 to the second seller server 412 corresponding to market B, and may transfer the third payment information 1812 to the third seller server 413 corresponding to market C, through wireless communication.

Figure 19:
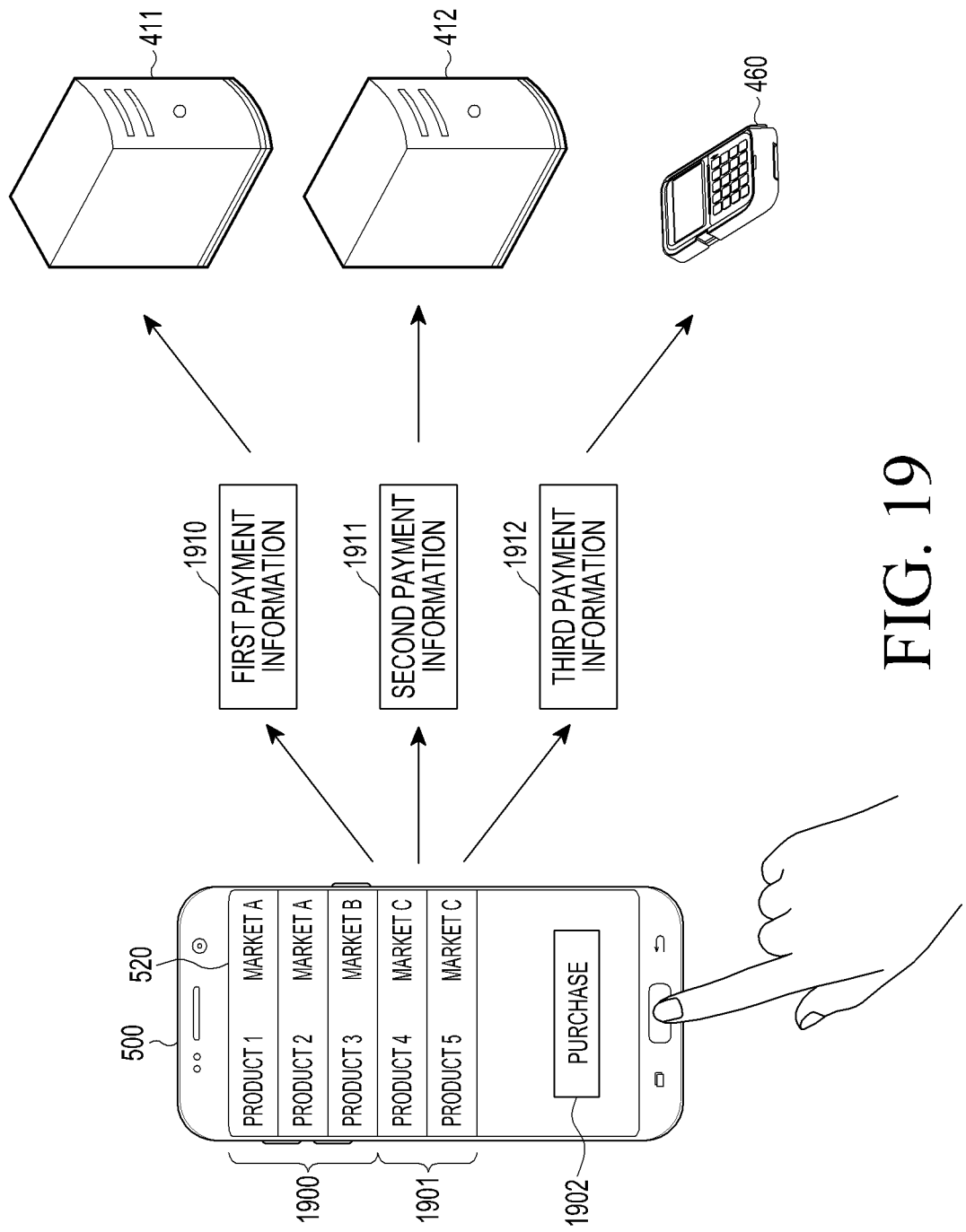
FIG. 19 is an illustration of a process of performing payment associated with an integrated storage area by an electronic device according to an embodiment of the present disclosure.

FIG. 19 is an illustration of a process of performing payment corresponding to an integrated storage area by the electronic device 500 according to an embodiment of the present disclosure.

Referring to FIG. 19, an integrated storage area may store information 1900 on products 1, 2, and 3 sold by an online market (e.g., market A and market B) and information 1901 on products 4 and 5 sold by an offline market (e.g., market C). For example, the electronic device 500 may recognize a recognition code (e.g., a barcode, a QR code, or the like) through the sensor 530 (e.g., a camera) to obtain the information 1901 on the products 4 and 5.

When a touch input for a purchase button 1902 is received through the display 520, the electronic device 500 may obtain user account information, and may perform user authentication based on the obtained user account information.

When the user authentication is successfully performed, the electronic device 500 may generate first payment information 1910 on products 1 and 2 corresponding to market A, which is an online market, may generate second payment information 1911 on product 3 corresponding to market B, which is an online market, and may generate third payment information 1912 on products 4 and 5 corresponding to market C, which is an offline market. The electronic device 500 may transfer the first payment information 1910 to the first seller server 411 corresponding to market A, and may transfer the second payment information 1911 to the second seller server 412 corresponding to market B, through wireless communication. The electronic device 500 may transfer the third payment information 1912 to the external electronic device 460 through short-range communication.

Figure 20A:
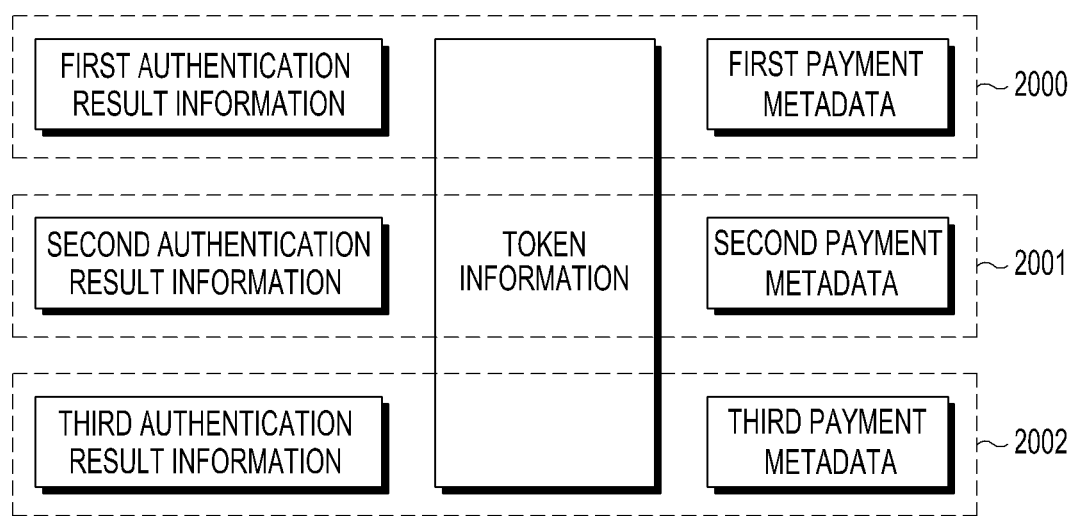
FIGS. 20A and 20B are block diagrams of payment information according to an embodiment of the present disclosure.
Figure 20B:
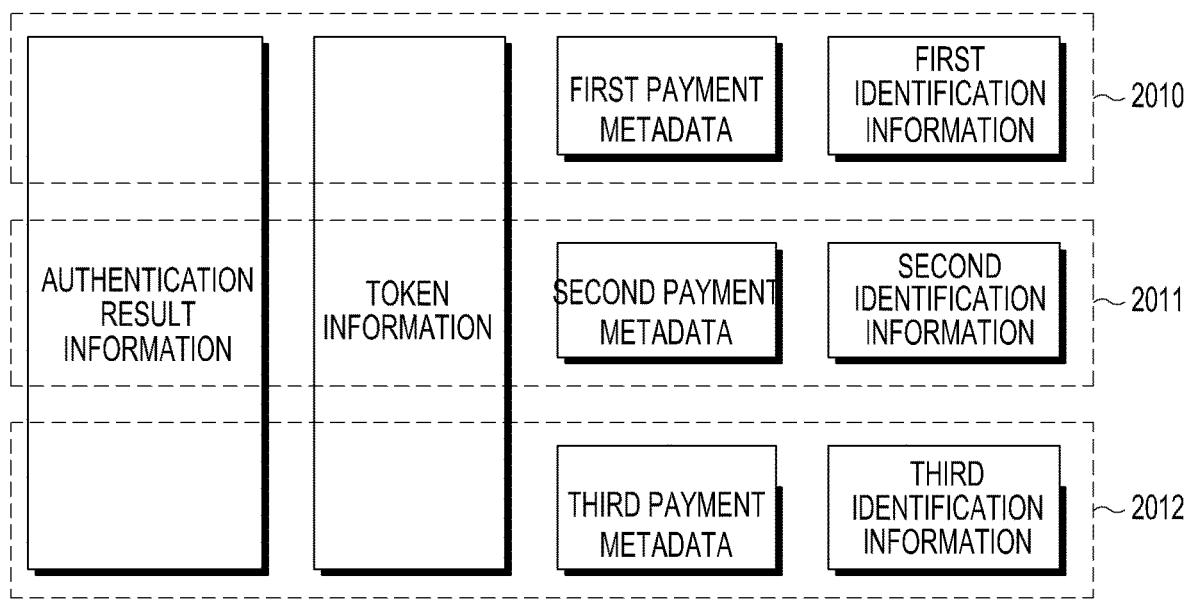

FIGS. 20A and 20B are block diagrams of payment information according to an embodiment of the present disclosure.

Referring to FIG. 20A, the electronic device 500 may generate first payment information 2000 on a first item, second payment information 2001 on a second item, and third payment information 2002 on a third item, in response to a request for payment for the first item, the second item, and the third item correlated with an integrated storage area.

According to an embodiment of the present disclosure, the electronic device 500 may perform user authentication based on biometric authentication information (e.g., a fingerprint) obtained through the sensor 530, and may generate first authentication result information indicating a user authentication result associated with the first item. In addition, the electronic device 500 may generate second authentication result information indicating a user authentication result associated with the second item, and third authentication result information indicating a user authentication result associated with the third item.

According to an embodiment of the present disclosure, the electronic device 500 may generate first payment metadata indicating additional information, such as a date, a time, and the like associated with payment of the first item, second payment metadata indicating additional information, such as a date, a time, and the like associated with payment of the second item, and third payment metadata indicating additional information, such as a date, a time, and the like associated with payment of the third item.

According to an embodiment of the present disclosure, the electronic device 500 may generate the first payment information 2000 including the first authentication result information, token information, and the first payment metadata, the second payment information 2001 including the second authentication result information, token information, and the second payment metadata, and the third payment information 2002 including the third authentication result information, token information, and the third payment metadata.

Referring to FIG. 20B, the electronic device 500 may generate first payment information 2010 on a first item, second payment information 2011 on a second item, and third payment information 2012 on a third item, in response to a request for payment for the first item, the second item, and the third item correlated with an integrated storage area.

According to an embodiment of the present disclosure, the electronic device 500 may perform user authentication based on obtained biometric authentication information through the sensor 530, and may generate authentication result information indicating a user authentication result.

According to an embodiment of the present disclosure, the electronic device 500 may generate first payment metadata corresponding to additional payment information associated with the first item, second payment metadata corresponding to additional payment information associated with the second item, and third payment metadata corresponding to additional payment information associated with the third item.

According to an embodiment of the present disclosure, the electronic device 500 may generate first identification information on the first item, second identification information on the second item, and third identification information on the third item.

According to an embodiment of the present disclosure, the electronic device 500 may generate the first payment information 2010 including the authentication result information, token information, the first payment metadata, and the first identification information, the second payment information 2011 including the authentication result information, token information, the second payment metadata, and the second identification information, and the third payment information 2012 including the authentication result information, token information, the third payment metadata, and the third identification information.

FIGS. 21A, 21B, and 21C are illustrations of an integrated storage area that stores information on online items and offline items according to an embodiment of the present disclosure.

Referring to FIGS. 21A, 21B, and 21C, the electronic device 500 may display, on the display 520, a first interface 2100 on at least one online item provided by an online shopping mall (e.g., s-bay), as illustrated in FIG. 21A. For example, the first interface 2100 may include information on an online item (e.g., a product name, a product image, a price information, and product information (e.g., a color, quantity, or the like)); a first graphic object corresponding to a storage area function of an online shopping mall; a second graphic object corresponding to a purchase function of the online shopping mall; and a third graphic object corresponding to a function of storing information on the online item in an integrated storage area.

According to an embodiment of the present disclosure, the electronic device 500 may transfer a request signal to a seller server of the online shopping mall in response to a request for storing the information on the online item in the integrated storage area, and when a request for user account information is received from the seller server, the electronic device 500 may request a security value of the electronic device 500 from the external server 420. When the security value is received, the electronic device 500 may transfer, to the seller server, the user account information of the electronic device 500 together with the security value.

According to an embodiment of the present disclosure, the electronic device 500 may obtain information on an offline item through a sensor (e.g., a camera) in order to purchase the offline item, as illustrated in FIG. 21B. For example, the electronic device 500 may execute a camera application and display a camera application execution screen 2110 for obtaining information on the offline item.

According to an embodiment of the present disclosure, the electronic device 500 may transfer the obtained information on the offline item to the external server 420 in response to a request for storing the obtained information on the offline information in the integrated storage area.

According to an embodiment of the present disclosure, the electronic device 500 may obtain user account information through the sensor 530, and may request a security value to the external server 420. When the security value is received from the external server 420, the electronic device 500 may transfer the security value, the user account information, and the information on the offline item to the external server 420.

According to an embodiment of the present disclosure, when information on the integrated storage area that stores the online item and the offline item is received from the external server 420, the electronic device 500 may display a second interface 2120 on the display 520 based on the information on the integrated storage area, as illustrated in FIG. 21C. The second interface 2120 may include the information 2121 on the online item and the information 2122 on the offline item.

Figure 22A:
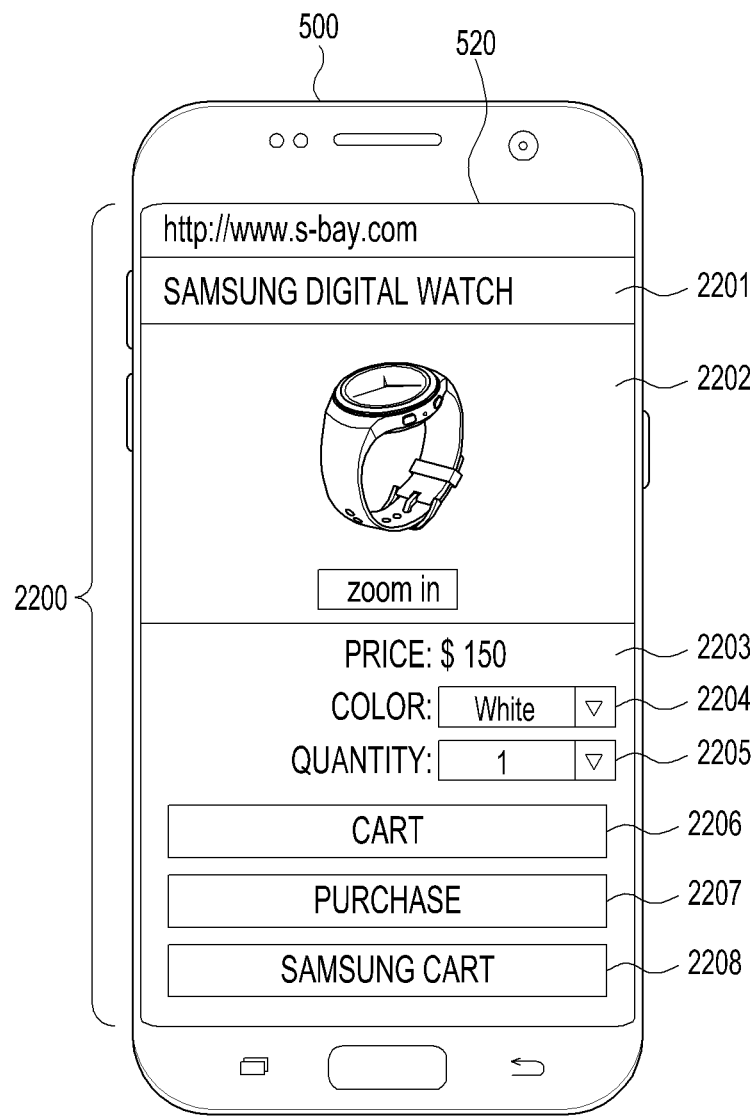
FIGS. 22A and 22B are illustrations of an interface provided by an online seller according to an embodiment of the present disclosure.
Figure 22B:
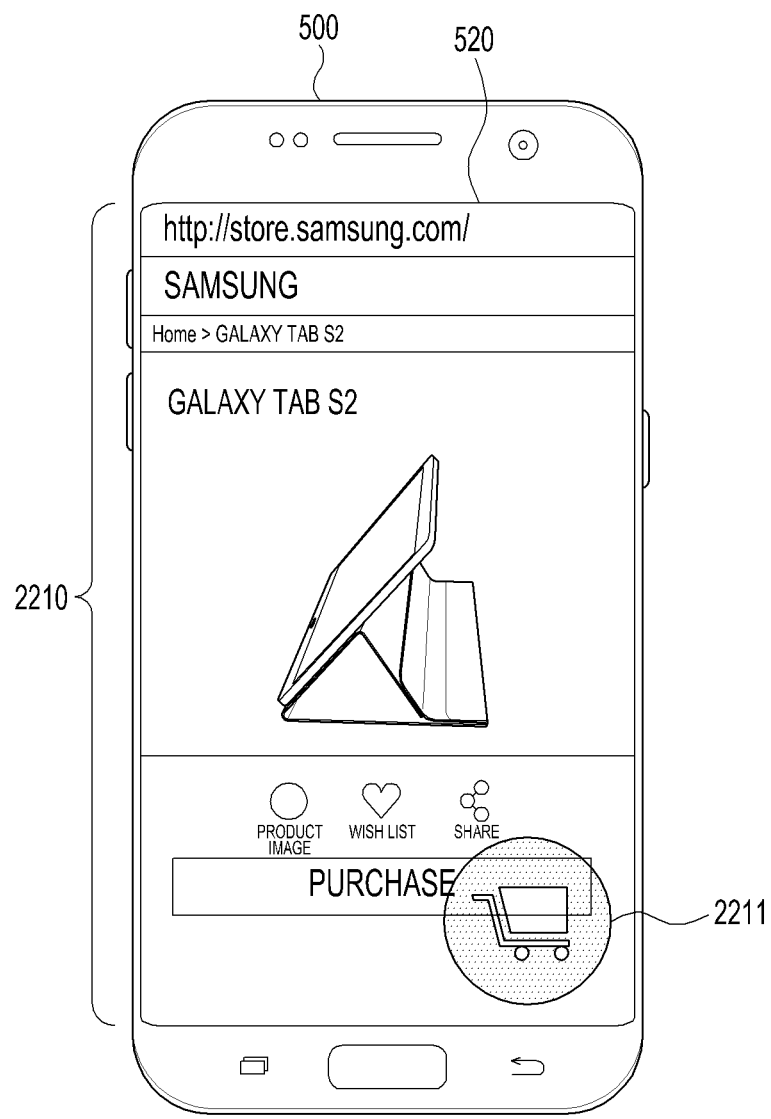

FIGS. 22A and 22B are illustrations of an interface provided by an online seller according to an embodiment of the present disclosure.

Referring to FIG. 22A, the electronic device 500 may display, on the display 520, a first interface 2200 provided by a first online shopping mall (e.g., s-bay). The first interface 2200 may include at least one graphic object corresponding to information on a first item and a payment related function.

For example, the first interface 2200 may include: a first graphic object 2201 corresponding to the name of the first item; a second graphic object 2202 corresponding to the image of the first item; a third graphic object 2203 corresponding to the price of the first item; a fourth graphic object 2204 corresponding to a function of selecting the color of the first item; a fifth graphic object 2205 corresponding to a function of selecting the quantity of the first item; a sixth graphic object 2206 corresponding to a storage area function of the first online shopping mall; a seventh graphic object 2207 corresponding to a purchase function of the first online shopping mall; and an eighth graphic object 2208 corresponding to a function of adding the information on the first item to the integrated storage area.

Referring to FIG. 22B, the electronic device 500 may display, on the display 520, a second interface 2210 provided by a second online shopping mall (e.g., Samsung store). The second interface 2210 may include at least one graphic object corresponding to information on the second item and a payment related function. The payment related function may include a function of storing the information on the second item in the integrated storage area. For example, the electronic device 500 may display a graphic object 2211 corresponding to a function of storing the information on the second item in the integrated storage area. The graphic object 2211 may be an icon, a button, a widget, or the like, which includes a cart-shaped image.

Figure 23A:
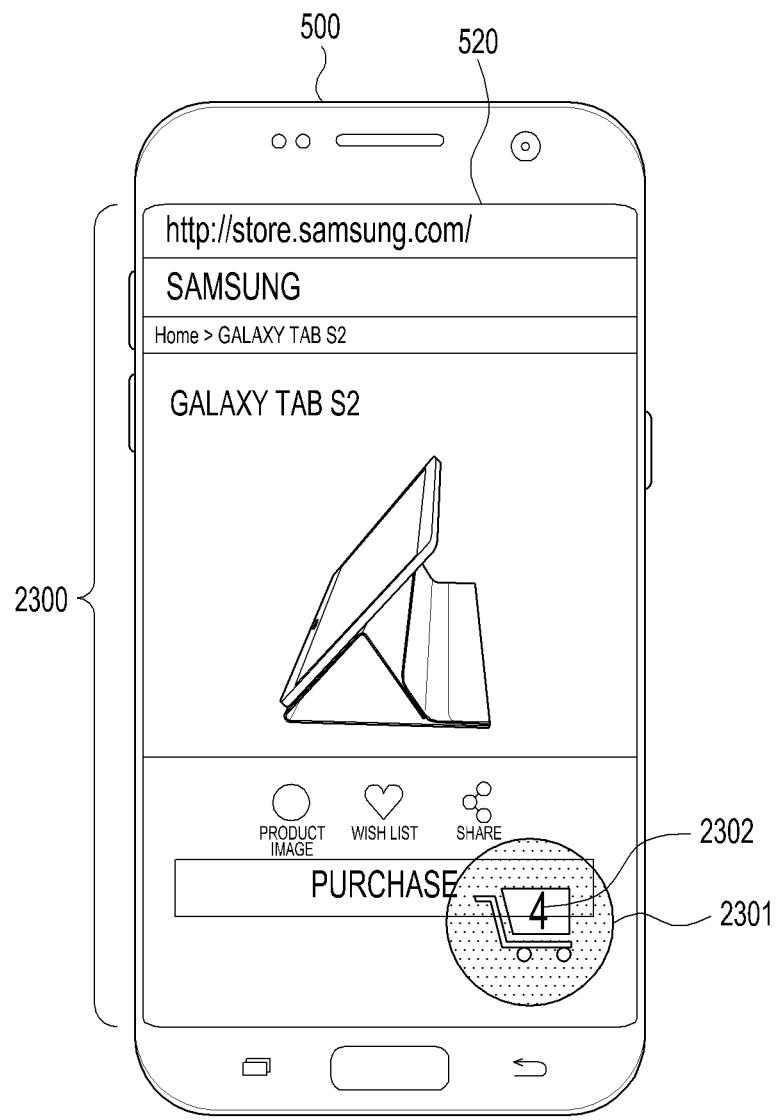
FIGS. 23A and 23B are illustrations of an interface associated with an integrated storage area according to an embodiment of the present disclosure.
Figure 23B:
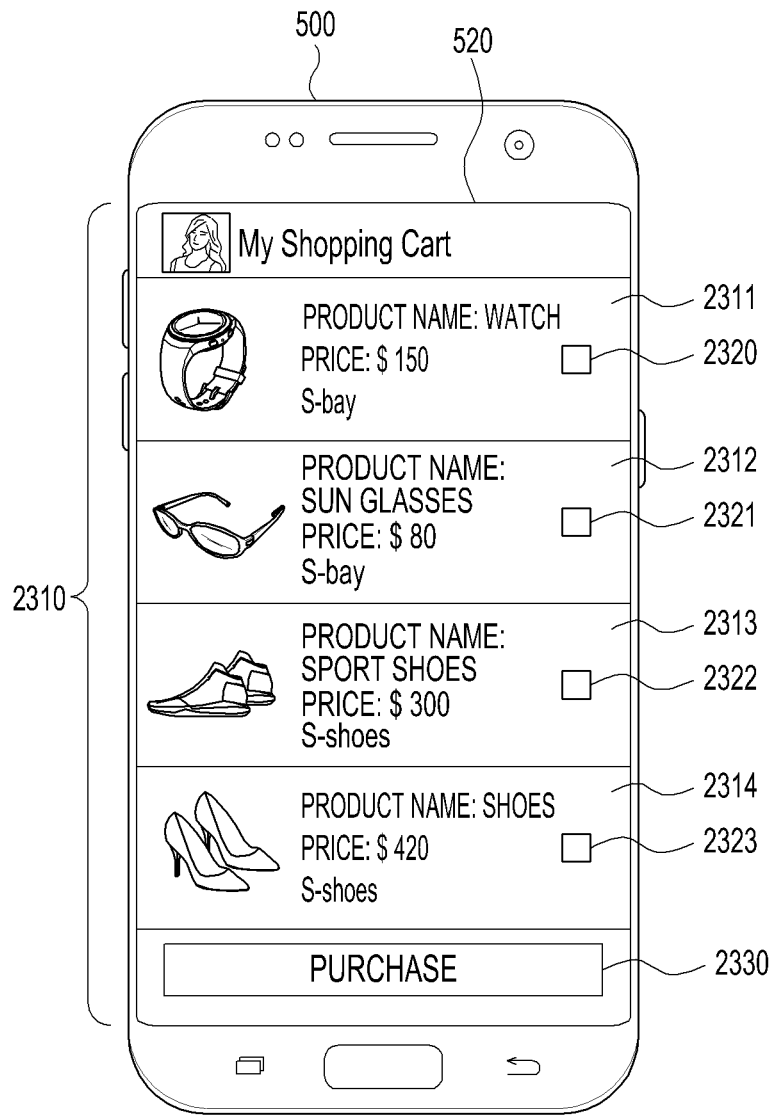

FIGS. 23A and 23B are illustrations of an interface associated with an integrated storage area according to an embodiment of the present disclosure.

Referring to FIG. 23A, the electronic device 500 may display, on the display 520, an interface 2300 provided by an online shopping mall (e.g., Samsung store), and the interface 2300 may include a first graphic object 2301 corresponding to a function of storing information on at least one item in an integrated storage area. The graphic object 2301 may further include a second graphic object 2302 (e.g., text or image) indicating the number of at least one item correlated to the integrated storage area.

When a touch input on the first graphic object 2301 is received through the display 520, the electronic device may display an interface 2310 as illustrated in FIG. 23B.

Referring to FIG. 23B, the second interface 2310 may include graphic objects corresponding to information on an integrated storage area and a payment related function. For example, the second interface 2310 may include graphic objects 2311, 2312, 2313, and 2314 indicating information on at least one item correlated with the integrated storage area; graphic objects 2320, 2321, 2322, and 2323 (e.g., check box) corresponding to a function of selecting at least one item for payment; and a graphic object 2330 corresponding to a function for purchasing the at least one selected item. The graphic objects 2320, 2321, 2322, and 2323 corresponding to the function of selecting an item may be displayed in various shapes in association with the graphic objects 2311, 2312, 2313, and 2314 indicating information on items, and the shape is not limited to a check box as illustrated in FIG. 23B.

Figure 24A:
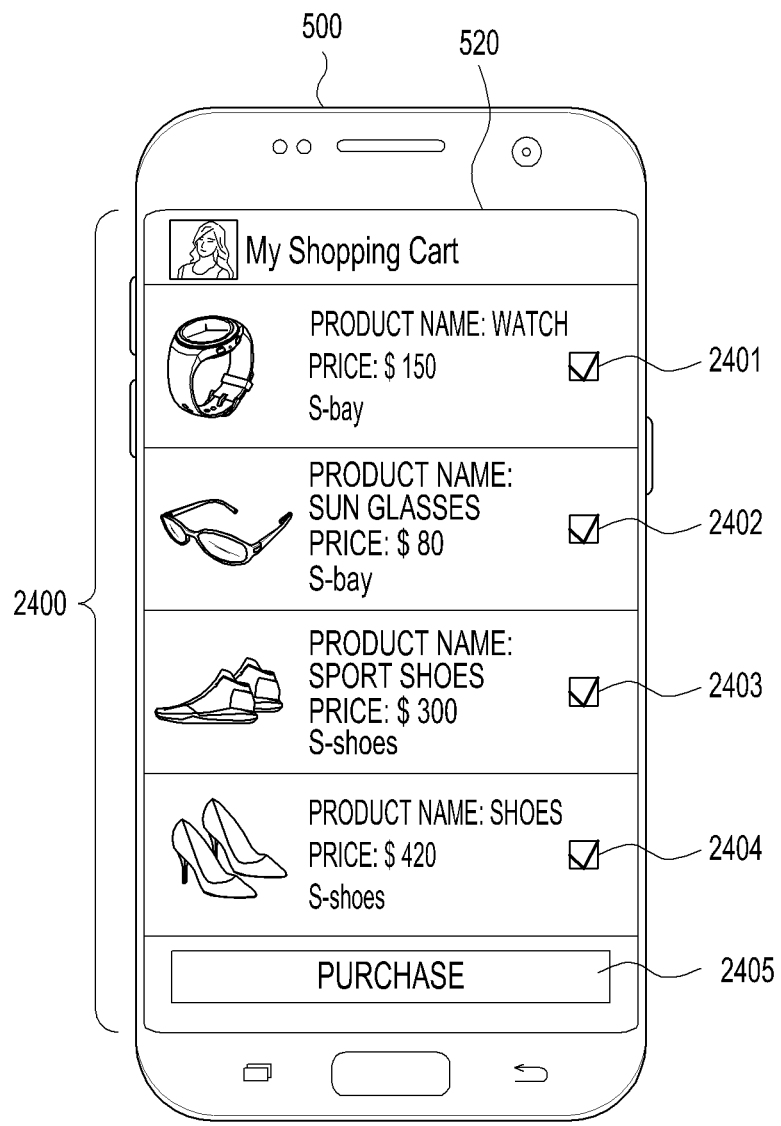
FIGS. 24A and 24B are illustrations of an interface related to payment associated with an integrated storage area according to an embodiment of the present disclosure.
Figure 24B:
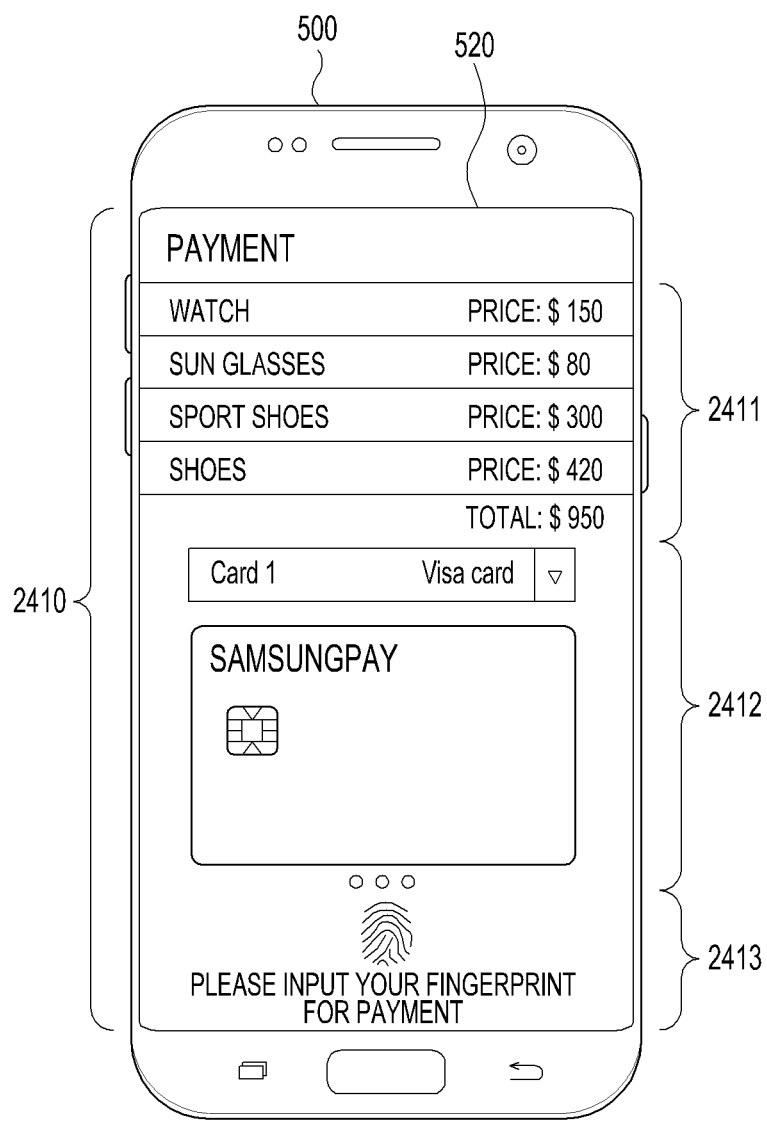

FIGS. 24A and 24B are illustrations of an interface related to payment associated with an integrated storage area according to an embodiment of the present disclosure.

Referring to FIG. 24A, the electronic device 500 may display, on the display 520, a first interface 2400 associated with an integrated storage area that stores information on at least one item. When touch inputs for a graphic object 2401, 2402, 2403, or 2404 (e.g., check) for selecting at least one item and a graphic object 2405 (e.g., a purchase button) corresponding to a purchase (or payment) function are received, the electronic device 500 may display a second interface 2410 for payment on the display 520 as illustrated in FIG. 24B.

Referring to FIG. 24B, the second interface 2410 may include graphic objects corresponding to payment information, payment means information, user authentication corresponding to at least one item. For example, the second interface 2410 may include: a first graphic object 2411 corresponding to price information on at least one item; a second graphic object 2412 corresponding to a function for selecting a payment means or information on a payment means (e.g., a credit card) for payment; and a third graphic object 2413 corresponding to a function of obtaining biometric authentication information for user authentication.

When a touch input for selecting a card for payment is received through the display 520, and fingerprint information is obtained through the sensor 530 (e.g., a fingerprint sensor), the electronic device 500 may compare the obtained fingerprint information and previously stored fingerprint information and determine whether those fingerprint information correspond to the identical user, and may generate payment information on at least one item when it is determined that those fingerprint information correspond to the identical user. The electronic device 500 may transfer the generated payment information and information on the selected card to the at least one seller server 410 to perform payment for the at least one item.

FIGS. 25A, 25B, 25C, 25D, and 25E are illustrations of an interface associated with an integrated storage area according to an embodiment of the present disclosure.

The electronic device 500 may be connected with a payment application (e.g., a Samsung Pay application), and may provide an interface for a payment storage area.

Figure 25A:
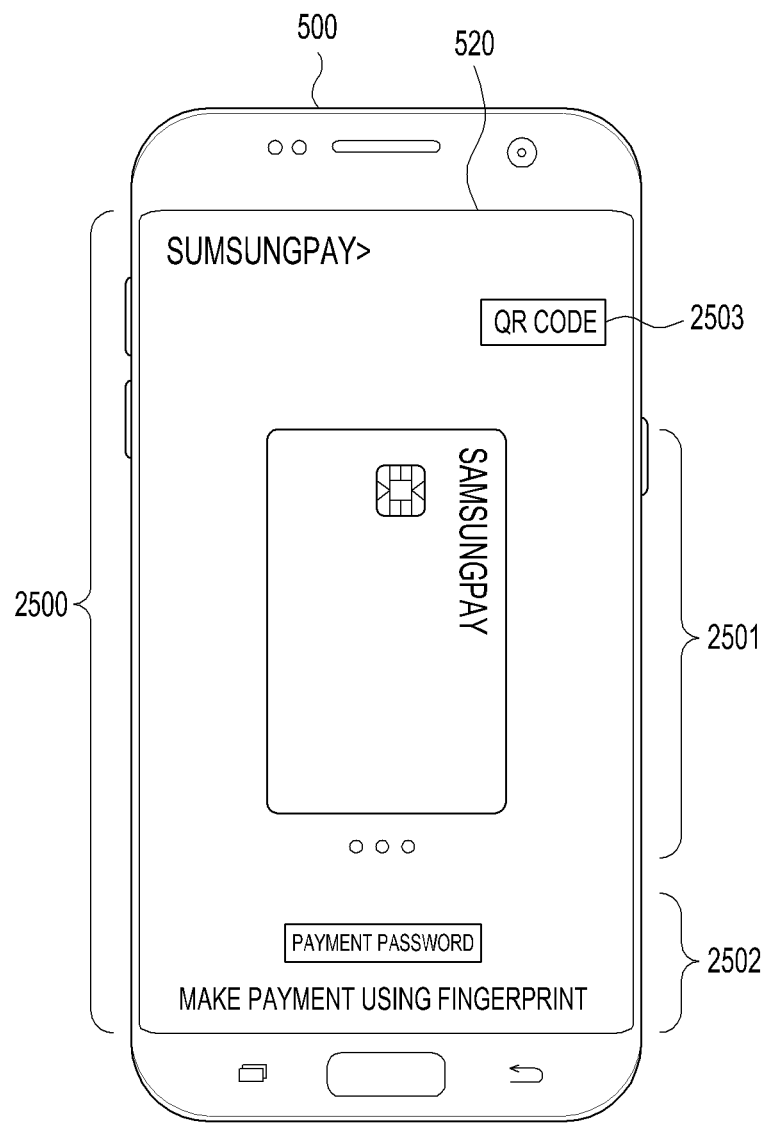
FIGS. 25A, 25B, 25C, 25D, and 25E are illustrations of an interface associated with an integrated storage area according to an embodiment of the present disclosure.

Referring to FIG. 25A, the electronic device 500 may execute a payment application for mobile payment in response to a request, and may display, on the display 520, a first interface 2500 corresponding to the executed application. The first interface 2500 may include: a first graphic object 2501 corresponding information on a card; a second graphic object 2502 corresponding to a payment related function; and a third graphic object 2503 corresponding to a function of recognizing a recognition (or identification) code (e.g., QR code) related to an offline item.

Figure 25B:
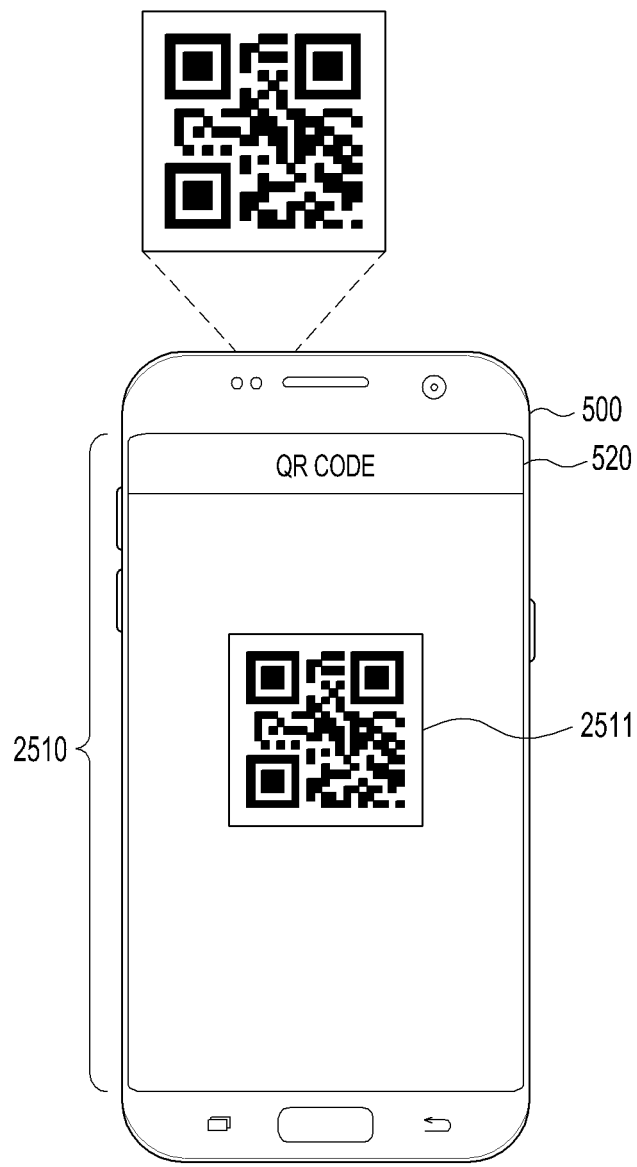

According to an embodiment of the present disclosure, when a touch input for the third graphic object 2503 is received through the display 520, the electronic device 500 may display a second interface 2510 corresponding to the function of recognizing a QR code on the display 520 as illustrated in FIG. 25B.

Referring to FIG. 25B, the second interface 2510 may include a graphic object 2511 corresponding to a QR code recognition area of the sensor 530. The QR code may be located in at least a part of an offline item (e.g., an offline product).

Figure 25C:
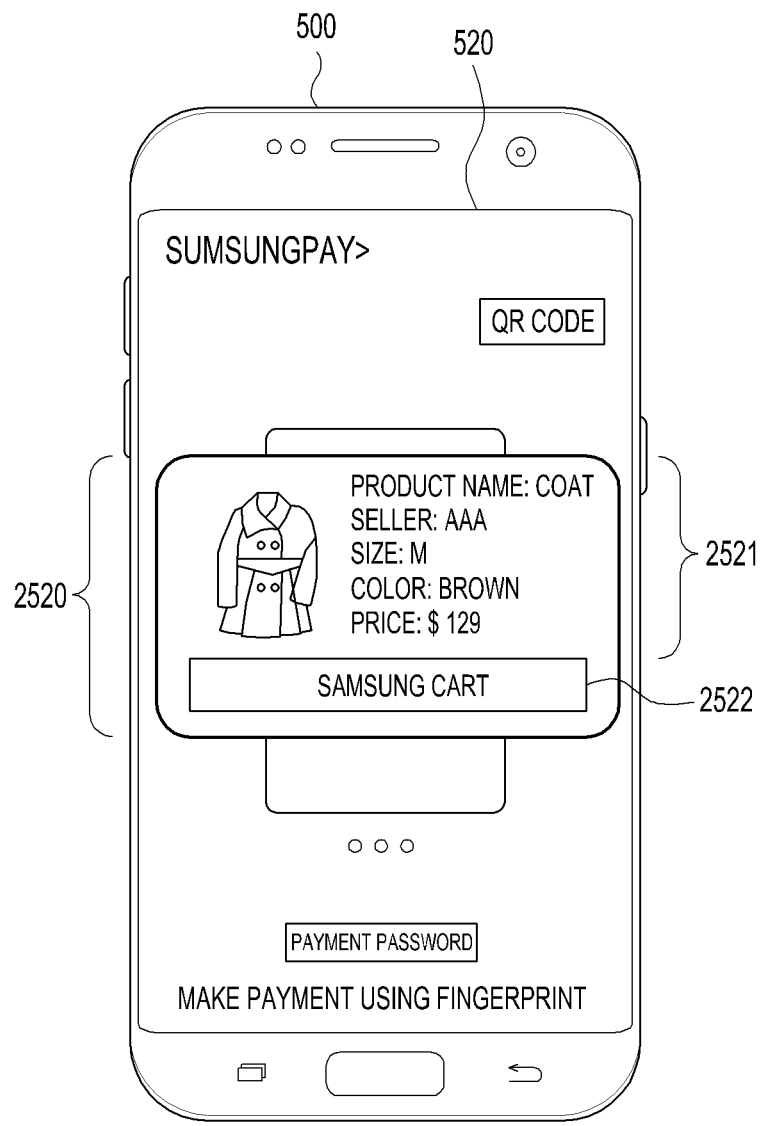

When a QR code image is recognized through a recognition area, the electronic device 500 may obtain information on an offline item corresponding to the recognized QR code, and may display a third interface 2520 corresponding to the obtained information on the offline item on the display 520, as illustrated in FIG. 25C.

Referring to FIG. 25C, the third interface 2520 may include a first graphic object 2521 corresponding to the obtained information on the offline item and a second graphic object 2522 corresponding to a function of storing the information on the offline item in an integrated storage area.

When a touch input on the second graphic object 2522 is received through the display 520, the electronic device 500 may perform an operation of storing the information on the offline item in the integrated storage area. For example, the electronic device 500 requests a security value from the external server 420, and when the security value is received from the external server 420, the electronic device 500 may transfer a request signal including the received security value, user account information and the information on an offline item to the external server 420. When a response signal indicating that the information on the offline item is stored in the integrated storage area is received from the external server 420, the electronic device 500 may request information on the integrated storage area from the external server 420, and, when the information on the integrated storage area is received from the external server 420, the electronic device 500 may display a fourth interface 2530 corresponding to the received information on the integrated storage area on the display 520 as illustrated in FIG. 25D.

Figure 25D:
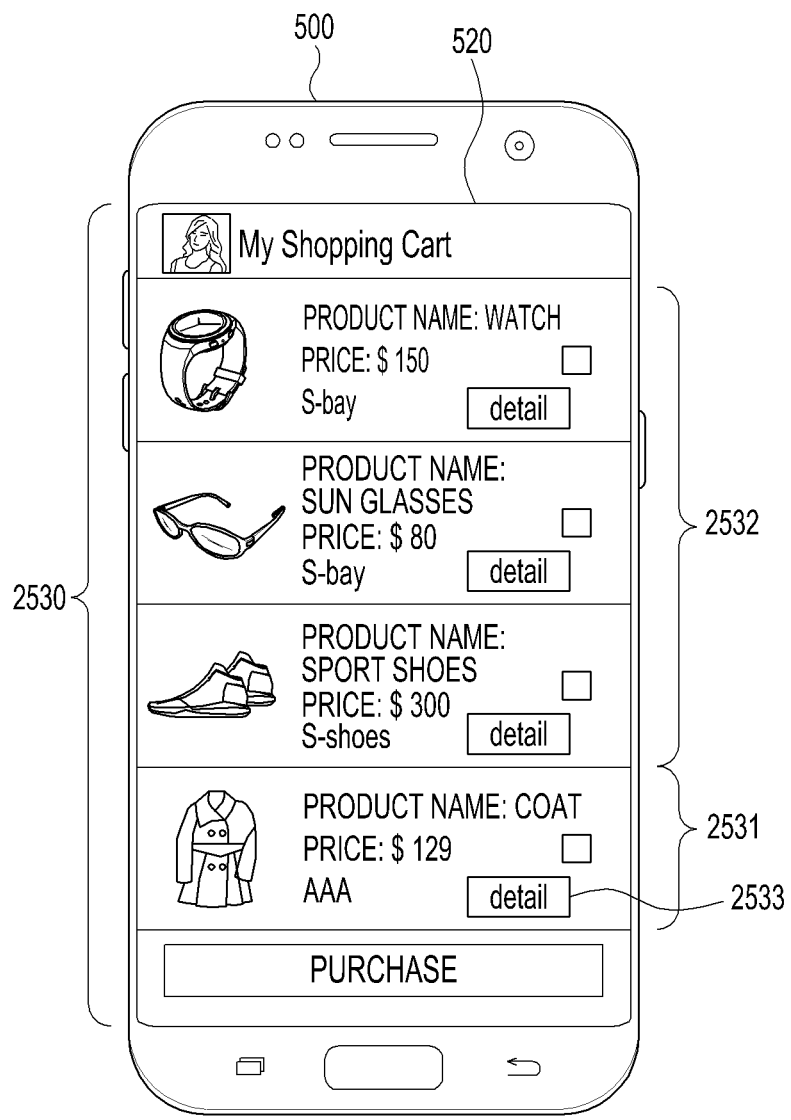

Referring to FIG. 25D, the fourth interface 2530 may include a graphic object 2531 corresponding to information on an offline item and graphic objects 2532 corresponding to information on a plurality of online items. Also, the fourth interface 2530 may further include graphic objects corresponding to a function of providing detailed information on each item. When a touch input for the graphic object 2533 is received through the display 520, the electronic device 500 may display a fifth interface 2540 corresponding detailed information on the offline item on the display 520 as illustrated in FIG. 25E.

Figure 25E:
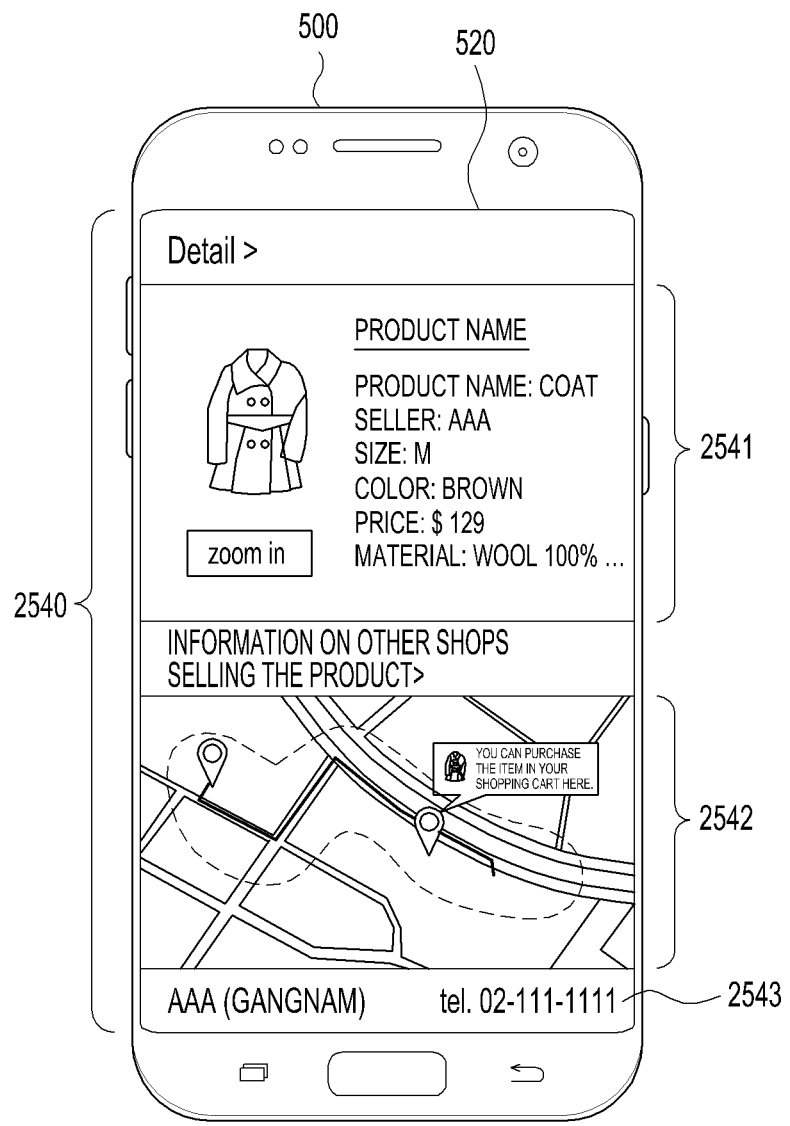

Referring to FIG. 25E, the fifth interface 2540 may include a first graphic object 2541 corresponding to detailed information on the offline item and a second graphic object 2542 and a third graphic object 2543 corresponding to information on other shops that sell the offline item. For example, the detailed information on the offline item may include a name, a seller name, an image, a size, a color, a price, a material, or the like associated with the offline item.

According to an embodiment of the present disclosure, the electronic device 500 may search for a shop located within the vicinity of a house of a user from among other shops that sell the corresponding offline item based on previously stored user information (e.g., information on a house address), and may display the location of the retrieved shop, a guidance sentence associated with the retrieved shop (e.g., "You can purchase the items in your shopping cart here."), a second graphic object 2542 indicating a route from the user house to the retrieved shop, and a third graphic object 2543 indicating contact information and the name of the retrieved shop.

FIGS. 26A, 26B, and 26C are illustrations of a voice recognition service using an integrated storage area according to an embodiment of the present disclosure.

Referring to FIGS. 26A, 26B, and 26C, the electronic device 500 may provide an interface corresponding to a voice recognition service in response to a request. The request may include reception of a button input for performing a function associated with a voice recognition service, or reception of a touch input for an execution icon for executing an application providing a voice recognition service.

For example, the electronic device 500 may receive a voice corresponding to a user's inquiry provided through a microphone of the electronic device 500, such as "Which will be a good birthday present for June?", as illustrated in FIG. 26A. The electronic device 500 may perform voice recognition for the voice through the sensor 530, and determine that the received voice is an inquiry about a predetermined user (e.g., June) based on a voice recognition result.

The electronic device 500 requests information on an integrated storage area corresponding to predetermined user account information from the external server 420, and when an integrated storage area corresponding to the predetermined user account information exists, the external server 420 may transfer the information on the integrated storage area corresponding to the predetermined user account information to the electronic device 500 as illustrated in FIG. 26B.

The electronic device 500, which receives the information on the integrated storage area of June, may determine an item appropriate for a birthday present from among at least one item correlated with the integrated storage area, based on predetermined reference information, and may provide an interface 2600 corresponding to information on the determined item as a response to the user's inquiry, as illustrated in FIG. 26C. The interface 2600 may include graphic objects corresponding to detailed information on the determined item, the response to the user inquiry, and graphic objects corresponding to functions of purchasing the determined item and adding the item to an integrated storage area.

For example, the electronic device 500 may collect various information on a user of the electronic device 500 and June (e.g., social networking service (SNS) related information, call history information, payment detail information, context information, or the like), and may determine reference information such as importance of an event (e.g., birthday) corresponding to an inquiry, intimacy with a predetermined user (e.g., June), the frequency of the event, the purchase pattern of the predetermined user, or the like based on the collected information. The electronic device 500 may select, as an appropriate item, at least one of the at least one item correlated with the integrated storage area of June, based on the determined reference information.

Figure 27:
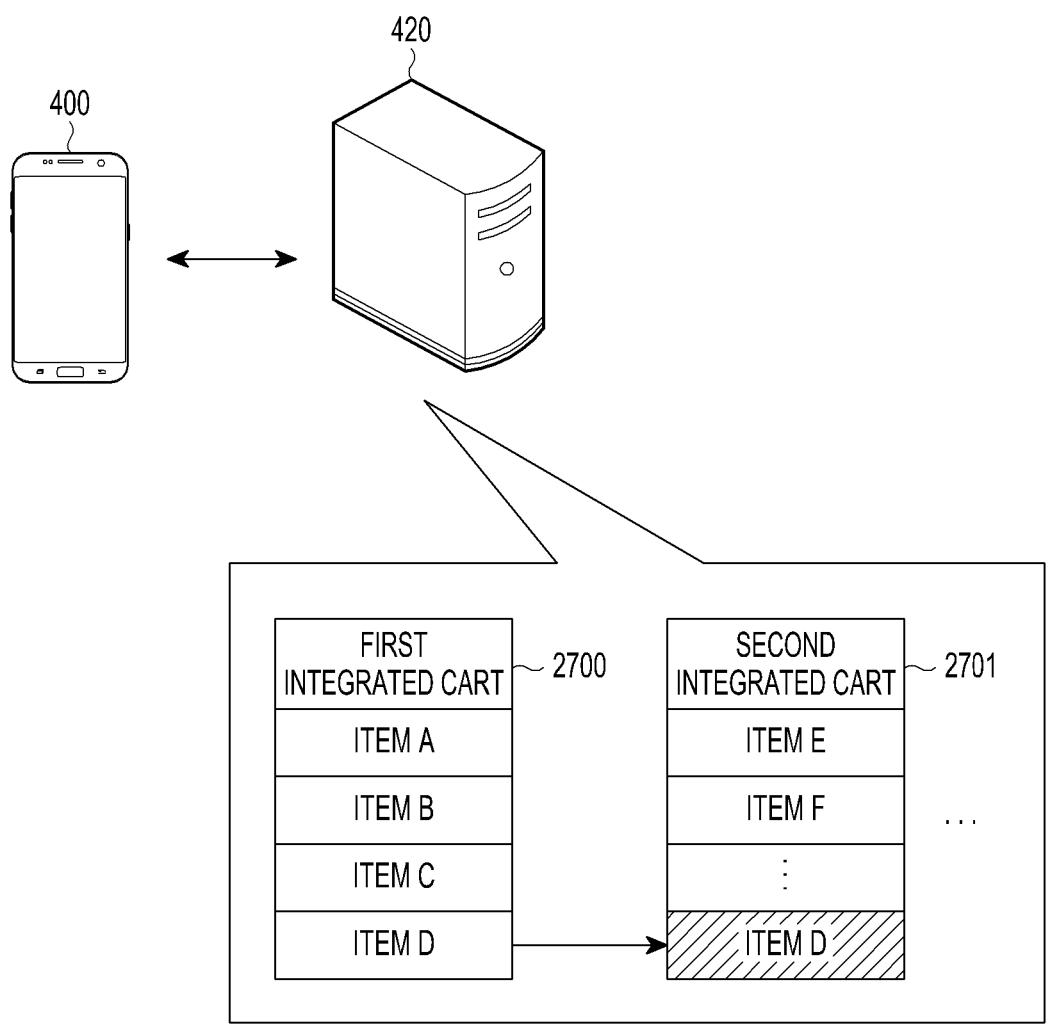
FIG. 27 is an illustration of an integrated storage area according to an embodiment of the present disclosure.

FIG. 27 is an illustration of an integrated storage area according to an embodiment of the present disclosure.

Referring to FIG. 27, the external server 420 may store an integrated storage area corresponding to user account information. For example, when a request signal for requesting information on a second integrated storage area 2701 corresponding to user account information of the electronic device 500 is received from the electronic device 500, the external server 420 may transfer a response signal including information on the second integrated storage area 2701 to the electronic device 400.

The electronic device 400 may display an interface corresponding to the information on the second integrated storage area 2701 included in the response signal. The information on the second integrated storage area 2701 may include information on items E, F, . . . and the like. When a request signal for requesting information on at least one integrated storage area shared by other users is received from the electronic device 400, the external server 420 may transfer, to the electronic device 400, a response signal including information on the integrated storage area (e.g., a first integrated storage area 2700) corresponding to user account information of other users that allow sharing.

The electronic device 400 may provide an interface corresponding to the information on the first integrated storage area 2700 included in the response signal. The information on the first integrated storage area 2700 may include information on items A, B, C, and D.

When a request signal for storing the information on the item D, which is correlated with the first integrated storage area 2700, in the second integrated storage area 2701 is received from the electronic device 400, the external server 420 may copy the information on the item D and store the same in the second integrated storage area 2701. The external server 420 transfers, to the electronic device 400, a signal indicating that the information on the item D is stored in the second integrated storage area 2701, and, when a request signal for requesting the information on the second integrated storage area 2701 is received from the electronic device 400, the external server 420 may transfer a response signal including information on the second integrated storage area 2701 to the electronic device 400. The electronic device 400 may provide an interface corresponding to the information on the second integrated storage area 2701 included in the response signal. The information on the second integrated storage area 2701 may include information on items E, F, . . . , D and the like.

FIGS. 28A, 28B, 28C, and 28D are illustrations of interfaces associated with an integrated storage area according to an embodiment of the present disclosure.

Figure 28A:
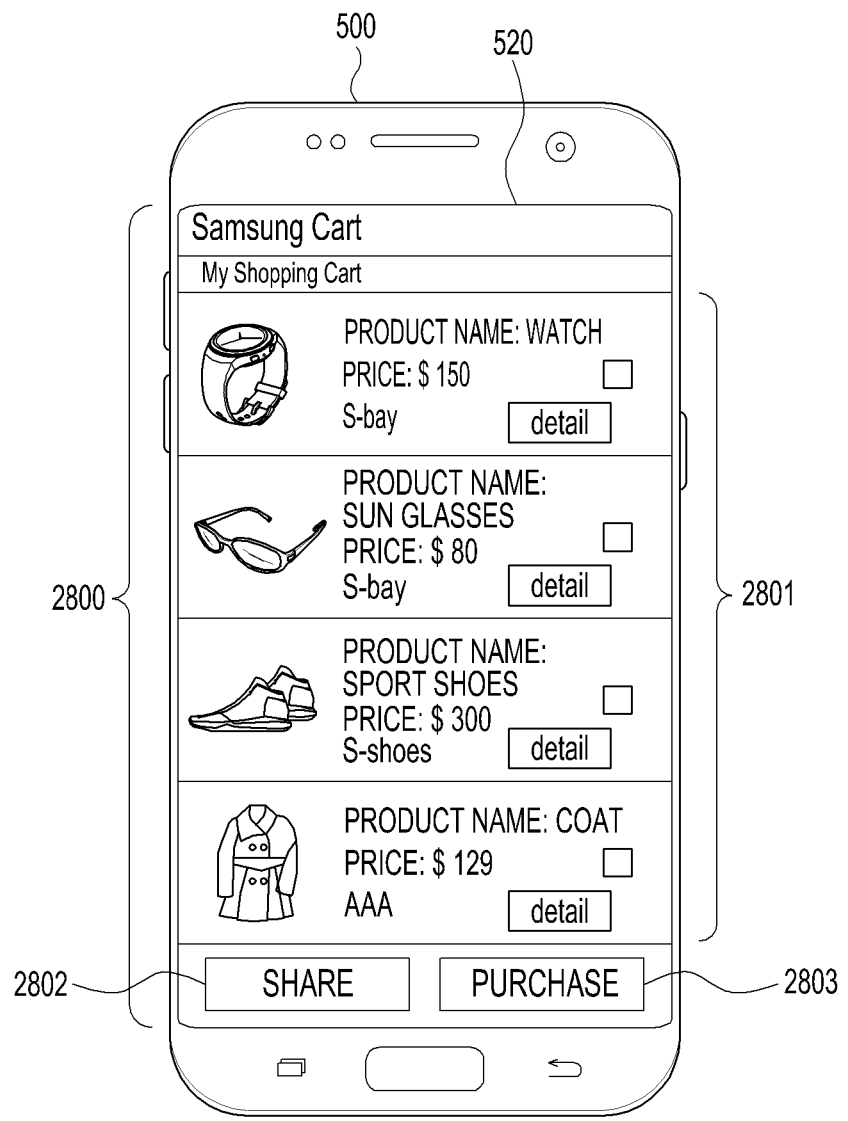
FIGS. 28A, 28B, 28C, and 28D are illustrations of an interface associated with an integrated storage area according to an embodiment of the present disclosure.

Referring to FIG. 28A, the electronic device 500 may display, on the display 520, a first interface 2800 corresponding to information on an integrated storage area. For example, the first interface 2800 may include: graphic objects 2801 corresponding to information on at least one online/offline item; a first graphic object 2802 corresponding to a function of sharing information on an integrated storage area with other users; and a second graphic object 2803 corresponding to a function for payment. For example, the function of sharing the information on the integrated storage area with other users may be a function of providing an interface corresponding to information on an integrated storage area based on a social network service (SNS) (e.g., twitter, instagram, facebook, and the like).

Figure 28B:
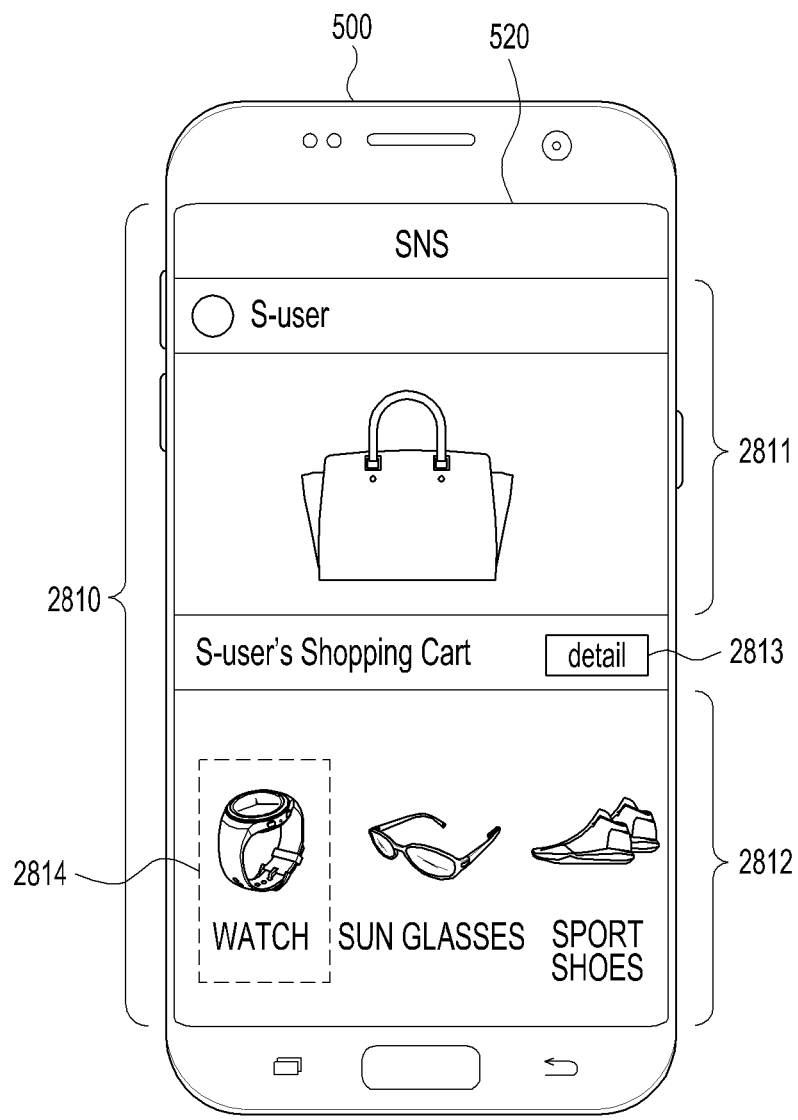

When a touch input for the first graphic object 2802 is received through the display 520, the electronic device 500 may display a second interface 2810 corresponding to the information on the integrated storage area on the display 520 based on a social network service, as illustrated in FIG. 28B.

Referring to FIG. 28B, the second interface 2810 may include graphic objects 2811 related to a user account associated with a social network service, and graphic objects 2812 corresponding to information on an integrated storage area. For example, the graphic objects 2812 corresponding to the information on the integrated storage area may include a graphic object corresponding to information on at least one item, and the graphic object may correspond to link information (e.g., www.s-bay.com/s-watch) of an online shopping mall purchase page of each item.

Figure 28C:
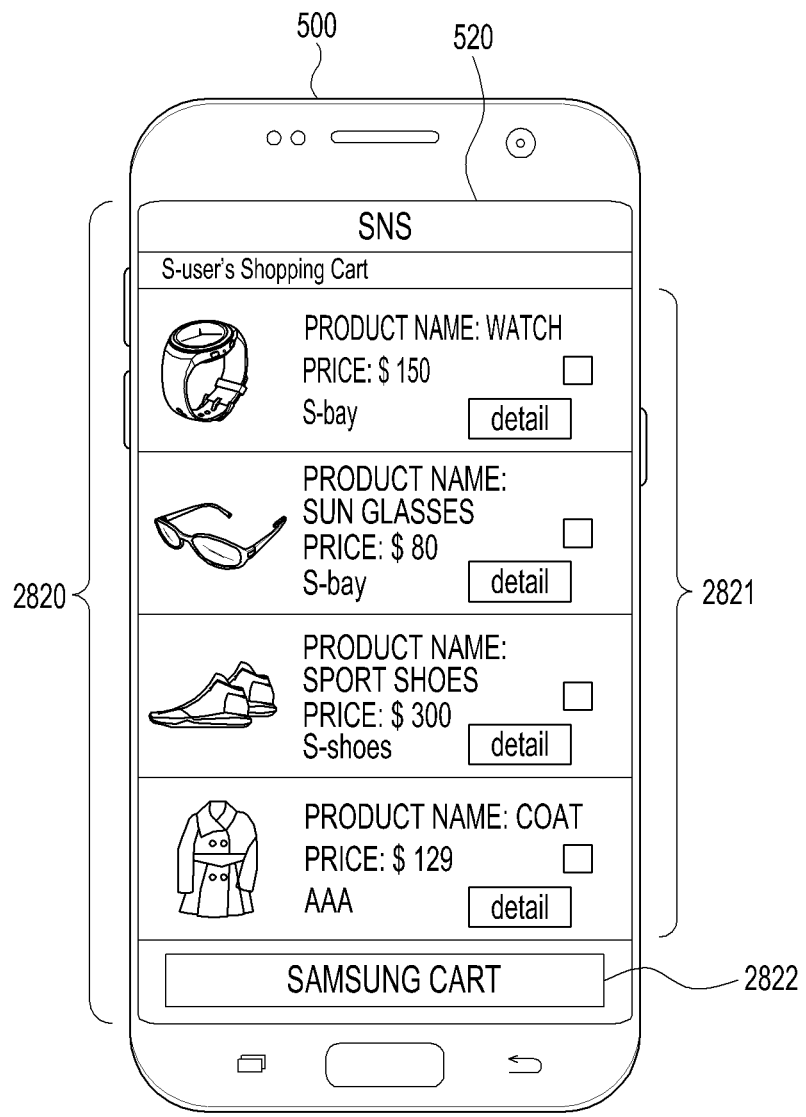

When a touch input for the graphic object 2813 corresponding to a function of providing detailed information on the integrated storage area is received through the display 520, the electronic device 500 may display, on the display 520, a third interface 2820 indicating information on at least one item correlated with the integrated storage area as illustrated in FIG. 28C.

Referring to FIG. 28C, the third interface 2820 may include graphic objects 2821 indicating information on at least one item, and a graphic object 2822 corresponding to a function of storing the information on at least one item in an integrated storage area corresponding to user account information.

Figure 28D:
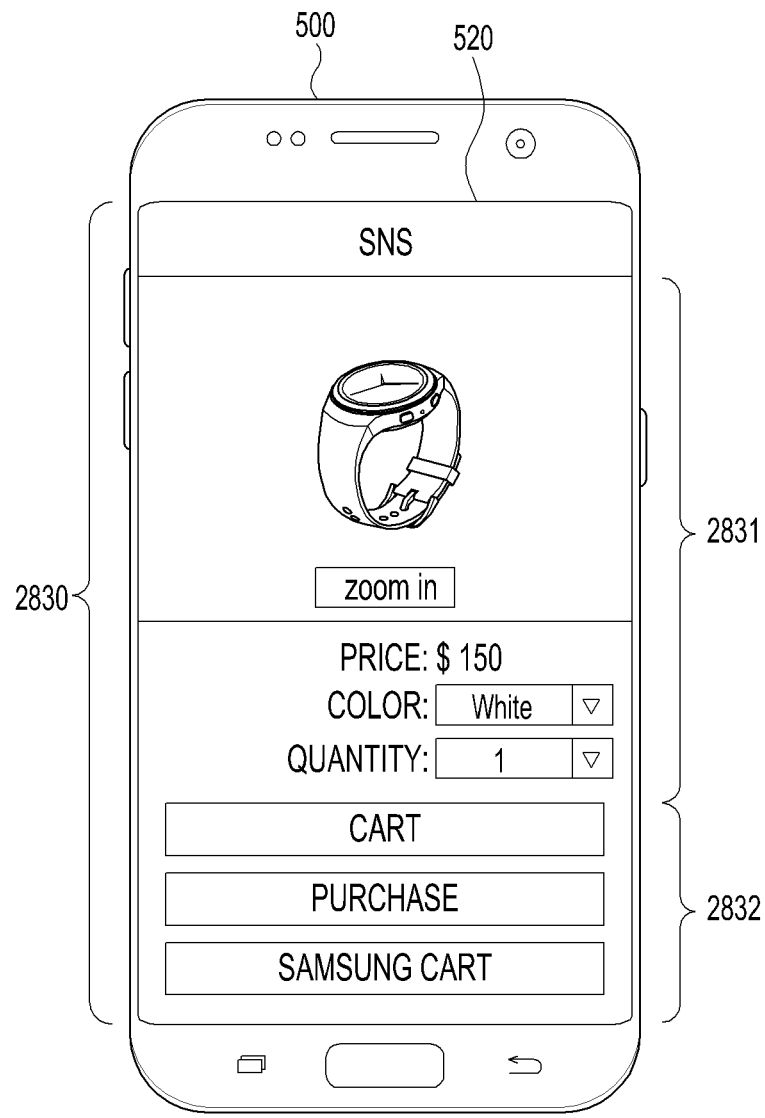

When a touch input for the graphic object 2814 corresponding to a function for providing detailed information of a first item (e.g., a watch) correlated with an integrated storage area of FIG. 28B is received through the display 520, the electronic device 500 may display, on the display 520, a fourth interface 2830 indicating detailed information on the first item as illustrated in FIG. 28D.

Referring to FIG. 28D, the fourth interface 2830 may include graphic objects 2831 corresponding to detailed information, such as a name, an image, a price, a color, and a quantity associated with the first item, and a function of selecting at least one of the color and the quantity. In addition, the fourth interface 2830 may further include a graphic object 2832 corresponding to a function of adding information on the first item to an item storage space (e.g., a cart) provided by an online shopping mall that sells the first item, a function of purchasing the first item, and a function of storing the information on the first item in the integrated storage area.

An embodiment of the present disclosure can integrally manage various products provided by an online/offline shopping mall through one list, and can readily perform payment for online/offline products using one user input.

An embodiment of the present disclosure can increase reliability of a payment system using a token-based payment scheme, and can provide safety of payment security.

The term "module" as used herein may include a unit consisting of hardware, software, or firmware, and may, for example, be used interchangeably with the terms "logic", "logical block", "component", "circuit", and the like. The term "module" may indicate an integrated component, or a minimum unit for performing one or more functions or a part thereof. The term "module" may indicate a device that may be mechanically or electronically implemented and may include, for example, an application specific integrated circuit (ASIC), a field programmable gate array (FPGA), or a programmable-logic device, which are known or will be developed, for performing certain operations. At least some of devices (e.g., modules or functions thereof) or methods (e.g., operations) according to various embodiments of the present disclosure may be implemented by an instruction which is stored in a non-transitory computer-readable storage medium (e.g., the memory 130) in the form of a program module. The instruction, when executed by a processor, may cause the one or more processors to execute the function corresponding to the instruction. The non-transitory computer-readable storage medium may include a hard disk, a floppy disk, a magnetic medium (e.g., a magnetic tape), an optical media (e.g., a compact disc ROM (CD-ROM), DVD), a magneto-optical media (e.g., a floptical disk), an internal memory, etc. The instruction may include code generated by a complier or code that can be executed by an interpreter. The programming module according to the present disclosure may include one or more of the aforementioned elements or may further include other additional elements, or some of the aforementioned elements may be omitted. Operations performed by a module, a programming module, or other elements according to various embodiments of the present disclosure may be executed sequentially, in parallel, repeatedly, or in a heuristic manner. At least some operations may be executed according to another sequence, may be omitted, or may further include other operations.

While the present disclosure has been shown and described with reference to certain embodiments thereof, it will be understood by those skilled in the art that various changes in form and details may be made therein without departing from the scope of the present disclosure as defined by the appended claims and their equivalents.

What is claimed is:

1. An electronic device, comprising:
a first communication module;
a second communication module;
a touch screen display; and
a processor functionally connected with the first communication module, the second communication module, and the touch screen display, and configured to:
control the touch screen display to display a cart including information on a first item and information on a second item and a purchase button, the information on the first item being a barcode related to a product selected for purchase in an online shopping mall and the information on the second item being a barcode related to a product selected for purchase in an offline shop;
receive a touch input for the purchase button through the touch screen display;
in response to receiving the touch input for the purchase button, the touch input including a request for user authentication, determine whether the user authentication is successful, and
if the user authentication is successful,
generate first payment information corresponding to the first item and second payment information corresponding to the second item;
transfer the first payment information to a first seller's external electronic device corresponding to the information on the first item using the first communication module; and
transfer the second payment information to a second seller's external electronic device corresponding to the information on the second item using the second communication module,
wherein the generate and transfer steps are not performed if the user authentication is unsuccessful, and
wherein the processor is further configured to:
determine whether a payment input for remaining items, excluding an online item corresponding to an offline item that is paid for, is received, and to transfer payment information to the seller operating the first external electronic device when the payment input for the remaining online items is received, and
terminate the online item payment operation when the payment input for the remaining items is not received.

2. The electronic device of claim 1, further comprising:
a secure memory configured to store a token; and
a biometric sensor;
wherein the processor is further configured to:
perform user authentication using the biometric sensor in response to the single purchase input associated with the cart;
obtain the token from the secure memory when the user authentication is successfully performed; and
generate the first payment information corresponding to the information on the first item and the second payment information corresponding to the information on the second item using the token.

3. The electronic device of claim 2, wherein the processor is further configured to:
generate the first payment information using first identification information corresponding to the information on the first item as at least a part of the generation of the first payment information; and
generate the second payment information using second identification information corresponding to the information on the second item as at least a part of the generation of the second payment information.

4. The electronic device of claim 2, wherein the processor is further configured to:
generate first user authentication result information corresponding to the information on the first item and second user authentication result information corresponding to the information on the second item, based at least on the user authentication;
generate the first payment information using the first user authentication result information, as at least a part of the generation of the first payment information; and
generate the second payment information using the second user authentication result information, as at least a part of the generation of the second payment information.

5. The electronic device of claim 2, wherein the token is configured to be received from a third external electronic device for payment.

6. The electronic device of claim 1, wherein the processor is further configured to transfer, to the first external electronic device, a security value or user account information received from a third external electronic device.

7. The electronic device of claim 1, wherein the first communication module is a wireless communication module, and the second communication module includes at least one of a near field communication (NFC) module and a magnetic secure transmission (MST) module.

8. The electronic device of claim 1, wherein the first external electronic device corresponds to an online shopping mall; and
the second external electronic device includes a point of sales (POS) device.

9. The electronic device of claim 1, wherein the processor is further configured to generate a plurality of pieces of payment information, which includes the first payment information and the second payment information, and corresponds to a number of external electronic devices related to item information including the information on the first item and the information on the second item included in the cart, as at least a part of the generation of the first payment information and the second payment information.

10. The electronic device of claim 1,
wherein the second communication module is a short-range communication module, and
wherein the processor is further configured to:
when a third item that may be purchased from an offline shop is included in the cart, transmit third payment information for the third item to a third external electronic device in a vicinity of the electronic device through the short-range communication module.

11. The electronic device of claim 1, further comprising:
a sensing device, and
wherein the processor is further configured to:
recognize a third item indicating an offline product, using the sensing device; and
obtain information on the third item in response to the recognition of the third item.

12. The electronic device of claim 11, wherein the information on the third item is configured to be received from a third external electronic device.

13. The electronic device of claim 11, wherein the processor is further configured to:
generate third payment information corresponding to the information on the third item using a token; and transmit the third payment information to a third external electronic device associated with the third item through the communication module.

14. The electronic device of claim 11, wherein the processor is further configured to:
generate third payment information corresponding to the information on the third item using a token;
transmit the first payment information and the second payment information through the first communication module; and
transmit the third payment information through the second communication module.

15. The electronic device of claim 1, wherein the first payment information includes result information on the user authentication, a token, and first identification information; and
the second payment information includes result information on the user authentication, the token, and second identification information.

16. The electronic device of claim 1, wherein the processor is further configured to:
request the first external electronic device to transmit the information on the first item to a third external electronic device, and request the second external electronic device to transmit the information to the third external electronic device, before displaying the cart; and
obtain the information on the first item and the information on the second item from the third external electronic device, in response to a user input.

17. A non-transitory computer-readable recording medium configured to store a program for implementing a method performed by an electronic device, the method comprising:
controlling a touch screen display to display a cart including information on a first item and information on a second item and a purchase button, the information on the first item being a barcode related to a product selected for purchase in an online shopping mall and the information on the second item being a barcode related to a product selected for purchase in an offline shop;
receiving a touch input for the purchase button through the touch screen display;
in response to receiving the touch input for the purchase button, the touch input including a request for user authentication, determining whether the user authentication is successful, and
if the user authentication is successful,
generating first payment information corresponding to the first product information and second payment information corresponding to the second item;
transferring the first payment information to a first seller's external electronic device corresponding to the information on the first item using a first communication module functionally connected to the electronic device;
transferring the second payment information to a second seller's external electronic device corresponding to the information on the second item using a second communication module functionally connected to the electronic device,
wherein the generating and transferring steps are not performed if the user authentication is unsuccessful, and
wherein the method further comprises:
determining whether a payment input for remaining items, excluding an online item corresponding to an offline item that is paid for, is received, and to transfer payment information to the seller operating the first external electronic device when the payment input for the remaining online items is received, and
terminating the online item payment operation when the payment input for the remaining items is not received.

18. The non-transitory computer-readable recording medium of claim 17, further comprising:
generating a plurality of pieces of payment information, which includes the first payment information and the second payment information, and corresponds to a number of external electronic devices related to a plurality of pieces of product information including the information on the first item and the information on the second item included in the cart, as at least a part of the generation of the first payment information and the second payment information.

* * * * *